(12) United States Patent
Yu et al.

(10) Patent No.: US 10,439,699 B2
(45) Date of Patent: Oct. 8, 2019

(54) METHOD, ACCESS POINT, AND STATION FOR TRANSMITTING CHANNEL STATE INFORMATION

(71) Applicant: Huawei Technologies Co., Ltd., Shenzhen (CN)

(72) Inventors: Jian Yu, Shenzhen (CN); Xun Yang, Shenzhen (CN); Ming Gan, Shenzhen (CN); Meilu Lin, Shenzhen (CN); Peter Loc, Cupertino, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/860,255

(22) Filed: Jan. 2, 2018

(65) Prior Publication Data
US 2018/0159609 A1    Jun. 7, 2018

Related U.S. Application Data

(63) Continuation of application No. PCT/CN2015/083186, filed on Jul. 2, 2015.

(51) Int. Cl.
*H04W 4/00* (2018.01)
*H04B 7/06* (2006.01)
(Continued)

(52) U.S. Cl.
CPC ......... *H04B 7/0626* (2013.01); *H04B 7/0413* (2013.01); *H04L 1/0026* (2013.01); *H04L 1/0073* (2013.01); *H04W 24/00* (2013.01)

(58) Field of Classification Search
None
See application file for complete search history.

(56) References Cited

U.S. PATENT DOCUMENTS

| 2012/0250543 A1 | 10/2012 | Abraham et al. |
| 2012/0257605 A1* | 10/2012 | Abraham ............. H04B 7/0626 370/338 |

(Continued)

FOREIGN PATENT DOCUMENTS

| CA | 2930899 A1 | 5/2015 |
| CN | 102769925 A | 11/2012 |

(Continued)

OTHER PUBLICATIONS

Son et al, "Design Principles for HE Preamble" Seoul, Korea, IEEE 802.11-15/0621r2, Institute of Electrical and Electronics Engineers, New York, New York (May 13, 2015).

(Continued)

*Primary Examiner* — Phirin Sam
(74) *Attorney, Agent, or Firm* — Leydig, Voit & Mayer, Ltd.

(57) ABSTRACT

Embodiments of the present invention provide a method and an apparatus for transmitting channel state information. The method includes: sending a feedback indication message, a high-efficiency long training sequence, and a resource scheduling message, wherein the feedback indication message is used to indicate more than one target STAs that need to feed back channel state information, the high-efficiency long training sequence is used for determining the channel state information by the target STAs, and the first resource scheduling message is used to indicate a communication resource used by the target STAs when the target STAs feed back the channel state information; receiving the channel state information sent by the target STAs by using the communication resource.

20 Claims, 19 Drawing Sheets

(51) Int. Cl.
  *H04W 24/00* (2009.01)
  *H04B 7/0413* (2017.01)
  *H04L 1/00* (2006.01)

(56) References Cited

U.S. PATENT DOCUMENTS

| | | | |
|---|---|---|---|
| 2013/0223427 A1* | 8/2013 | Sohn, III | H04W 74/06 370/338 |
| 2014/0204891 A1* | 7/2014 | Park | H04W 56/00 370/329 |
| 2014/0334420 A1* | 11/2014 | You | H04L 25/0204 370/329 |
| 2014/0369302 A1* | 12/2014 | Abraham | H04L 5/0053 370/329 |
| 2015/0009899 A1* | 1/2015 | Abraham | H04B 7/0626 370/328 |
| 2015/0063128 A1* | 3/2015 | Garikipati | H04B 7/0417 370/252 |
| 2015/0110046 A1 | 4/2015 | Merlin et al. | |
| 2015/0311964 A1 | 10/2015 | Sohn et al. | |
| 2015/0327291 A1* | 11/2015 | Zhou | H04B 7/0617 370/329 |
| 2016/0072569 A1 | 3/2016 | Yang et al. | |
| 2016/0249303 A1* | 8/2016 | Kenney | H04W 24/08 |
| 2016/0295587 A1* | 10/2016 | Kwon | H04W 72/0446 |
| 2017/0033898 A1* | 2/2017 | Chun | H04W 84/12 |
| 2018/0138959 A1* | 5/2018 | Chun | H04B 7/0626 |
| 2018/0302130 A1* | 10/2018 | Wang | H04B 7/0417 |

FOREIGN PATENT DOCUMENTS

| | | |
|---|---|---|
| CN | 103001744 A | 3/2013 |
| CN | 103002471 A | 3/2013 |
| CN | 103202085 A | 7/2013 |
| CN | 104168050 A | 11/2014 |
| CN | 105991179 A | 10/2016 |
| EP | 2874459 A1 | 5/2015 |
| JP | 2013520143 A | 5/2013 |
| JP | 2013535879 A | 9/2013 |
| JP | 2016540411 A | 12/2016 |
| RU | 2546597 C2 | 4/2015 |
| WO | 2011103367 A1 | 8/2011 |
| WO | 2012006472 A2 | 1/2012 |
| WO | 2012093794 A2 | 7/2012 |
| WO | 2012149874 A1 | 11/2012 |
| WO | 2013037219 A1 | 3/2013 |
| WO | 2015057772 A1 | 4/2015 |

OTHER PUBLICATIONS

Xie et al.,"Scalable user selection for MU-MIMO networks," XP032613547 IEEE Conference on Computer Communications, Institute of Electrical and Electronics Engineers, New York, New York (2014).

Oscar et al.,"Scaling multi-user MIMO WLANs:The case for concurrent uplink control messages", 12th Annual IEEE International Conference on Sensing, Communication and Networking, XP032817377, Institute of Electrical and Electronics Engineers, New York, New York (2015).

Madhavan et al.,"Reducing Channel Sounding Protocol Overhead for 11ax," XP055461163-IEEE802.11-15/1097r0, Institute of Electrical and Electronics Engineers, New York, New York (Sep. 2015).

"Part 11: Wireless LAN Medium Access Control (MAC) and Physical Layer (PHY) Specifications," IEEE Computer Society, IEEE Std 802.11-2012, pp. x-2695, Institute of Electrical and Electronics Engineers, New York, New York (Mar. 29, 2012).

Madhavan, "Reducing Channel Sounding Protocol Overhead for 11ax," IEEE 802.11-15/1097r1, Institute of Electrical and Electronics Engineers, New York, New York (Sep. 2015).

JP/2017-568110, Notice of Rejection, dated Feb. 26, 2019.

CN/2015800811837, Search Report, dated Jul. 24, 2019.

U.S. Appl. No. 16/503,284, filed Jul. 3, 2019.

* cited by examiner

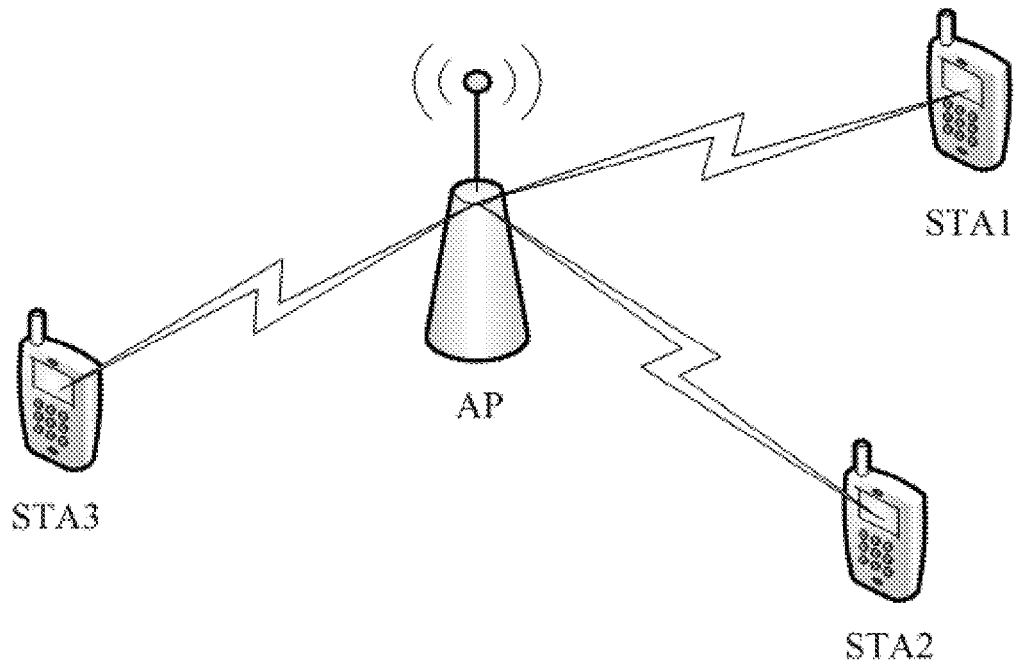

FIG. 1A

A station STA receives a feedback indication message, a high-efficiency long training sequence, and a first resource scheduling message that are sent by an access point AP, where the feedback indication message is used to indicate at least two target STAs that need to feed back channel state information to the AP, the high-efficiency long training sequence is used to determine first channel state information of the STA, and the first resource scheduling message is used to indicate a first communication resource used by the STA when the STA performs feedback according to the feedback indication message, the high-efficiency long training sequence, and the first resource scheduling message ⟿ 101

When parsing the feedback indication message and determining that the STA belongs to the target STAs, the STA sends an acknowledgement message to the AP by using the first communication resource, where the acknowledgement message is used to indicate that the feedback indication message, the high-efficiency long training sequence, and the first resource scheduling message have been received ⟿ 102

FIG. 1B

METHOD, ACCESS POINT, AND STATION FOR TRANSMITTING CHANNEL STATE INFORMATION

CROSS-REFERENCE TO RELATED APPLICATIONS

This application is a continuation of International Application No. PCT/CN2015/083186, filed on Jul. 2, 2015, the disclosure of which is hereby incorporated by reference in its entirety.

TECHNICAL FIELD

The present invention relates to the communications field, and more specifically, to a method, an access point, and a station for transmitting channel state information.

BACKGROUND

Currently, a multi-user multiple-input multiple-output (MU-MIMO, Multiuser Multiple Input Multiple Output) technology is known. In MU-MIMO, multi-user transmission is implemented by using multiple parallel channels in terms of a space dimension. However, in this manner, a transmit end or a receive end needs to have all or a part of channel state information. Otherwise, the receive end cannot correctly demodulate multiple effective signals, causing a transmission failure.

With development of a Wireless Local Area Network (WLAN) technology, it is hoped that the MU-MIMO technology can be applied to a WLAN. To simultaneously schedule multiple users for channel state information feedback, when a station (Station, STA) has a limited capability, an access point (AP, Access Point) may send a null data packet announcement (NDPA, Null Data Packet Announcement), a null data packet (NDP, Null Data Packet), and a beamforming report poll (Beamforming Report Poll, BF Report Poll) frame, so that the STA performs channel estimation according to information carried in the NDPA and a high-efficiency long training sequence (HE-LTF, high efficient long training filed) carried in the NDP, and feeds back channel state information to the AP within a time period.

However, more STAs are introduced in the 802.11ax standard, and some STAs cannot immediately perform feedback. For example, the STA cannot immediately perform feedback due to a limited capability, or the AP allocates insufficient resources. In the foregoing case, the STA cannot immediately feed back channel state information, and resources may be wasted because the AP waits for a long time to receive the channel state information; consequently, channel state information transmission efficiency is reduced.

SUMMARY

Embodiments of the present invention provide a method, an access point, and a station for transmitting channel state information, to improve channel state information transmission efficiency.

According to a first aspect, a method for transmitting channel state information is provided, where the method includes: receiving, by a station STA, a feedback indication message, a high-efficiency long training sequence, and a first resource scheduling message that are sent by an access point AP, where the feedback indication message is used to indicate at least two target STAs that need to feed back channel state information to the AP, the high-efficiency long training sequence is used to determine first channel state information of the STA, and the first resource scheduling message is used to indicate a first communication resource used by a STA when the STA performs feedback responding to the feedback indication message, the high-efficiency long training sequence, and the first resource scheduling message; and when the STA parses the feedback indication message and determines that the STA belongs to the target STAs, sending, by the STA, an acknowledgement message to the AP by using the first communication resource, where the acknowledgement message is used to indicate that the feedback indication message, the high-efficiency long training sequence, and the first resource scheduling message have been received.

According to a second aspect, a method for transmitting channel state information is provided, where the method includes: sending a feedback indication message, a high-efficiency long training sequence, and a first resource scheduling message, where the feedback indication message is used to indicate at least two target STAs that need to feed back channel state information, the high-efficiency long training sequence is used to determine first channel state information of the target STA, and the first resource scheduling message is used to indicate a first communication resource used by the target STA when the target STA performs feedback according to the feedback indication message, the high-efficiency long training sequence, and the first resource scheduling message; and receiving an acknowledgement message sent by the target STA by using the first communication resource, where the acknowledgement message is used to indicate that the target STA has received the feedback indication message, the high-efficiency long training sequence, and the first resource scheduling message.

According to a third aspect, a method for transmitting channel state information is provided, where the method includes: receiving, by a station STA, a first resource scheduling message, a first feedback indication message, and a first high-efficiency long training sequence that are sent by an access point AP according to first indication information, where the first feedback indication message is used to indicate at least two target stations STAs that need to feed back channel state information to the AP, the first resource scheduling message or the first feedback indication message includes the first indication information, the first indication information is used to instruct the STA whether to immediately feed back channel state information, the first high-efficiency long training sequence is used to determine first channel state information of the STA, the first resource scheduling message is used to indicate a first communication resource used by a STA when the STA feeds back second channel state information or an acknowledgement message, the second channel state information is a part or all of the first channel state information, and the acknowledgement message is used to indicate that the first feedback indication message, the first high-efficiency long training sequence, and the first resource scheduling message have been received; and when parsing the first feedback indication message and determining that the STA belongs to the target STAs, performing channel estimation according to the first high-efficiency long training sequence, to determine the first channel state information, and sending the second channel state information or the acknowledgement message to the AP by using the first communication resource.

According to a fourth aspect, a method for transmitting channel state information is provided, where the method includes: determining first indication information, where the first indication information is used to instruct at least two target stations STAs whether to immediately feed back channel state information, where the at least two target stations STAs need to feed back channel state information to an access point AP; sending a first resource scheduling message, a first feedback indication message, and a first high-efficiency long training sequence according to the first indication information, where the first resource scheduling message or the first feedback indication message includes the first indication information, the first feedback indication message is used to indicate the at least two target STAs that need to feed back channel state information to the AP, the first high-efficiency long training sequence is used to determine first channel state information of the target STA, the first resource scheduling message is used to indicate a first communication resource used by the target STA when the target STA feeds back second channel state information or an acknowledgement message, the second channel state information is a part or all of the first channel state information, and the acknowledgement message is used to indicate that the first feedback indication message, the first high-efficiency long training sequence, and the first resource scheduling message have been received; and receiving the second channel state information or the acknowledgement message that is sent by the target STA according to the first resource scheduling message, the first feedback indication message, and the first high-efficiency long training sequence by using the first communication resource.

According to a fifth aspect, a method for transmitting channel state information is provided, where the method includes: receiving, by a station STA, a feedback indication message, a high-efficiency long training sequence, and a first resource scheduling message that are sent by an access point AP, where the feedback indication message is used to indicate at least two target STAs that need to feed back channel state information to the AP, the high-efficiency long training sequence is used to determine first channel state information of the target STA, the first resource scheduling message is used to indicate a first communication resource used by the target STA when the target STA feeds back second channel state information, and the second channel state information is a part of the first channel state information; when parsing the feedback indication message and determining that the STA belongs to the target STAs, performing channel estimation according to the high-efficiency long training sequence, to obtain the first channel state information, and sending the second channel state information to the AP by using the first communication resource; receiving a first polling scheduling message and a second resource scheduling message that are sent by the AP, where the first polling scheduling message is used by the AP for requesting third channel state information from the STA, the first polling scheduling message includes segment information of the third channel state information in the first channel state information, the third channel state information is a part or all of the first channel state information from which the second channel state information is removed, and the second resource scheduling message is used to indicate a second communication resource used by a STA when the STA feeds back the third channel state information; and sending the third channel state information to the AP by using the second communication resource.

According to a sixth aspect, a method for transmitting channel state information is provided, where the method includes: sending a feedback indication message, a high-efficiency long training sequence, and a first resource scheduling message, where the feedback indication message is used to indicate at least two target STAs that need to feed back channel state information to the AP, the high-efficiency long training sequence is used to determine first channel state information of the target STA, the first resource scheduling message is used to indicate a first communication resource used by the target STA when the target STA feeds back second channel state information, and the second channel state information is a part of the first channel state information; receiving the second channel state information sent by the target STA by using the first communication resource; sending a first polling scheduling message and a second resource scheduling message, where the first polling scheduling message is used to request third channel state information from the target STA, the first polling scheduling message includes segment information of the third channel state information in the first channel state information, the third channel state information is a part or all of the first channel state information from which the second channel state information is removed, and the second resource scheduling message is used to indicate a second communication resource used by the target STA when the target STA feeds back the third channel state information; and receiving the third channel state information sent by the target STA by using the second communication resource.

According to a seventh aspect, a station for transmitting channel state information is provided, where the station includes: a first receiving unit, configured to receive a feedback indication message, a high-efficiency long training sequence, and a first resource scheduling message that are sent by an access point AP, where the feedback indication message is used to indicate at least two target stations STAs that need to feed back channel state information to the AP, the high-efficiency long training sequence is used to determine first channel state information of the STA, and the first resource scheduling message is used to indicate a first communication resource used by a STA when the STA performs feedback responding to the feedback indication message, the high-efficiency long training sequence, and the first resource scheduling message; and a first sending unit, configured to: when the feedback indication message received by the receiving unit is parsed and it is determined that the STA belongs to the target STAs, send an acknowledgement message to the AP by using the first communication resource, where the acknowledgement message is used to indicate that the feedback indication message, the high-efficiency long training sequence, and the first resource scheduling message have been received.

According to an eighth aspect, an access point for transmitting channel state information is provided, where the station includes: a first sending unit, configured to send a feedback indication message, a high-efficiency long training sequence, and a first resource scheduling message to a station STA, where the feedback indication message is used to indicate at least two target STAs that need to feed back channel state information, the high-efficiency long training sequence is used to determine first channel state information of the target STA, and the first resource scheduling message is used to indicate a first communication resource used by the target STA when the target STA performs feedback according to the feedback indication message, the high-efficiency long training sequence, and the first resource scheduling message; and a first receiving unit, configured to receive an acknowledgement message sent by the target STA by using the first communication resource indicated by the first resource scheduling message sent by the first sending unit, where the acknowledgement message is used to indicate that the target STA has received the feedback indication message, the high-efficiency long training sequence, and the first resource scheduling message.

According to a ninth aspect, a station for transmitting channel state information is provided, where the station includes: a first receiving unit, configured to receive a first resource scheduling message, a first feedback indication message, and a first high-efficiency long training sequence that are sent by an access point AP according to first indication information, where the first feedback indication message is used to indicate at least two target stations STAs that need to feed back channel state information to the AP, the first resource scheduling message or the first feedback indication message includes the first indication information, the first indication information is used to instruct the STA whether to immediately feed back channel state information, the first high-efficiency long training sequence is used to determine first channel state information of the STA, the first resource scheduling message is used to indicate a first communication resource used by a STA when the STA feeds back second channel state information or an acknowledgement message, the second channel state information is a part or all of the first channel state information, and the acknowledgement message is used to indicate that the first feedback indication message, the first high-efficiency long training sequence, and the first resource scheduling message have been received; and a first sending unit, configured to: when the first feedback indication message received by the first receiving unit is parsed and it is determined that the STA belongs to the target STAs, perform channel estimation according to the first high-efficiency long training sequence received by the first receiving unit, to determine the first channel state information, and send the second channel state information or the acknowledgement message to the AP by using the first communication resource indicated by the first resource scheduling message received by the first receiving unit.

According to a tenth aspect, an access point for transmitting channel state information is provided, where the access point includes: a determining unit, configured to determine first indication information, where the first indication information is used to instruct at least two target stations STAs whether to immediately feed back channel state information, where the at least two target stations STAs need to feed back channel state information to the access point AP; a first sending unit, configured to send a first resource scheduling message, a first feedback indication message, and a first high-efficiency long training sequence to a target STA according to the first indication information determined by the determining unit, where the first resource scheduling message or the first feedback indication message includes the first indication information, the first feedback indication message is used to indicate the at least two target stations STAs that need to feed back channel state information to the AP, the first high-efficiency long training sequence is used to determine first channel state information of the target STA, the first resource scheduling message is used to indicate a first communication resource used by the target STA when the target STA feeds back second channel state information or an acknowledgement message, the second channel state information is a part or all of the first channel state information, and the acknowledgement message is used to indicate that the first feedback indication message, the first high-efficiency long training sequence, and the first resource scheduling message have been received; and a first receiving unit, configured to receive the second channel state information or the acknowledgement message that is sent by the target STA by using the first communication resource and according to the first resource scheduling message, the first feedback indication message, and the first high-efficiency long training sequence that are sent by the first sending unit.

According to an eleventh aspect, a station for transmitting channel state information is provided, where the station includes: a first receiving unit, configured to receive a feedback indication message, a high-efficiency long training sequence, and a first resource scheduling message that are sent by an access point AP, where the feedback indication message is used to indicate at least two target STAs that need to feed back channel state information to the AP, the high-efficiency long training sequence is used to determine first channel state information of the STA, the first resource scheduling message is used to indicate a first communication resource used by a STA when the STA feeds back second channel state information, and the second channel state information is a part of the first channel state information; a first sending unit, configured to: when the feedback indication message received by the first receiving unit is parsed and it is determined that the STA belongs to the target STAs, perform channel estimation according to the high-efficiency long training sequence received by the first receiving unit, to obtain the first channel state information, and send the second channel state information to the AP by using the first communication resource indicated by the first resource scheduling message received by the first receiving unit; a second receiving unit, configured to receive a first polling scheduling message and a second resource scheduling message that are sent by the AP, where the first polling scheduling message is used by the AP for requesting third channel state information from the STA, the first polling scheduling message includes segment information of the third channel state information in the first channel state information, the third channel state information is a part or all of the first channel state information from which the second channel state information is removed, and the second resource scheduling message is used to indicate a second communication resource used by a STA when the STA feeds back the third channel state information; and a second sending unit, configured to send the third channel state information to the AP by using the second communication resource indicated by the second resource scheduling message received by the second receiving unit.

According to a twelfth aspect, an access point for transmitting channel state information is provided, where the access point includes: a first sending unit, configured to send a feedback indication message, a high-efficiency long training sequence, and a first resource scheduling message, where the feedback indication message is used to indicate at least two target STAs that need to feed back channel state information to the AP, the high-efficiency long training sequence is used to determine first channel state information of the target STA, the first resource scheduling message is used to indicate a first communication resource used by the target STA when the target STA feeds back second channel state information, and the second channel state information is a part of the first channel state information; a first receiving unit, configured to receive the second channel state information sent by the target STA by using the first communication resource indicated by the first resource scheduling message sent by the first sending unit; a second sending unit, configured to send a first polling scheduling message and a second resource scheduling message, where the first polling scheduling message is used to request third channel state information from the target STA, the first polling scheduling message includes segment information of the third channel state information in the first channel state information, the third channel state information is a part or all of the first channel state information from which the second channel state information is removed, and the second resource scheduling message is used to indicate a second communication resource used by the target STA when the target STA feeds back the third channel state information; and a second receiving unit, configured to receive the third channel state information sent by the target STA by using the second communication resource indicated by the second resource scheduling message sent by the second sending unit.

In the embodiments of the present invention, an access point sends a resource scheduling message, a feedback indication message, and a high-efficiency long training sequence to a station, to schedule multiple stations to transmit channel state information; and the station feeds back an acknowledgement message to the access point. In this way, resource waste caused when some stations cannot immediately perform feedback can be avoided, and channel state information transmission efficiency can be improved.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1A is a schematic diagram of a scenario of a communications system to which an embodiment of the present invention may be applied;

FIG. 1B is a schematic flowchart of a method for transmitting channel state information according to an embodiment of the present invention;

DESCRIPTION OF EMBODIMENTS

Figure 2:
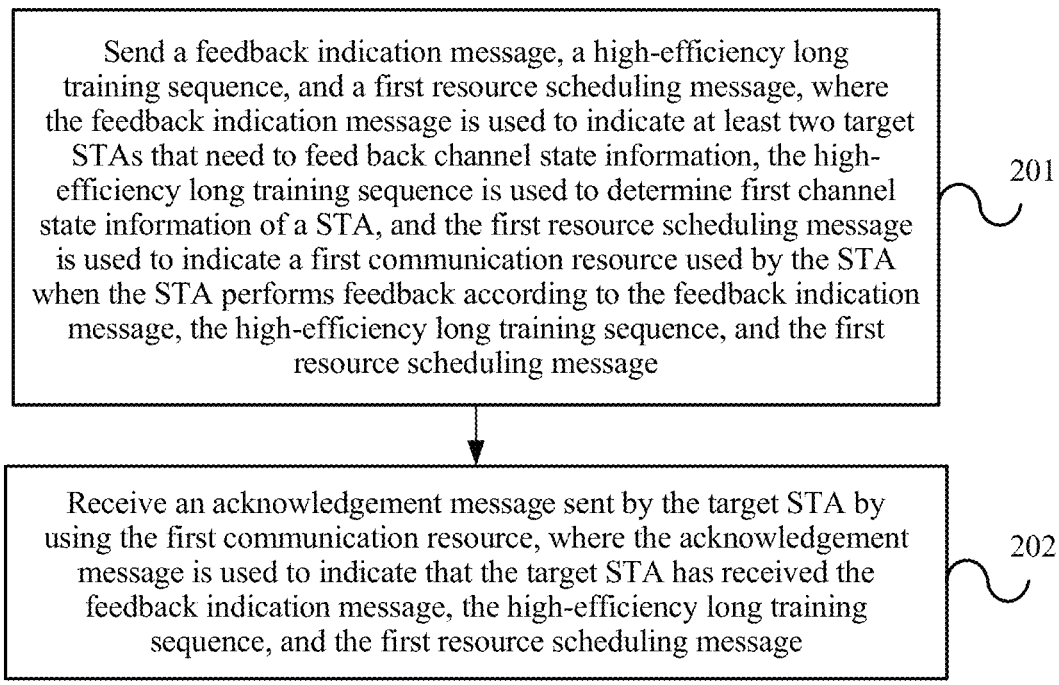
FIG. 2 is a schematic flowchart of a method for transmitting channel state information according to another embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Technical solutions of the present invention may be applied to various communications systems in which channel state information needs to be fed back to perform data transmission, for example, a wireless local area network (WLAN, Wireless Local Area Network) to which a MU-MIMO technology is applied, for example, Wireless Fidelity (Wi-Fi, Wireless Fidelity).

In the WLAN, a station (STA, Station) may also be referred to as a system, a subscriber unit, an access terminal, a mobile station, a remote station, a remote terminal, a mobile device, a user terminal, a terminal, a wireless communications device, a user agent, a user apparatus, or UE (User Equipment, user equipment). The STA may be a cellular phone, a cordless phone, a SIP (Session Initiation Protocol, Session Initiation Protocol) phone, a WLL (Wireless Local Loop, wireless local loop) station, a PDA (Personal Digital Assistant, personal digital assistant), a handheld device having a wireless local area network (for example, Wi-Fi) communication function, a computation device, or another processing device connected to a wireless modem.

In addition, in the WLAN, an access point (AP, Access Point) may be used to communicate with an access terminal by using a wireless local area network, and transmit data of the access terminal to a network side or transmit data from a network side to the access terminal.

For ease of understanding and description, as an example instead of a limitation, the following describes processes and actions of executing a method and an apparatus for transmitting channel state information of the present invention in a Wi-Fi system.

FIG. 1A is a schematic diagram of a scenario of a communications system to which an embodiment of the present invention may be applied.

The communications system in FIG. 1A includes one AP and three STAs (for example, a STA 1, a STA 2, and a STA 3 in FIG. 1A). The AP may communicate with the STA 1, the STA 2, and the STA 3. In the system, the AP may schedule multiple STAs to feed back and transmit channel state information. It should be noted that there may be two or more STAs.

Method Embodiment 1

FIG. 1B is a schematic flowchart of a method for transmitting channel state information according to an embodiment of the present invention. The method in FIG. 1B may be executed by a station.

101. The station STA receives a feedback indication message, a high-efficiency long training sequence, and a first resource scheduling message that are sent by an access point AP, where the feedback indication message is used to indicate at least two target STAs that need to feed back channel state information to the AP, the high-efficiency long training sequence is used to determine first channel state information of the target STA, and the first resource scheduling message is used to indicate a first communication resource used by the target STA when the target STA performs feedback according to the feedback indication message, the high-efficiency long training sequence, and the first resource scheduling message.

102. When the STA parses the feedback indication message and determines that the STA belongs to the target STAs, the STA sends an acknowledgement message to the AP by using the first communication resource, where the acknowledgement message is used to indicate that the feedback indication message, the high-efficiency long training sequence, and the first resource scheduling message have been received.

In this embodiment of the present invention, an access point sends a resource scheduling message, a feedback indication message, and a high-efficiency long training sequence to a station, to schedule multiple stations to transmit channel state information; and the station feeds back an acknowledgement message to the access point. In this way, resource waste caused when some stations cannot immediately perform feedback can be avoided, and channel state information transmission efficiency can be improved.

In an embodiment of the present invention, the access point may send a feedback indication message, a high-efficiency long training sequence, and a resource scheduling message (such as the first resource scheduling message) to the station, to trigger the station to feed back channel state information of the station to the access point. The station may receive the feedback indication message, the high-efficiency long training sequence, and the resource scheduling message that are sent by the access point, and when determining that the station belongs to target stations, the station feeds back an acknowledgement message to the access point, to indicate that the feedback indication message, the high-efficiency long training sequence, and the resource scheduling message have been received. Generally, when the station cannot immediately feed back channel state information, the station may feed back an acknowledgement message to the access point. When the station can immediately feed back channel state information, the station may directly return channel state information to the access point, or may return an acknowledgement message first. The channel state information may be fed back by using a beamforming report (BF Report) frame as a carrier.

In an embodiment of the present invention, the acknowledgement message does not carry channel state information, and is only used to indicate that the feedback indication message, the high-efficiency long training sequence, and the resource scheduling message have been received. In other words, the acknowledgement message is used to explicitly indicate that the feedback indication message, the high-efficiency long training sequence, and the resource scheduling message have been received, and subsequently, the access point further needs to trigger the station, so that the station can feed back the channel state information. The acknowledgement message may be an acknowledgement (Acknowledgement, ACK) frame, or may be a block acknowledgement (Block Acknowledgement, BA) frame.

In an embodiment of the present invention, when multiple stations feed back channel state information to the access point, to avoid communication interference between the stations, communication resources used by the multiple stations are different from each other in terms of at least one of time domain resources, frequency domain resources, or space domain resources. For example, the communication resources used by the multiple stations may be the same in terms of time domain resources but do not interfere with each other (for example, orthogonal) in terms of frequency domain resources, or may be the same in terms of time domain resources but do not interfere with each other (for example, orthogonal) in terms of space domain resources.

Specifically, the feedback indication message may be used to indicate the at least two target STAs that need to feed back channel state information to the access point. The feedback indication message may include identifier information of the target station that needs to perform feedback, a feedback type (such as single-user feedback or multi-user feedback), a column quantity that needs to be fed back, and the like. Content and a form of the feedback indication message may be similar to those of information borne in an NDPA frame that is sent by an AP in a broadcast manner in the prior art. To avoid repetition, detailed description thereof is omitted herein. The station may perform channel estimation according to the high-efficiency long training sequence, to determine channel state information of the target STA. A symbol quantity of the high-efficiency long training sequence is usually equal to an antenna quantity of the access point, so that the station may fully measure a channel. A function, a generation method, and a use method of the high-efficiency long training sequence are similar to those of a long training sequence, in an NDP in the prior art, that is used for channel estimation. To avoid repetition, detailed description thereof is omitted herein. The resource scheduling message is used to indicate a communication resource (such as the first communication resource) used by each target STA when the target STA performs uplink multi-user feedback. For example, the communication resource may include resource block location information, resource parameter information, and the like that are used when the station performs uplink data transmission. The communication resources may be frequency domain resources that are corresponding to a same time period and that do not interfere with each other (for example, orthogonal) in a frequency domain, so that channel state information can be transmitted between the AP and multiple target STAs in a manner such as orthogonal frequency division multiple access (OFDMA, Orthogonal Frequency Division Multiple Access).

In this embodiment of the present invention, the access point may send, in a broadcast manner, feedback indication messages, high-efficiency long training sequences, and resource scheduling messages to multiple stations by sending frames combining NDPAs, NDPs, and trigger frames. However, a specific manner of combining the NDPA, the NDP, and the trigger frame is not limited. For example, the access point may send the NDPAs first, and then send frames combining the NDPs and the trigger frames (trigger frame). The NDPAs may include the feedback indication messages, and the frames combining the NDPs and the trigger frames may include the resource scheduling messages and the high-efficiency long training sequences that are used by the multiple stations for feeding back channel state information. The resource scheduling message may be borne in a high-efficiency signal B field (HE-SIG-B, High Efficiently Signal B Field), and the high-efficiency long training sequence may be borne in a high-efficiency long training sequence (HE-LTF, high efficient long training filed) field in a same frame (or a same data packet).

For another example, the access point may send a frame combining the NDPA frame and the trigger frame first, and then send the NDP. The frame combining the NDPA frame and the trigger frame may include a feedback indication message and a resource scheduling message for each station. For the frame combining the NDPA frame and the trigger frame, an information field of each station may be introduced to the NDPA, to indicate the feedback indication message corresponding to each station. The feedback indication message may include a parameter for estimating or feeding back channel state information by each STA. The resource scheduling message may include resource block location information, resource parameter information, and the like that are used when each station performs uplink transmission, for example, a space-time stream quantity. The NDP may include a same quantity of high-efficiency long training sequences as the antenna quantity of the access point.

For another example, the access point may directly send a frame combining the NDPA, the NDP, and the trigger frame to the station. The feedback indication message included in the NDPA and the resource scheduling message included in the trigger frame may be borne in a HE-SIG-B field of the combination frame, and the high-efficiency long training sequence may be borne in a HE-LTF field of the same frame (or a same data packet). In addition, the resource scheduling message may be specifically borne in a HE-SIG-B field of the NDP, the high-efficiency long training sequence is specifically borne in a HE-LTF field of the same NDP frame, and the feedback indication message may be borne in a field that is located after the HE-LTF field of the same NDP frame.

The frame combining two or three frames mentioned in this embodiment of the present invention may be obtained by expanding or reusing an existing frame structure, or may be obtained by designing a new frame structure, so that the combination frame embodies a function required in this embodiment of the present invention. The combination frame may include a field used to indicate that a special function has been assigned to the combination frame, and a specific field may be used to indicate a type of the combination frame. In other words, the combination frame may be located in different fields of a same data packet, or the combination frame may be borne in a same MAC frame, or a combination of the foregoing two cases exists. The frame combining three frames may be a combination frame including any two or all of the three frames.

In this embodiment of the present invention, after receiving the frame combining the NDPA, the NDP, and the trigger frame, the station may determine, according to a capability of the station, whether to immediately perform feedback. When the station can immediately perform feedback, the station may feed back channel state information to the access point an X interframe space (X Interframe Space, XIFS) later. When the station is incapable of immediately feeding back channel state information, the station may feed back an acknowledgement message to the access point first, to indicate that the foregoing combination frame has been received, and estimate channel state information.

In this embodiment of the present invention, a specific reason why the station cannot immediately perform feedback is not limited. For example, when the station has a limited capability, or a priority for buffering channel state information by the station is less than a first threshold, or a size of a resource block in a communication resource allocated by the access point to the station is less than a threshold, it may be considered that the station cannot immediately perform feedback.

Optionally, the station may determine the first channel state information according to the high-efficiency long training sequence.

A beamforming report is generally a frame that carries a large quantity of bytes, but the acknowledgement message is generally a short frame that has only several bytes or dozens of bytes. When the access point allocates a relatively large resource block to the station, according to the resource scheduling message and data buffered by the station, the station may transmit another frame when feeding back the acknowledgement message to the access point. For example, the ACK frame and a data frame may be sent together by means of aggregation. For another example, when feeding back the acknowledgement message, the station may send a resource allocation request message together, to report uplink data buffering information of the station to the access point, so that the access point learns that the station needs to transmit uplink data and learns a resource required by the station. For another example, when feeding back the acknowledgement message, the station may report together, to the access point, how long it needs to take before the station feeds back channel state information. In this way, when feeding back the acknowledgement message to the access point, the station feeds back other information together, to further improve resource transmission efficiency and avoid resource waste.

Optionally, after receiving the feedback indication message, the high-efficiency long training sequence, and the resource scheduling message, the target station may determine whether to immediately feed back the channel state information (such as the first channel state information). When the target STA cannot immediately feed back the channel state information, an X interframe space XIFS later after receiving the feedback indication message, the high-efficiency long training sequence, and the first resource scheduling message, the target STA may send the acknowledgement message to the AP by using the first communication resource.

Optionally, the station may receive a second resource scheduling message sent by the AP, where the second resource scheduling message is used to indicate a second communication resource used by the target STA when the target STA feeds back second channel state information; and send the second channel state information to the AP by using the second communication resource, where the second channel state information is a part or all of the first channel state information.

Specifically, a time period later after receiving the acknowledgement message, the access point may send a resource scheduling message (such as the second resource scheduling message) again to the target station. The second resource scheduling message is used to indicate a communication resource (such as the second communication resource) used by the target STA when the target STA feeds back channel state information (such as the second channel state information). After receiving the second resource scheduling message, the station may send, to the access point by using the second communication resource, a part or all of channel state information that is not successfully fed back.

After the station receives the second resource scheduling message, when the station sends, to the access point by using the second communication resource, a part of channel state information that is not successfully fed back, the access point may continue to send a polling scheduling message and a resource scheduling message to the station, so that the station can continue to feed back channel state information to the access point, until channel state information is fully fed back. The polling scheduling message may be borne in a beamforming report poll frame, and the beamforming report poll frame may include an indication field used to indicate that content needs to continue to be transmitted. When the station cannot fully feed back a beamforming report to the access point at one time, the station may divide the beamforming report into several segments (segment), and report, to the access point during each feedback, a quantity of segments that are not fed back. The access point may send a beamforming report poll frame to the station according to the feedback of the station and a receiving situation (for example, a resource block size of a communication resource allocated by the access point, or whether the access point successfully receives the requested acknowledgement message or channel state information) of the access point, to indicate which segments the station needs to feed back during next transmission.

For example, the station may receive a first polling scheduling message and a third resource scheduling message that are sent by the AP. The first polling scheduling message is used by the AP for requesting third channel state information from the target STA. The first polling scheduling message includes segment information of the third channel state information in the first channel state information. The third channel state information is a part or all of the first channel state information from which the second channel state information is removed. The third resource scheduling message is used to indicate a third communication resource used by the target STA when the target STA feeds back the third channel state information. The station may send the third channel state information to the AP by using the third communication resource.

The segment information of the third channel state information in the first channel state information may be indication information indicating which segments need to be fed back when the third channel state information is being fed back, or may indicate which segments need to be fed back.

In this embodiment of the present invention, a specific manner of combining a polling scheduling message (such as the first polling scheduling message) and a resource scheduling message (such as the third resource scheduling message) is not specifically limited. A structure of a frame combining the polling scheduling message and the resource scheduling message may be obtained by reusing an existing frame structure, for example, by expanding and reusing an existing trigger frame or beamforming report poll frame; or may be obtained by designing a new frame structure that meets a function.

Optionally, the first polling scheduling message and the third resource scheduling message may be borne in a same data packet or a same frame of a same data packet.

The polling scheduling message and the resource scheduling message may be borne in a same frame designed based on a trigger frame. The frame may include a frame control (Frame Control) field, a beamforming report poll type indication (BF Report Poll type indication) field, a resource allocation reuse indication (Resource allocation reuse indication) field, a station identifier (Station Identifier) field, a resource allocation information (Resource allocation information) field, and a feedback segment retransmission bitmap (Feedback segment Retransmission Bitmap) field. The frame control field may be used to indicate that the frame may be used for resource scheduling. The beamforming report poll type indication field may be used to indicate a type of the frame. Specifically, the feedback segment retransmission bitmap field may be used to indicate which segments are to be transmitted. The resource allocation information field may include a resource scheduling message. The resource allocation reuse indication field may be used to indicate whether a communication resource indicated by the frame is the same as a communication resource used in previous transmission. When the communication resource indicated by the frame is the same as the communication resource used in the previous transmission, the resource allocation information field may not be required. Instead, the communication resource used in the previous transmission is directly used for transmission. When the communication resource indicated by the frame is different from the communication resource used in the previous transmission, a communication resource indicated by the resource scheduling message included in the resource allocation information field in the frame may be used for transmission. The station identifier field is used to indicate a station that needs to feed back channel state information to an access point.

For example, the first polling scheduling message and the third resource scheduling message may be borne in a trigger frame of a same data packet. The trigger frame may include a first beamforming report poll type indication field and a first feedback segment retransmission bitmap field. The trigger frame may further include at least one of a first resource allocation information field or a first resource allocation reuse indication field. The third resource scheduling message is located in the first resource allocation information field. The first polling scheduling message is located in the first feedback segment retransmission bitmap field. The first resource allocation reuse indication field is used to indicate whether the third resource scheduling message is the same as the second resource scheduling message. When the third resource scheduling message is the same as the second resource scheduling message, the third channel state information is sent to the AP by using the second communication resource.

Optionally, the trigger frame may further include an identifier field of the STA.

For another example, the first polling scheduling message and the third resource scheduling message are borne in a beamforming report poll BF Report Poll frame of a same data packet. The BF Report Poll frame may include a receiver address field, a second feedback segment retransmission bitmap field, and a third feedback segment retransmission bitmap field. The BF Report Poll frame may further include at least one of a second resource allocation information field or a second resource allocation reuse indication field. The third resource scheduling message is located in the second resource allocation information field. The first polling scheduling message is located in the third feedback segment retransmission bitmap field. Indication information of the third resource scheduling message is located in the second resource allocation reuse indication field.

A frame control field may be used to indicate that the frame may be used for performing polling on a beamforming report. An association address field is used to indicate an identifier of a polled station. A feedback segment retransmission bitmap field in original beamforming report poll frame fields may be used to indicate that a type of the frame is a frame combining a beamforming report poll frame and a trigger frame. A resource allocation information field may include a resource scheduling message. A resource allocation reuse indication field may be used to indicate whether a communication resource indicated by the frame is the same as a communication resource used in previous transmission. When the communication resource indicated by the frame is the same as the communication resource used in the previous transmission, the resource allocation information field may not be required. Instead, the communication resource used in the previous transmission is directly used for transmission. When the communication resource indicated by the frame is different from the communication resource used in the previous transmission, a communication resource indicated by the resource scheduling message included in the resource allocation information field in the frame may be used for transmission. The third feedback segment retransmission bitmap field is a feedback segment retransmission bitmap field that is in a one-to-one correspondence with each station.

Optionally, the BF Report Poll frame may further include an identifier field of the STA.

A specific manner of indicating that the reused frame or the designed new frame is a frame used to trigger multi-user channel state information transmission is not limited in this embodiment of the present invention.

In an embodiment of the present invention, that the BF Report Poll frame is a poll frame used to trigger multi-user channel state information transmission may be indicated in any one of the following manners: the receiver address field, the second feedback segment retransmission bitmap field, or a length of the BF Report Poll frame.

For example, the receiver address field may be changed from a Media Access Control (Media Access Control, MAC for short) address of an original frame to a broadcast MAC address or a specified address, to indicate that the frame is a frame that combines a BF Report Poll frame and a trigger frame and is used to trigger multi-user channel state information transmission.

In an embodiment of the present invention, the second feedback segment retransmission bitmap field may be used to indicate that the BF Report Poll frame is used to trigger multi-user channel state information transmission. For example, the second feedback segment retransmission bitmap field may be set to 0, to indicate that the frame is a frame that combines a BF Report Poll frame and a trigger frame and is used to trigger multi-user channel state information transmission.

In an embodiment of the present invention, a length of a frame may be used to indicate the type of the frame. Generally, in the 802.11ac standard, the length of the BF Report Poll frame is fixed. Therefore, the length of the frame may be used to indicate that the frame is a frame that combines the BF Report Poll frame and a trigger frame and is used to trigger multi-user channel state information transmission.

In addition, a new type of MAC frame may be defined to clearly indicate that the frame is a frame combining a BF Report Poll frame and a trigger frame.

In this embodiment of the present invention, one station is used as an example for illustration purposes, and each station may determine, according to a capability of the station, to feed back an acknowledgement message or channel state information.

In the foregoing FIG. 1B, a method for transmitting channel state information according to an embodiment of the present invention is described in detail from a perspective of a station. The following describes, from a perspective of an access point, a method for transmitting channel state information according to an embodiment of the present invention.

Method Embodiment 2

FIG. 2 is a schematic flowchart of a method for transmitting channel state information according to another embodiment of the present invention. The method in FIG. 2 may be executed by an access point.

201. Send a feedback indication message, a high-efficiency long training sequence, and a first resource scheduling message to a station STA, where the feedback indication message is used to indicate at least two target STAs that need to feed back channel state information, the high-efficiency long training sequence is used to determine first channel state information of the target STA, and the first resource scheduling message is used to indicate a first communication resource used by the target STA when the target STA performs feedback according to the feedback indication message, the high-efficiency long training sequence, and the first resource scheduling message.

202. Receive an acknowledgement message sent by the target STA by using the first communication resource, where the acknowledgement message is used to indicate that the target STA has received the feedback indication message, the high-efficiency long training sequence, and the first resource scheduling message.

In this embodiment of the present invention, an access point sends a resource scheduling message, a feedback indication message, and a high-efficiency long training sequence to a station, to schedule multiple stations to transmit channel state information; and the station feeds back an acknowledgement message to the access point. In this way, resource waste caused when some stations cannot immediately perform feedback can be avoided, and channel state information transmission efficiency can be improved.

Optionally, in an embodiment of the present invention, the receiving an acknowledgement message sent by the target STA by using the first communication resource includes: receiving the acknowledgement message that is sent, by using the first communication resource, by the target STA an X interframe space XIFS later after the target STA receives the feedback indication message, the high-efficiency long training sequence, and the first resource scheduling message, where the target STA cannot immediately feed back the first channel state information.

Optionally, in an embodiment of the present invention, the method further includes: sending a second resource scheduling message, where the second resource scheduling message is used to indicate a second communication resource used by the target STA when the target STA feeds back second channel state information; and receiving the second channel state information sent by the target STA by using the second communication resource, where the second channel state information is a part or all of the first channel state information.

Optionally, in an embodiment of the present invention, the method further includes: sending a first polling scheduling message and a third resource scheduling message, where the first polling scheduling message is used to request third channel state information from the target STA, the first polling scheduling message includes segment information of the third channel state information in the first channel state information, the third channel state information is a part or all of the first channel state information from which the second channel state information is removed, and the third resource scheduling message is used to indicate a third communication resource used by the target STA when the target STA feeds back the third channel state information; and receiving the third channel state information sent by the target STA by using the third communication resource.

Optionally, in an embodiment of the present invention, the first polling scheduling message and the third resource scheduling message are borne in a same data packet.

Optionally, in an embodiment of the present invention, the first polling scheduling message and the third resource scheduling message are borne in a trigger frame of a same data packet. The trigger frame includes a first beamforming report poll type indication field and a first feedback segment retransmission bitmap field. The trigger frame further includes at least one of a first resource allocation information field or a first resource allocation reuse indication field. The third resource scheduling message is located in the first resource allocation information field. The first polling scheduling message is located in the first feedback segment retransmission bitmap field. The first resource allocation reuse indication field is used to indicate whether the third resource scheduling message is the same as the second resource scheduling message.

Optionally, in an embodiment of the present invention, the trigger frame further includes an identifier field of the STA.

Optionally, in an embodiment of the present invention, the first polling scheduling message and the third resource scheduling message are borne in a beamforming report poll BF Report Poll frame of a same data packet. The BF Report Poll frame may include a receiver address field, a second feedback segment retransmission bitmap field, and a third feedback segment retransmission bitmap field. The BF Report Poll frame may further include at least one of a second resource allocation information field or a second resource allocation reuse indication field. The third resource scheduling message is located in the second resource allocation information field. The first polling scheduling message is located in the third feedback segment retransmission bitmap field. Indication information of the third resource scheduling message is located in the second resource allocation reuse indication field.

Optionally, in an embodiment of the present invention, the BF Report Poll frame further includes an identifier field of the STA.

Optionally, in an embodiment of the present invention, that the BF Report Poll frame is a poll frame used to trigger multi-user channel state information transmission is indicated in any one of the following manners: the receiver address field, the second feedback segment retransmission bitmap field, or a length of the BF Report Poll frame.

Optionally, in an embodiment of the present invention, the target STA that cannot immediately feed back the first channel state information meets at least one of the following conditions: the target STA has a limited capability, a priority for buffering the first channel state information by the target STA is less than a first threshold, or a size of a resource block in the first communication resource is less than a threshold.

The method for transmitting channel state information according to this embodiment of the present invention may be executed by the access point, and the access point may execute a corresponding procedure that is executed by an access point and that follows the embodiment in FIG. 1B. For brevity, details are not described herein again.

Figure 3:
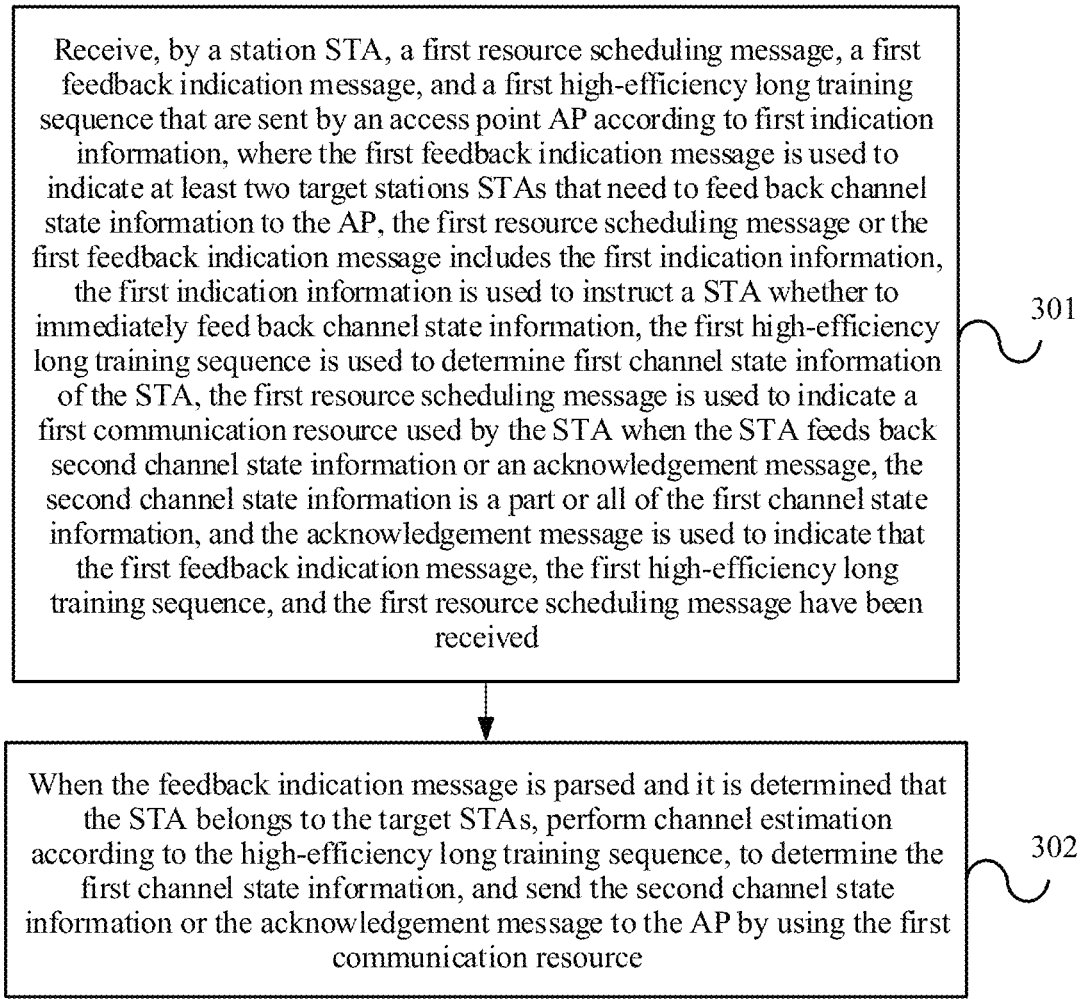
FIG. 3 is a schematic flowchart of a method for transmitting channel state information according to still another embodiment of the present invention.
Figure 4:
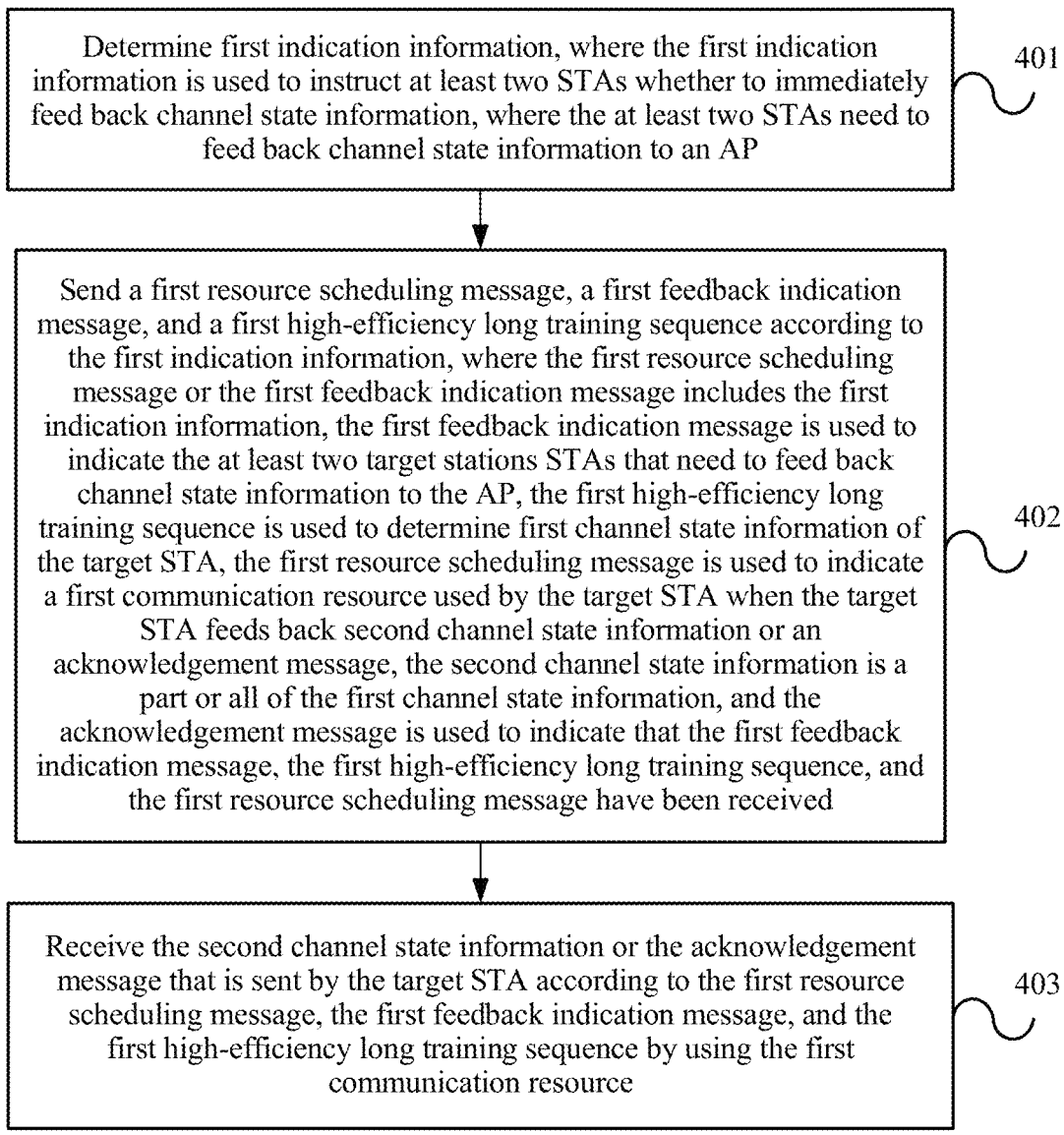
FIG. 4 is a schematic flowchart of a method for transmitting channel state information according to still another embodiment of the present invention.

With reference to FIG. 1B and FIG. 2, the foregoing describes in detail that a station determines feedback content after the station receives a feedback indication message, a high-efficiency long training sequence, and a resource scheduling message. With reference to FIG. 3 and FIG. 4, the following describes in detail that an access point determines feedback content according to capability information reported by a station when the access point sends a feedback indication message, a high-efficiency long training sequence, and a resource scheduling message.

Method Embodiment 3

FIG. 3 is a schematic flowchart of a method for transmitting channel state information according to still another embodiment of the present invention. The method in FIG. 3 may be executed by a station.

301. Receive a first resource scheduling message, a first feedback indication message, and a first high-efficiency long training sequence that are sent by an access point AP according to first indication information, where the first feedback indication message is used to indicate at least two target stations STAs that need to feed back channel state information to the AP, the first resource scheduling message or the first feedback indication message includes the first indication information, the first indication information is used to instruct the target STA whether to immediately feed back channel state information, the first high-efficiency long training sequence is used to determine first channel state information of the target STA, the first resource scheduling message is used to indicate a first communication resource used by the target STA when the target STA feeds back second channel state information or an acknowledgement message, the second channel state information is a part or all of the first channel state information, and the acknowledgement message is used to indicate that the first feedback indication message, the first high-efficiency long training sequence, and the first resource scheduling message have been received.

302. When the first feedback indication message is parsed and it is determined that the STA belongs to the target STAs, perform channel estimation according to the first high-efficiency long training sequence, to determine the first channel state information, and send the second channel state information or the acknowledgement message to the AP by using the first communication resource.

In this embodiment of the present invention, an access point sends a resource scheduling message, a feedback indication message, and a high-efficiency long training sequence to a station, to schedule multiple stations to transmit channel state information, and the access point may instruct the station whether to immediately perform feedback; and the station may feed back channel state information or an acknowledgement message to the access point according to an instruction of the access point. In this way, resource waste caused when some stations cannot immediately perform feedback can be avoided, and channel state information transmission efficiency can be improved.

In an embodiment of the present invention, the access point may receive capability information that is reported by the station and is about whether the station is capable of immediately performing feedback. After receiving the capability information, the access point determines, according to the capability information and a situation of the access point, indication information that is used to instruct the station whether to immediately perform feedback. After determining the indication information, the access point may add the indication information to a feedback indication message or a resource scheduling message, and the access point may send the feedback indication message, a high-efficiency long training sequence, and the resource scheduling message to the station, to trigger the station to feed back channel state information of the station to the access point. After receiving the feedback indication message, the high-efficiency long training sequence, and the resource scheduling message, the station may feed back channel state information or an acknowledgement message to the access point according to the indication information.

Optionally, when the first indication information instructs the target STA not to immediately feed back channel state information, the STA receives the first resource scheduling message an X interframe space XIFS later after receiving the first feedback indication message and the first high-efficiency long training sequence that are sent by the AP. The first feedback indication message includes the first indication information. An X interframe space XIFS later after receiving the first resource scheduling message, the station sends the second channel state information to the AP according to the first resource scheduling message, the first feedback indication message, and the first high-efficiency long training sequence by using the first communication resource.

When the indication information (such as the first indication information) sent by the access point instructs the station not to immediately perform feedback, the access point may send an NDPA and an NDP to the station first, where the NDPA may be used to indicate that current feedback is non-immediate feedback. After receiving the NDPA and the NDP, the station does not need to immediately perform feedback. Further, the access point sends a resource scheduling message (such as the first resource scheduling message) to the station an XIFS later. After receiving the resource scheduling message sent by the access point, the station may feed back channel state information (such as the second channel state information) to the access point.

The station may feed back a part or all of channel state information to the access point. That is, the station may feed back channel state information to the access point at one time, or may perform feedback two times or multiple times. For example, if the first channel state information is all channel state information obtained by the station by means of channel estimation, the second channel state information may be a part or all of the first channel state information.

After the access point receives the second channel state information, if the second channel state information is a part of the first channel state information, the access point may continue to request, from the station, channel state information that is not successfully fed back, so that the station continues to feed back channel state information, until the first channel state information is fully fed back.

For example, the station may receive a first polling scheduling message and a second resource scheduling message that are sent by the AP, where the first polling scheduling message is used to request third channel state information from the target STA, the first polling scheduling message includes segment information of the third channel state information in the first channel state information, the third channel state information is a part or all of the first channel state information from which the second channel state information is removed, and the second resource scheduling message is used to indicate a second communication resource used by the target STA when the target STA feeds back the third channel state information; and send the third channel state information to the AP by using the second communication resource.

Optionally, when the first indication information instructs the target STA not to immediately feed back channel state information, an X interframe space XIFS later after the first resource scheduling message is sent, the acknowledgement message is sent to the AP according to the first resource scheduling message, the first feedback indication message, and the first high-efficiency long training sequence by using the first communication resource.

After receiving the acknowledgement message sent by the station, the access point may send a resource scheduling message to the station, to schedule the station to feed back channel state information to the access point. The resource scheduling message may be borne in a trigger frame, to trigger the station to feed back channel state information to the access point.

For example, the station may receive a third resource scheduling message sent by the AP, where the third resource scheduling message is used to indicate a third communication resource used by the target STA when the target STA feeds back fourth channel state information. The station may send the fourth channel state information by using the third communication resource, where the fourth channel state information is a part or all of the first channel state information.

Herein, when the AP gives different instructions to different STAs by using the indication information, for example, the AP instructs some stations to immediately perform feedback, and instructs some stations not to immediately perform feedback, in a next step, when the AP continues to schedule the STAs to feed back channel state information, because some stations have fed back channel state information, the AP may send a resource scheduling message and a polling scheduling message in the next step, to simultaneously schedule the stations to feed back channel state information. If the AP instructs, by using the indication information, all different STAs not to immediately perform feedback, the AP may send only a resource scheduling message in a next step, to trigger the stations to feed back channel state information.

When the fourth channel state information is a part of the first channel state information, the access point may continue to send a resource scheduling message and a polling scheduling message to the station, so that the station continues to feed back, to the access point, channel state information that is not successfully fed back.

A resource scheduling message and a polling scheduling message may be borne in different frames, or may be borne in a same frame of a same data packet. In this embodiment of the present invention, a specific manner of combining the polling scheduling message and the resource scheduling message is not specifically limited. A structure of a frame combining the polling scheduling message and the resource scheduling message may be obtained by reusing an existing frame structure, for example, by expanding and reusing an existing trigger frame or beamforming report poll frame; or may be obtained by designing a new frame structure that meets a function. The resource scheduling message and the polling scheduling message may be borne in a trigger frame or a BF Report Poll frame of a same data packet. A case in which the existing trigger frame or BF Report Poll frame is reused has been described in description of FIG. 1B. To avoid repetition, details are not described herein again.

For example, the station may receive a second polling scheduling message and a fourth resource scheduling message that are sent by the AP. The second polling scheduling message is used to request fifth channel state information from the target STA. The second polling scheduling message includes segment information of the fifth channel state information in the first channel state information. The fifth channel state information is a part or all of the first channel state information from which the fourth channel state information is removed. The fourth resource scheduling message is used to indicate a fourth communication resource used by the target STA when the target STA feeds back the fifth channel state information. The station may send the fifth channel state information to the AP by using the fourth communication resource.

Optionally, when the first indication information instructs the target STA to immediately feed back channel state information, an X interframe space XIFS later after the first resource scheduling message is sent, the second channel state information is sent to the AP according to the first resource scheduling message, the first feedback indication message, and the first high-efficiency long training sequence by using the first communication resource.

When the second channel state information is a part of the first channel state information, the access point may continue to request, from the station, channel state information that is not successfully fed back, until the first channel state information is fully fed back.

For example, the station may receive a third polling scheduling message and a fifth resource scheduling message that are sent by the AP. The third polling scheduling message is used to request sixth channel state information from the target STA. The third polling scheduling message includes segment information of the sixth channel state information in the first channel state information. The sixth channel state information is a part or all of the first channel state information from which the second channel state information is removed. The fifth resource scheduling message is used to indicate a fifth communication resource used by the target STA when the target STA feeds back the sixth channel state information. The station may send the sixth channel state information to the AP by using the fifth communication resource.

In this embodiment of the present invention, how to instruct whether to immediately perform feedback is not limited. For example, a particular field in the first indication information may be used for instructing, or a time sequence of sending the feedback indication message, the high-efficiency long training sequence, and the resource scheduling message may be used for instructing, or a size of a resource block in a communication resource or a quantity of spatial streams used by a resource block may be used for instructing.

Optionally, the first indication information may include a field used to indicate a time at which the target STA feeds back channel state information.

Optionally, the first indication information may include a field used to instruct all target STAs or separately instruct each target STA whether to immediately feed back channel state information.

Optionally, when the first resource scheduling message is sent after the first feedback indication message and the first high-efficiency long training sequence are sent, the first indication information is used to indicate non-immediate feedback.

Optionally, when a size of a resource block in the first communication resource is less than a first threshold or a quantity of spatial streams used by a resource block in the first communication resource is less than a second threshold, the first indication information is used to indicate non-immediate feedback; or when a size of a resource block in the first communication resource is greater than or equal to a first threshold or a quantity of spatial streams used by a resource block in the first communication resource is greater than or equal to a second threshold, the first indication information is used to indicate immediate feedback.

In this embodiment of the present invention, frames in which the first feedback indication message, the first high-efficiency long training sequence, and the first resource scheduling message are located are not limited. For example, when the access point determines not to instruct the station to immediately feed back channel state information, the access point may separately send an NDPA, an NDP, and a trigger frame to the station. As a result, the first feedback indication message, the first high-efficiency long training sequence, and the first resource scheduling message are located in different frames.

Optionally, the first feedback indication message, the first high-efficiency long training sequence, and the first resource scheduling message are located in different frames.

In this embodiment of the present invention, data packets or frames in which the resource scheduling message and the polling scheduling message corresponding to the resource scheduling message are located are not limited. The resource scheduling message and the polling scheduling message may be located in a same data packet, or may be located in a same frame of a same data packet, or may be located in different data packets, or may be located in different frames of a same data packet.

Optionally, the first polling scheduling message and the second resource scheduling message may be located in a same data packet; or the second polling scheduling message and the fourth resource scheduling message may be located in a same data packet; or the third polling scheduling message and the fifth resource scheduling message may be located in a same data packet.

In this embodiment of the present invention, one station is used as an example for illustration purposes. The access point may instruct all stations to immediately perform feedback, or may instruct all stations not to immediately perform feedback, or may separately instruct each station to immediately perform feedback or not to immediately perform feedback. When the access point separately instructs each station to immediately perform feedback or not to immediately perform feedback and the station feeds back only a part of channel state information during the first feedback, in next scheduling, the access point may send a resource scheduling message and a polling scheduling message to the station.

Method Embodiment 4

FIG. 4 is a schematic flowchart of a method for transmitting channel state information according to still another embodiment of the present invention. The method in FIG. 4 may be executed by an access point.

401. Determine first indication information, where the first indication information is used to instruct at least two target STAs whether to immediately feed back channel state information, where the at least two target STAs need to feed back channel state information to the AP.

402. Send a first resource scheduling message, a first feedback indication message, and a first high-efficiency long training sequence to a target STA according to the first indication information, where the first resource scheduling message or the first feedback indication message includes the first indication information, the first feedback indication message is used to indicate the at least two target stations STAs that need to feed back channel state information to the AP, the first high-efficiency long training sequence is used to determine first channel state information of the target STA, the first resource scheduling message is used to indicate a first communication resource used by the target STA when the target STA feeds back second channel state information or an acknowledgement message, the second channel state information is a part or all of the first channel state information, and the acknowledgement message is used to indicate that the first feedback indication message, the first high-efficiency long training sequence, and the first resource scheduling message have been received.

403. Receive the second channel state information or the acknowledgement message that is sent by the target STA according to the first resource scheduling message, the first feedback indication message, and the first high-efficiency long training sequence by using the first communication resource.

In this embodiment of the present invention, an access point sends a resource scheduling message, a feedback indication message, and a high-efficiency long training sequence to a station, to schedule multiple stations to transmit channel state information, and the access point may instruct the station whether to immediately perform feedback; and the station may feed back channel state information or an acknowledgement message to the access point according to an instruction of the access point. In this way, resource waste caused when some stations cannot immediately perform feedback can be avoided, and channel state information transmission efficiency can be improved.

Optionally, in an embodiment of the present invention, the sending a first resource scheduling message, a first feedback indication message, and a first high-efficiency long training sequence according to the first indication information includes: when the first indication information instructs the target STA not to immediately feed back channel state information, sending the first resource scheduling message an X interframe space XIFS later after sending the first feedback indication message and the first high-efficiency long training sequence. The first feedback indication message includes the first indication information. The receiving the second channel state information or the acknowledgement message that is sent by the target STA according to the first resource scheduling message, the first feedback indication message, and the first high-efficiency long training sequence by using the first communication resource includes: an X interframe space XIFS later after sending the first resource scheduling message, receiving the second channel state information that is sent by the target STA according to the first resource scheduling message, the first feedback indication message, and the first high-efficiency long training sequence by using the first communication resource.

Optionally, in an embodiment of the present invention, the method further includes: sending a first polling scheduling message and a second resource scheduling message, where the first polling scheduling message is used to request third channel state information from the target STA, the first polling scheduling message includes segment information of the third channel state information in the first channel state information, the third channel state information is a part or all of the first channel state information from which the second channel state information is removed, and the second resource scheduling message is used to indicate a second communication resource used by the target STA when the target STA feeds back the third channel state information; and receiving the third channel state information sent by the target STA by using the second communication resource.

Optionally, in an embodiment of the present invention, the receiving the second channel state information or the acknowledgement message that is sent by the target STA according to the first resource scheduling message, the first feedback indication message, and the first high-efficiency long training sequence by using the first communication resource includes: when the first indication information instructs the target STA not to immediately feed back channel state information, an X interframe space XIFS later after sending the first resource scheduling message, receiving the acknowledgement message that is sent by the target STA according to the first resource scheduling message, the first feedback indication message, and the first high-efficiency long training sequence by using the first communication resource.

Optionally, in an embodiment of the present invention, the method further includes: sending a third resource scheduling message, where the third resource scheduling message is used to indicate a third communication resource used by the target STA when the target STA feeds back fourth channel state information; and receiving the fourth channel state information sent by the target STA by using the third communication resource, where the fourth channel state information is a part or all of the first channel state information.

Optionally, in an embodiment of the present invention, the method further includes: sending a second polling scheduling message and a fourth resource scheduling message, where the second polling scheduling message is used to request fifth channel state information from the target STA, the second polling scheduling message includes segment information of the fifth channel state information in the first channel state information, the fifth channel state information is a part or all of the first channel state information from which the fourth channel state information is removed, and the fourth resource scheduling message is used to indicate a fourth communication resource used by the target STA when the target STA feeds back the fifth channel state information; and receiving the fifth channel state information sent by the target STA by using the fourth communication resource.

Optionally, in an embodiment of the present invention, the receiving the second channel state information or the acknowledgement message that is sent by the target STA according to the first resource scheduling message, the first feedback indication message, and the first high-efficiency long training sequence by using the first communication resource includes: when the first indication information instructs the target STA to immediately feed back channel state information, an X interframe space XIFS later after sending the first resource scheduling message, receiving the second channel state information that is sent by the target STA according to the first resource scheduling message, the first feedback indication message, and the first high-efficiency long training sequence by using the first communication resource.

Optionally, in an embodiment of the present invention, the method further includes: sending a third polling scheduling message and a fifth resource scheduling message, where the third polling scheduling message is used to request sixth channel state information from the target STA, the third polling scheduling message includes segment information of the sixth channel state information in the first channel state information, the sixth channel state information is a part or all of the first channel state information from which the second channel state information is removed, and the fifth resource scheduling message is used to indicate a fifth communication resource used by the target STA when the target STA feeds back the sixth channel state information; and receiving the sixth channel state information sent by the target STA by using the fifth communication resource.

Optionally, in an embodiment of the present invention, the first indication information includes a field used to indicate a time at which the target STA feeds back channel state information.

Optionally, in an embodiment of the present invention, the first indication information includes a field used to instruct all target STAs or separately instruct each target STA whether to immediately feed back channel state information.

Optionally, in an embodiment of the present invention, when the first resource scheduling message is sent after the first feedback indication message and the first high-efficiency long training sequence are sent to the target STA, the first indication information is used to indicate non-immediate feedback.

Optionally, in an embodiment of the present invention, when a size of a resource block in the first communication resource is less than a first threshold or a quantity of spatial streams used by a resource block in the first communication resource is less than a second threshold, the first indication information is used to indicate non-immediate feedback; or when a size of a resource block in the first communication resource is greater than or equal to a first threshold or a quantity of spatial streams used by a resource block in the first communication resource is greater than or equal to a second threshold, the first indication information is used to indicate immediate feedback.

Optionally, in an embodiment of the present invention, the first feedback indication message, the first high-efficiency long training sequence, and the first resource scheduling message are located in different frames.

Optionally, in an embodiment of the present invention, the first polling scheduling message and the second resource scheduling message are located in a same data packet; or the second polling scheduling message and the fourth resource scheduling message are located in a same data packet; or the third polling scheduling message and the fifth resource scheduling message are located in a same data packet.

A resource scheduling message and a polling scheduling message may be borne in different frames, or may be borne in a same frame of a same data packet. In this embodiment of the present invention, a specific manner of combining the polling scheduling message and the resource scheduling message is not specifically limited. A structure of a frame combining the polling scheduling message and the resource scheduling message may be obtained by reusing an existing frame structure, for example, by expanding and reusing an existing trigger frame or beamforming report poll frame; or may be obtained by designing a new frame structure that meets a function. The resource scheduling message and the polling scheduling message may be borne in a trigger frame or a BF Report Poll frame of a same data packet. A case in which the existing trigger frame or BF Report Poll frame is reused has been described in description of FIG. 1B. To avoid repetition, details are not described herein again.

The method for transmitting channel state information according to this embodiment in FIG. 4 may be executed by the access point, and the access point may execute a corresponding procedure that is executed by an access point and that follows the embodiment in FIG. 3. For brevity, details are not described herein again.

Figure 5:
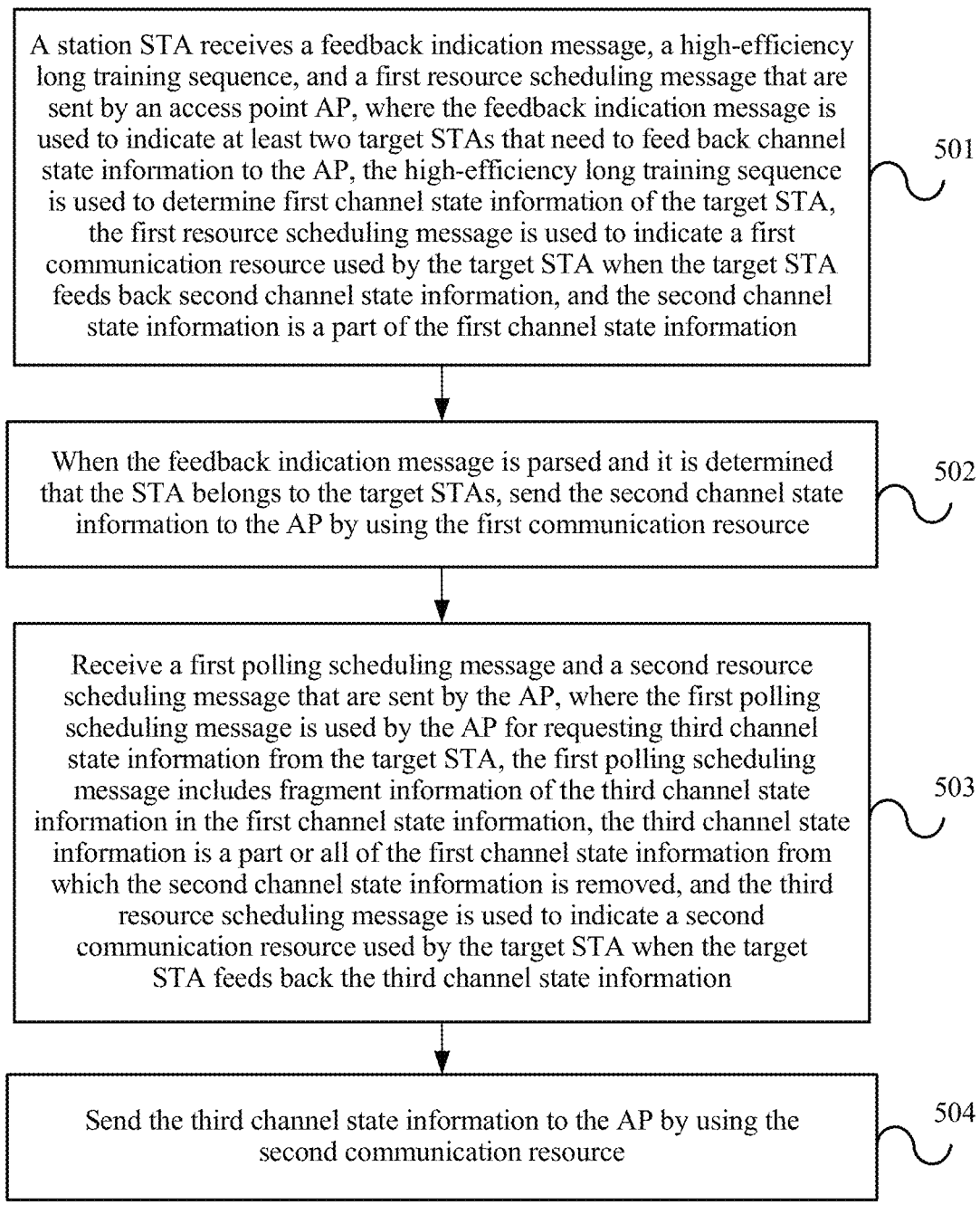
FIG. 5 is a schematic flowchart of a method for transmitting channel state information according to still another embodiment of the present invention.
Figure 6:
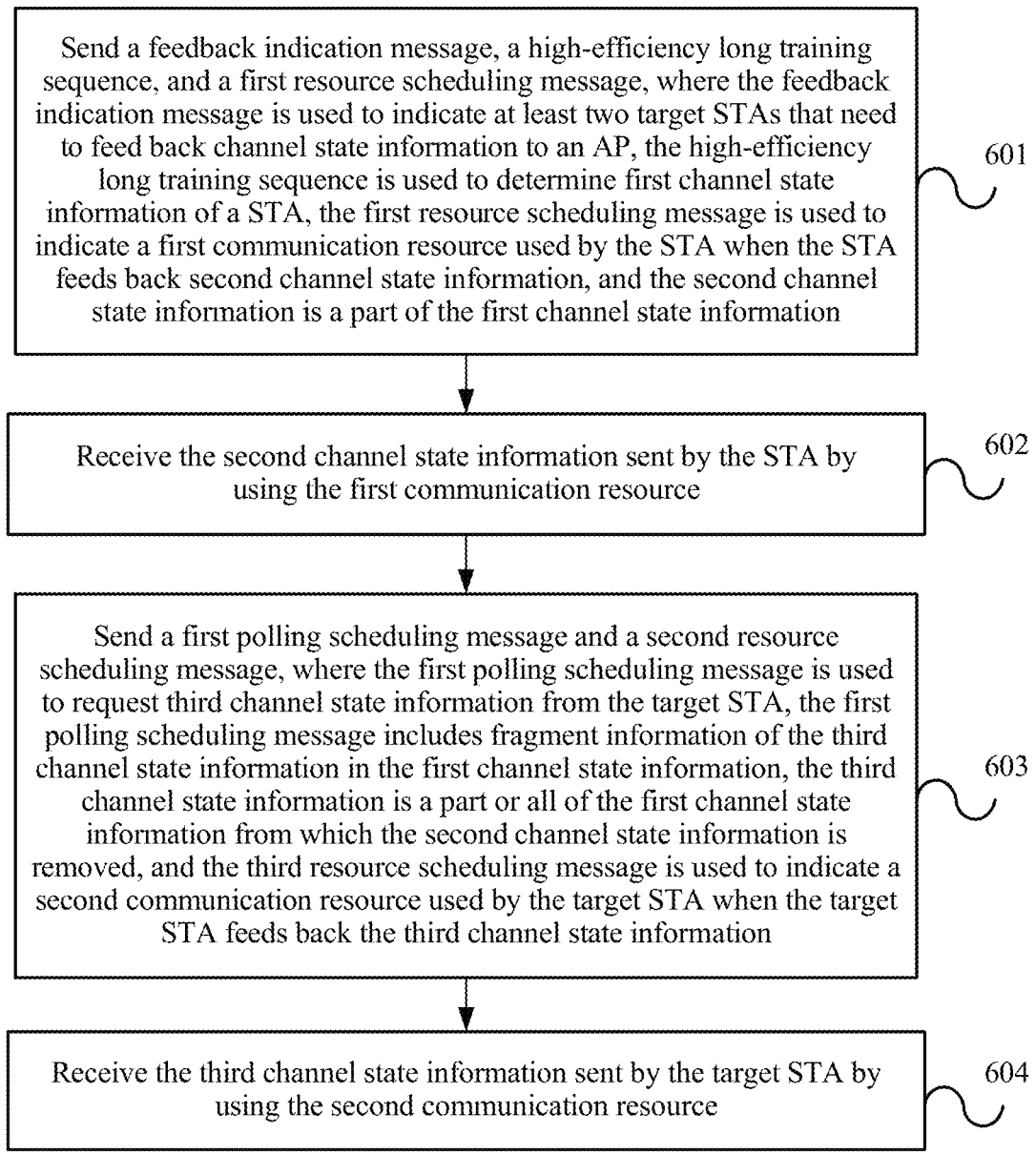
FIG. 6 is a schematic flowchart of a method for transmitting channel state information according to still another embodiment of the present invention.

With reference to FIG. 5 and FIG. 6, the following describes in detail a subsequent procedure in which a station feeds back channel state information after receiving a feedback indication message, a high-efficiency long training sequence, and a resource scheduling message.

Method Embodiment 5

FIG. 5 is a schematic flowchart of a method for transmitting channel state information according to still another embodiment of the present invention. The method in FIG. 5 may be executed by a station.

501. The station STA receives a feedback indication message, a high-efficiency long training sequence, and a first resource scheduling message that are sent by an access point AP, where the feedback indication message is used to indicate at least two target STAs that need to feed back channel state information to the AP, the high-efficiency long training sequence is used to determine first channel state information of the target STA, the first resource scheduling message is used to indicate a first communication resource used by the target STA when the target STA feeds back second channel state information, and the second channel state information is a part of the first channel state information.

502. When the feedback indication message is parsed and it is determined that the STA belongs to the target STAs, perform channel estimation according to the high-efficiency long training sequence, to obtain the first channel state information, and send the second channel state information to the AP by using the first communication resource.

503. Receive a first polling scheduling message and a second resource scheduling message that are sent by the AP, where the first polling scheduling message is used by the AP for requesting third channel state information from the target STA, the first polling scheduling message includes segment information of the third channel state information in the first channel state information, the third channel state information is a part or all of the first channel state information from which the second channel state information is removed, and the second resource scheduling message is used to indicate a second communication resource used by the target STA when the target STA feeds back the third channel state information.

504. Send the third channel state information to the AP by using the second communication resource.

In this embodiment of the present invention, an access point sends a resource scheduling message, a feedback indication message, and a high-efficiency long training sequence to a station, to schedule multiple stations to transmit channel state information; the station feeds back channel state information to the access point; and the access point may further continue to send a polling scheduling message and a resource scheduling message, to trigger the station to continue to feed back, to the access point, channel state information that is not successfully fed back. In this way, resource waste caused when feedback cannot be performed at one time due to an insufficient resource can be avoided, and channel state information transmission efficiency can be improved.

In an embodiment of the present invention, the access point may send a feedback indication message, a high-efficiency long training sequence, and a resource scheduling message (such as the first resource scheduling message) to the station, to trigger the station to feed back channel state information of the station to the access point. The station may receive the feedback indication message, the high-efficiency long training sequence, and the resource scheduling message that are sent by the access point. When determining that the station belongs to target stations, the station feeds back channel state information to the access point. When channel state information fed back at the first time is not all channel state information, the access point may send a polling scheduling message (such as the first polling scheduling message) and a resource scheduling message (such as the second resource scheduling message) to the station, to trigger the station to continue to feed back channel state information that is not successfully fed back. The station may complete feedback at one time, or may perform multiple times of feedback.

A resource scheduling message and a polling scheduling message may be borne in different frames, or may be borne in a same frame of a same data packet. In this embodiment of the present invention, a specific manner of combining the polling scheduling message and the resource scheduling message is not specifically limited. A structure of a frame combining the polling scheduling message and the resource scheduling message may be obtained by reusing an existing frame structure, for example, by expanding and reusing an existing trigger frame or beamforming report poll frame; or may be obtained by designing a new frame structure that meets a function. The resource scheduling message and the polling scheduling message may be borne in a trigger frame or a BF Report Poll frame of a same data packet. A case in which the existing trigger frame or BF Report Poll frame is reused has been described in description of FIG. 1B. To avoid repetition, details are not described herein again.

Method Embodiment 6

FIG. 6 is a schematic flowchart of a method for transmitting channel state information according to still another embodiment of the present invention. The method in FIG. 6 may be executed by an access point.

601. Send a feedback indication message, a high-efficiency long training sequence, and a first resource scheduling message to a station STA, where the feedback indication message is used to indicate at least two target STAs that need to feed back channel state information to the AP, the high-efficiency long training sequence is used to determine first channel state information of the target STA, the first resource scheduling message is used to indicate a first communication resource used by the target STA when the target STA feeds back second channel state information, and the second channel state information is a part of the first channel state information.

602. Receive the second channel state information sent by the target STA by using the first communication resource.

603. Send a first polling scheduling message and a second resource scheduling message to the target STA, where the first polling scheduling message is used to request third channel state information from the target STA, the first polling scheduling message includes segment information of the third channel state information in the first channel state information, the third channel state information is a part or all of the first channel state information from which the second channel state information is removed, and the second resource scheduling message is used to indicate a second communication resource used by the target STA when the target STA feeds back the third channel state information.

604. Receive the third channel state information sent by the target STA by using the second communication resource.

In this embodiment of the present invention, an access point sends a resource scheduling message, a feedback indication message, and a high-efficiency long training sequence to a station, to schedule multiple stations to transmit channel state information; the station feeds back channel state information to the access point; and the access point may further continue to send a polling scheduling message and a resource scheduling message, to trigger the station to continue to feed back, to the access point, channel state information that is not successfully fed back. In this way, resource waste caused when feedback cannot be performed at one time due to an insufficient resource can be avoided, and channel state information transmission efficiency can be improved.

The method for transmitting channel state information according to this embodiment of the present invention may be executed by the access point, and the access point may execute a corresponding procedure that is executed by an access point and that follows the embodiment in FIG. 5. For brevity, details are not described herein again.

A resource scheduling message and a polling scheduling message may be borne in different frames, or may be borne in a same frame of a same data packet. In this embodiment of the present invention, a specific manner of combining the polling scheduling message and the resource scheduling message is not specifically limited. A structure of a frame combining the polling scheduling message and the resource scheduling message may be obtained by reusing an existing frame structure, for example, by expanding and reusing an existing trigger frame or beamforming report poll frame; or may be obtained by designing a new frame structure that meets a function. The resource scheduling message and the polling scheduling message may be borne in a trigger frame or a BF Report Poll frame of a same data packet. A case in which the existing trigger frame or BF Report Poll frame is reused has been described in description of FIG. 1B. To avoid repetition, details are not described herein again.

With reference to specific examples in FIG. 7 to FIG. 10, the following describes in detail how an access point schedules multiple stations to feed back and transmit channel state information. The following uses an example in which the access point simultaneously schedules only two stations or three stations for illustration purposes. However, the present invention is not limited thereto, and there may be two or more stations.

Method Embodiment 7

Figure 7A:
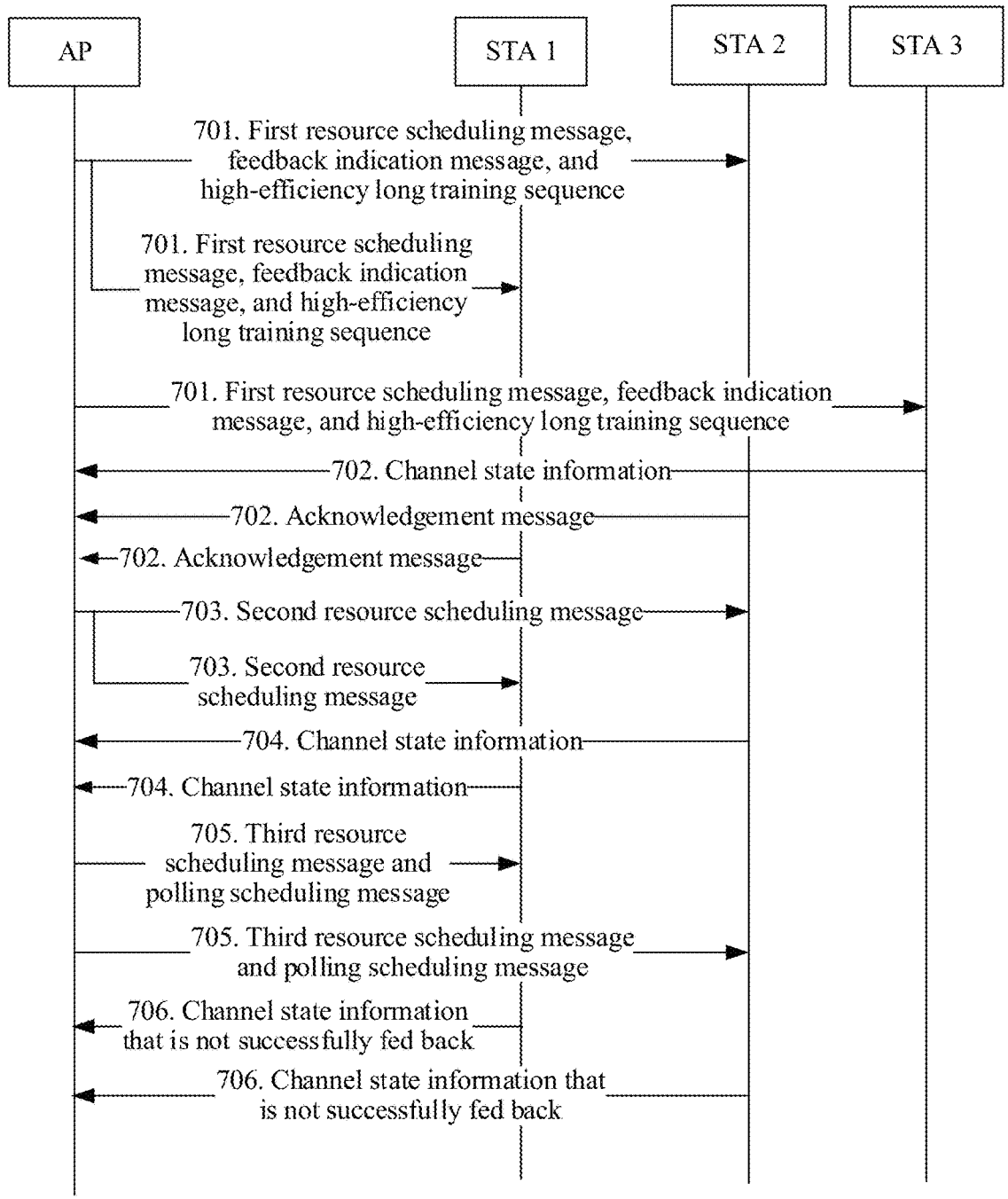
FIG. 7A and FIG. 7B are interaction diagrams in which an access point schedules multiple stations to transmit channel state information according to an embodiment of the present invention.
Figure 7B:
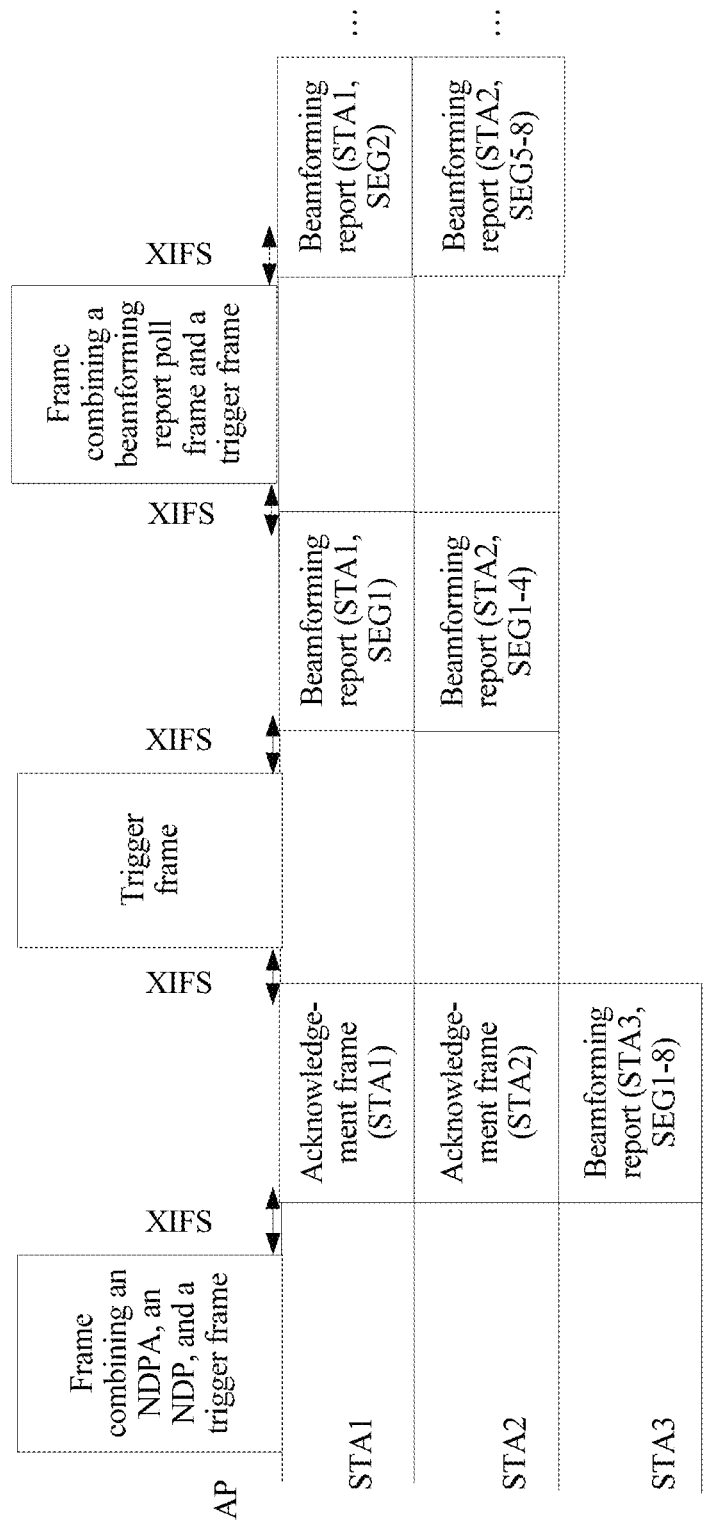

FIG. 7A and FIG. 7B are interaction diagrams in which an access point schedules multiple stations to transmit channel state information according to an embodiment of the present invention. FIG. 7A and FIG. 7B separately reflect this embodiment of the present invention from two different perspectives. FIG. 7A reflects information or message exchange between an access point and a station. FIG. 7B reflects frame exchange between an access point and a station. Essence of FIG. 7B is the same as that of FIG. 7A because information or a message is carried in a frame.

701. An AP sends a first resource scheduling message, a feedback indication message, and a high-efficiency long training sequence to a STA.

The STA herein may be a STA1, a STA2, and a STA3 in FIG. 7, and may further include another STA that is not drawn herein. The access point may send, in a broadcast manner, frames combining NDPAs, NDPs, and trigger frames to multiple stations, and add first resource scheduling messages, feedback indication messages, and high-efficiency long training sequences to fields in the combination frame, to schedule the multiple stations to perform feedback. In this embodiment of the present invention, a manner of combining the NDPA, the NDP, and the trigger frame is not limited. Any two of the NDPA, the NDP, and the trigger frame may be combined in pairs, and then the two are combined with the third one; or the NDPA, the NDP, and the trigger frame may be combined together. For a specific combination manner, refer to description in FIG. 1B, and details are not described herein again.

There are three sequence numbers 701 in this embodiment of the present invention. This indicates that the access point may simultaneously send, in a broadcast manner, the frames combining the NDPAs, the NDPs, and the trigger frames to multiple stations.

702. The STA feeds back an acknowledgement message or channel state information to the AP.

The station may receive the first resource scheduling message, the feedback indication message, and the high-efficiency long training sequence that are sent by the access point, may estimate channel state information, and may determine to feed back the acknowledgement message to the access point, to indicate that the first resource scheduling message, the feedback indication message, and the high-efficiency long training sequence have been received. The station may further determine to feed back the channel state information. Generally, when the station cannot immediately perform feedback, the station (such as the station 1 and the station 2) may feed back the acknowledgement message to the access point first. When the station can immediately perform feedback, the station may feed back the channel state information to the access point.

There are three sequence numbers 702 in this embodiment of the present invention. A same sequence number is used herein to indicate that multiple stations may simultaneously perform feedback to the access point.

It should be understood that, the multiple stations in this embodiment of the present invention may simultaneously feed back different messages to the access point. This is not limited in this embodiment of the present invention. For example, the station 3 may feed back channel state information to the access point, and the station 1 and the station 2 may feed back acknowledgement messages to the access point. After the station 3 feeds back the channel state information, if the access point receives a part of channel state information, the access point may further continue to send a resource scheduling message and a polling scheduling message to the station, to schedule the station to continue to feed back channel state information that is not successfully fed back. In this embodiment of the present invention, an example in which the station 3 feeds back all channel state information at one time is merely used for illustration purposes.

703. The AP sends a second resource scheduling message to the STA.

After receiving the acknowledgement message, the access point may continue to send the second resource scheduling message to the station, to trigger the station to feed back channel state information to the access point.

704. The STA returns channel state information to the AP.

After receiving the second resource scheduling message sent by the access point, the station may feed back a part or all of channel state information to the access point by using a communication resource indicated by the second resource scheduling message.

The station 1 or the station 2 may return all channel state information to the access point, so that the procedure ends. Different stations may have different feedback procedures. For example, in step 704, the station 1 may feed back all channel state information, so that the procedure ends. The station 2 may feed back a part of channel state information. In this embodiment of the present invention, an example in which both the station 1 and the station 2 feed back a part of channel state information is used for illustration purposes.

705. The AP sends a third resource scheduling message and a polling scheduling message to the STA.

When the access point receives a part of channel state information that is fed back by the station in step 704, the access point may continue to send the third resource scheduling message and the polling scheduling message to the station, so that the station (such as the station 1 and the station 2) continues to feed back channel state information that is not successfully fed back.

706. The STA returns, to the AP, channel state information that is not successfully fed back.

After receiving the third resource scheduling message and the polling scheduling message that are sent by the access point, the station may continue to feed back, to the access point, the channel state information that is not successfully fed back.

In this embodiment of the present invention, the channel state information that is not successfully fed back may be channel state information that has not been fed back by the station to the access point, or may be channel state information that has been fed back by the station to the access point but is not correctly received by the access point. When the access point sends a frame combining a BF Report Poll frame and a trigger frame, the station may feed back channel state information according to a feedback segment retransmission bitmap field. When the access point sends only a trigger frame, it indicates that the access point does not previously receive any information fed back by the station, and the station may transmit channel state information to the access point starting from the first segment of the channel state information.

In this embodiment of the present invention, the STA1, the STA2, and the STA3 each may be any station. A procedure executed by the STA2 may be executed by the STA1, and similarly, a procedure executed by the STA1 may also be executed by the STA2. Merely for ease of description, the STA1, the STA2, and the STA3 are used to differentiate stations in the present invention, and are not intended to limit the protection scope of the present invention.

Steps displayed in a flowchart in FIG. 7B are in a one-to-one correspondence with steps displayed in a flowchart in FIG. 7A. A frame structure in FIG. 7B may be used to carry the foregoing feedback indication message, high-efficiency long training sequence, resource scheduling message, and polling scheduling message. When the access point instructs, by using a frame sending sequence, not to immediately perform feedback, the station may determine to feed back a beamforming report or an acknowledgement frame after receiving a combination frame. When the station 3 completes beamforming report feedback at one time, a feedback procedure of the station 3 ends; or when the station 3 does not complete feedback at one time, the access point may further send a frame combining a beamforming report poll frame and a trigger frame, to continue to trigger the station to feed back channel state information that is not successfully fed back. This case is not drawn in this embodiment. When determining not to immediately perform feedback, the station 1 and the station 2 may feed back acknowledgement frames first. Channel state information is fed back after a trigger frame sent by the access point is received. Subsequently, if there is still channel state information that is not successfully fed back, the access point may continue to send a frame combining a beamforming report poll frame and a trigger frame, to trigger the station to continue to feed back channel state information, until channel state information fully is fed back.

FIG. 7 mainly describes a case in which after an AP sends a resource scheduling message, a feedback indication message, and a high-efficiency long training sequence to a STA, the STA may determine to feed back channel state information or an acknowledgement message. When the station cannot immediately feed back channel state information, the station may feed back an acknowledgement message first, and feed back channel state information after the access point further schedules the STA to feed back channel state information. Therefore, channel state information can be efficiently and flexibly transmitted in a subsequent procedure.

Method Embodiment 8

Figure 8A:
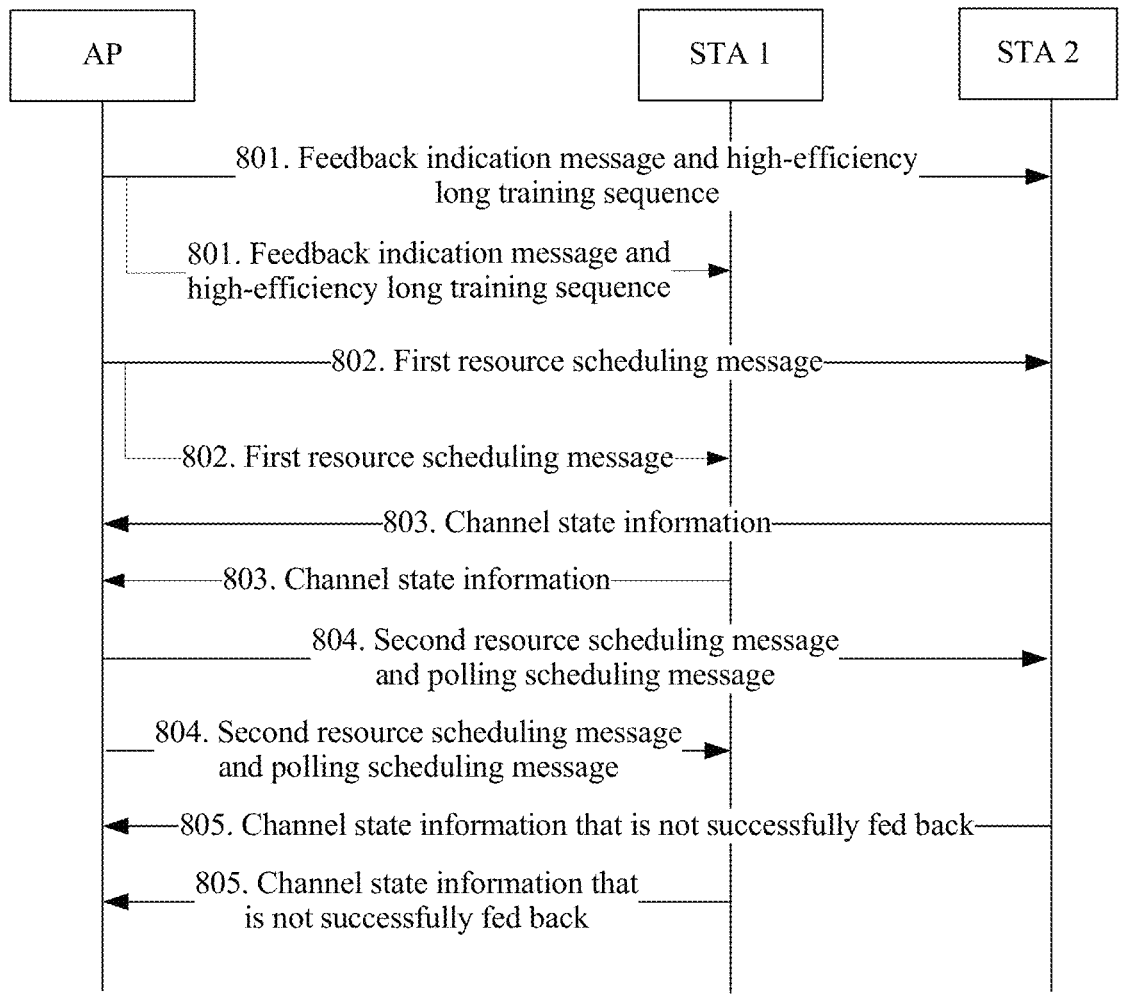
FIG. 8A and FIG. 8B are interaction diagrams in which an access point schedules multiple stations to transmit channel state information according to another embodiment of the present invention.
Figure 8B:
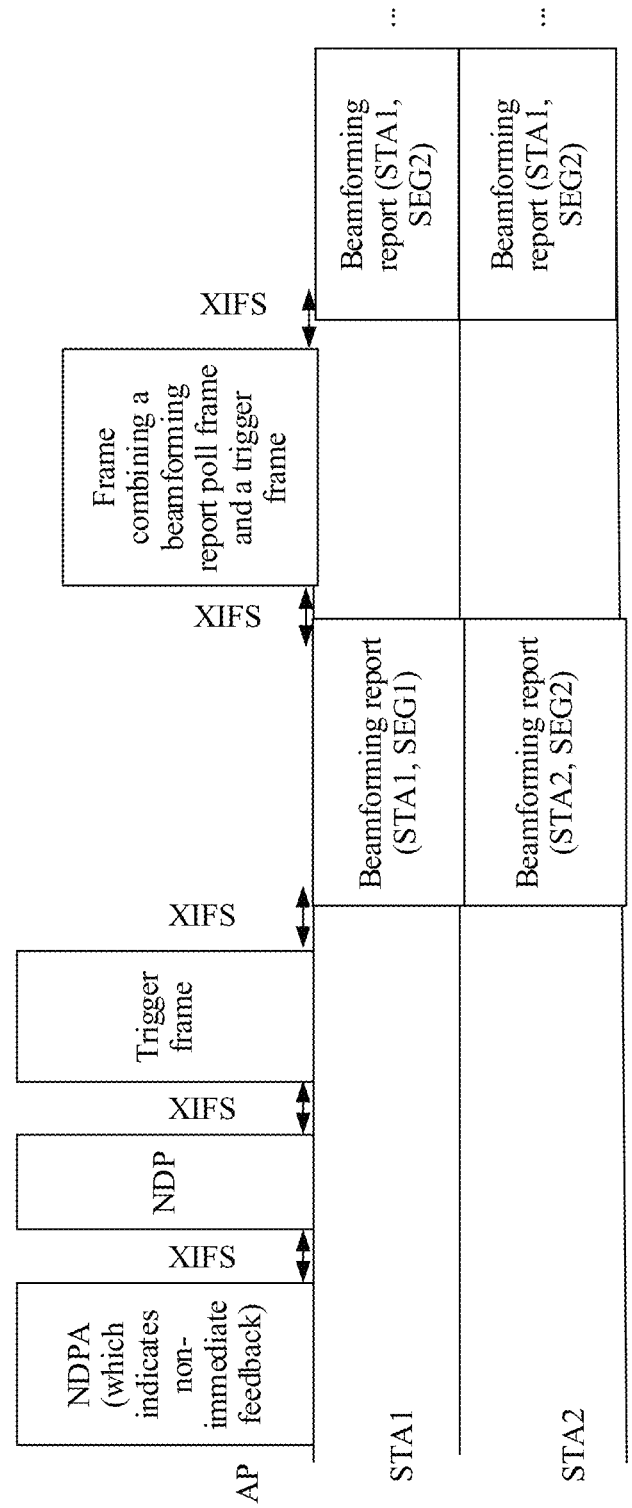

FIG. 8A and FIG. 8B are interaction diagrams in which an access point schedules multiple stations to transmit channel state information according to another embodiment of the present invention. FIG. 8A and FIG. 8B separately reflect this embodiment of the present invention from two different perspectives. FIG. 8A reflects information or message exchange between an access point and a station. FIG. 8B reflects frame exchange between an access point and a station. Essence of FIG. 8B is the same as that of FIG. 8A because information or a message is carried in a frame.

801. An AP sends a feedback indication message and a high-efficiency long training sequence to a STA.

The STA herein may be a STA1 and a STA2 in FIG. 8, and may further include another STA that is not drawn herein. The access point may send the feedback indication message and the high-efficiency long training sequence to the station, so that the station performs channel estimation. The feedback indication message may carry an indication message, to instruct whether to immediately perform feedback. For example, when the indication information indicates non-immediate feedback, the station may not immediately feed back channel state information, to ensure that a station incapable of immediately performing feedback can feed back channel state information a time period later.

802. The AP sends a first resource scheduling message to the STA.

The access point may send the first resource scheduling message to the station, and the first resource scheduling message is sent after the feedback indication message and the high-efficiency long training sequence are sent, that is, step 802 is after step 801, so that when the station receives the feedback indication message and the high-efficiency long training sequence and is incapable of feeding back channel state information, the station can feed back channel state information to the access point after receiving the first resource scheduling message.

803. The STA returns channel state information to the AP.

After receiving the feedback indication message and the high-efficiency long training sequence, the station may not immediately perform feedback. Instead, after receiving the first resource scheduling message, the station feeds back a part or all of channel state information to the access point. For example, the station 1 and the station 2 may feed back a part or all of channel state information to the access point in step 803. In this embodiment of the present invention, an example in which both the station 1 and the station 2 feed back only a part of channel state information is used for illustration purposes.

804. The AP sends a second resource scheduling message and a polling scheduling message to the STA.

When the station feeds back a part of channel state information to the access point in step 803, the access point may continue to schedule the station (such as the station 1 and the station 2) to feed back channel state information that is not successfully fed back. Certainly, the access point may continue to schedule the station one or more times herein, until channel state information is fully fed back.

805. The STA returns, to the AP, channel state information that is not successfully fed back.

After receiving the second resource scheduling message and the polling scheduling message that are sent by the access point, the station may feed back, to the access point, the channel state information that is not successfully fed back.

In this embodiment of the present invention, the channel state information that is not successfully fed back may be channel state information that has not been fed back by the station to the access point, or may be channel state information that has been fed back by the station to the access point but is not correctly received by the access point. When the access point sends a frame combining a BF Report Poll frame and a trigger frame, the station may feed back channel state information according to a feedback segment retransmission bitmap field. When the access point sends only a trigger frame, it indicates that the access point does not previously receive any information fed back by the station, and the station may transmit channel state information to the access point starting from the first segment of the channel state information.

In this embodiment of the present invention, the STA1 and the STA2 each may be any station. A procedure executed by the STA2 may be executed by the STA1, and similarly, a procedure executed by the STA1 may also be executed by the STA2. Merely for ease of description, the STA1 and the STA2 are used to differentiate stations in the present invention, and are not intended to limit the protection scope of the present invention.

Steps displayed in a flowchart in FIG. 8B are in a one-to-one correspondence with steps displayed in a flowchart in FIG. 8A. A frame structure in FIG. 8B may be used to carry the foregoing feedback indication message, high-efficiency long training sequence, resource scheduling message, and polling scheduling message. When the access point instructs, by using a frame sending sequence, not to immediately perform feedback, the station 1 and the station 2 feed back beamforming reports only after receiving trigger frames. Then, the access point may further continue to send a frame combining a beamforming report poll frame and a trigger frame, to continue to schedule the station to feed back channel state information that is not successfully fed back.

FIG. 8 mainly describes a case in which when determining to request a STA to immediately feed back channel state information, an AP sends a resource scheduling message after sending a feedback indication message and a high-efficiency long training sequence to the STA, and a subsequent procedure in which the station feeds back channel state information after receiving the feedback indication message, the high-efficiency long training sequence, and the resource scheduling message. The AP determines, according to information that is reported by the STA and is about whether the STA can immediately perform feedback, a sequence of sending the feedback indication message, the high-efficiency long training sequence, and the resource scheduling message. That is, the AP determines whether to request the STA to immediately feed back channel state information. Therefore, when some stations are incapable of immediately feeding back channel state information in an entire feedback process, the stations can still efficiently and flexibly transmit channel state information in an overall sense in a subsequent process.

Method Embodiment 9

Figure 9A:
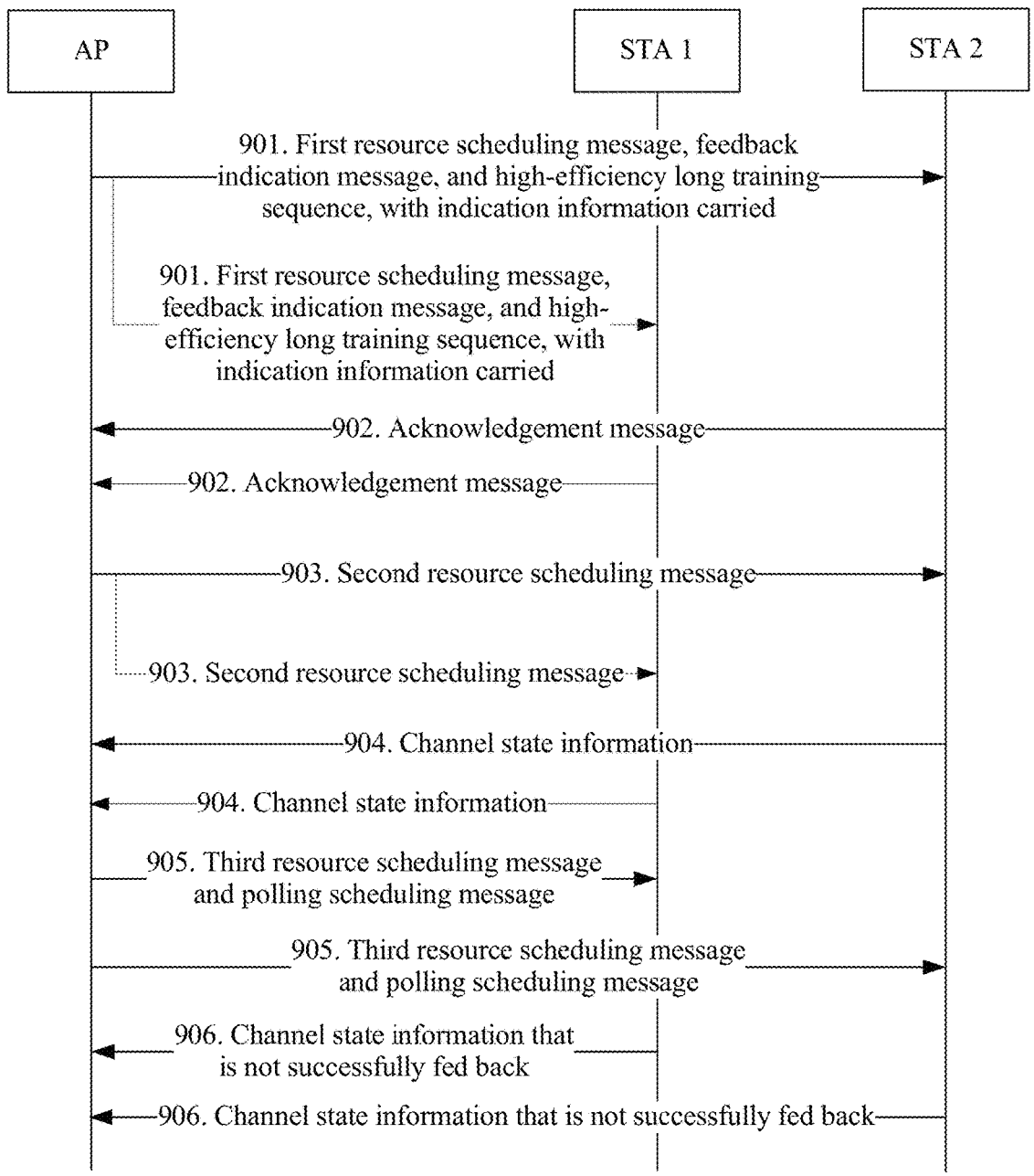
FIG. 9A and FIG. 9B are interaction diagrams in which an access point schedules multiple stations to transmit channel state information according to still another embodiment of the present invention.
Figure 9B:
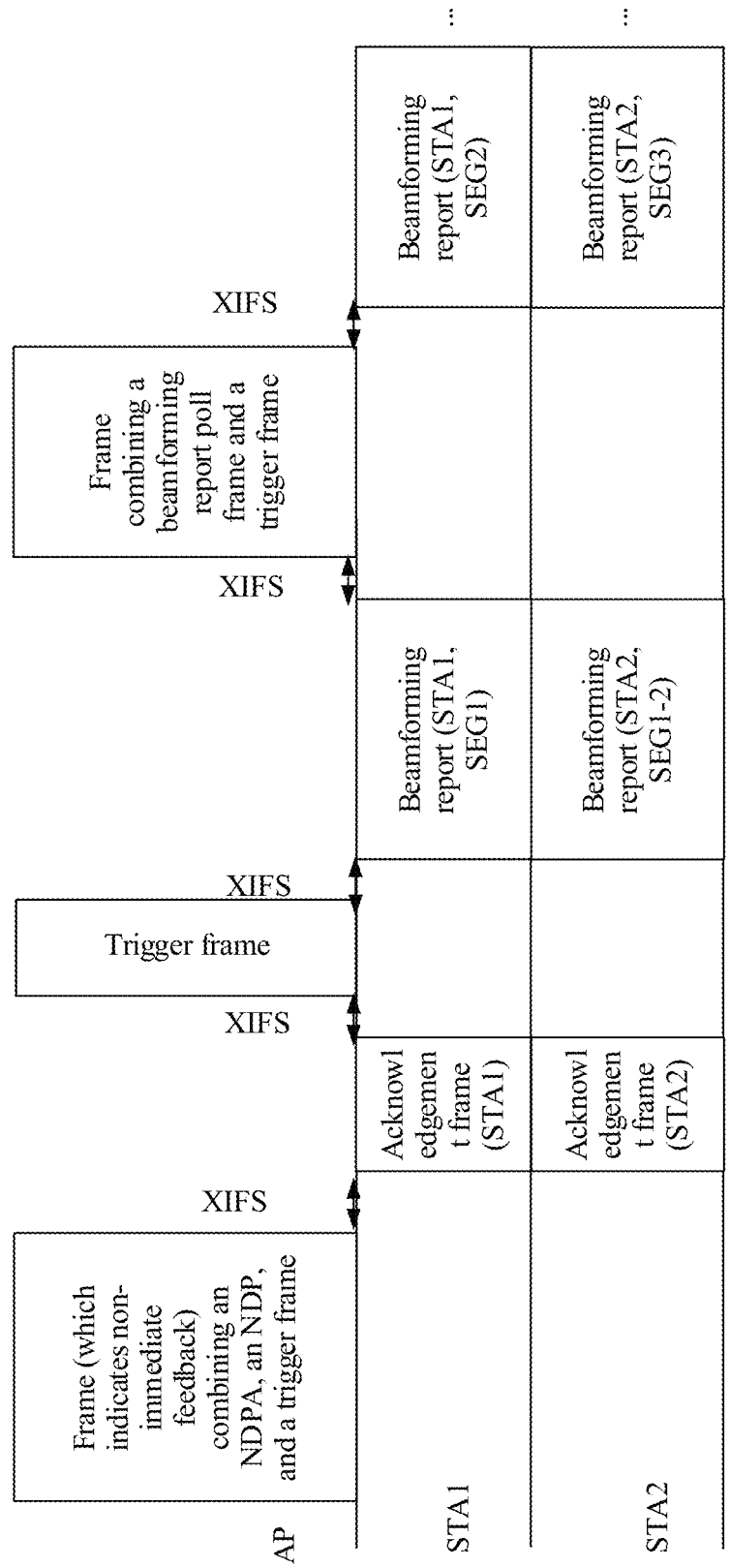

FIG. 9A and FIG. 9B are interaction diagrams in which an access point schedules multiple stations to transmit channel state information according to still another embodiment of the present invention. FIG. 9A and FIG. 9B separately reflect this embodiment of the present invention from two different perspectives. FIG. 9A reflects information or message exchange between an access point and a station. FIG. 9B reflects frame exchange between an access point and a station. Essence of FIG. 9B is the same as that of FIG. 9A because information or a message is carried in a frame.

901. An AP sends a first resource scheduling message, a feedback indication message, and a high-efficiency long training sequence to a STA.

The AP sends the first resource scheduling message, the feedback indication message, and the high-efficiency long training sequence to the STA. The resource scheduling message or the feedback indication message may carry an indication message. The STA herein may be a STA1 and a STA2 in FIG. 9, and may further include another STA that is not drawn herein. When the indication information indicates non-immediate feedback, the station may not immediately feed back channel state information, to ensure that a station incapable of immediately performing feedback can feed back channel state information a time period later.

902. The STA returns an acknowledgement message to the AP.

After receiving the indication information, the station determines that there is no need to immediately perform feedback, and may feed back the acknowledgement message to the access point first, to indicate that the first resource scheduling message, the feedback indication message, and the high-efficiency long training sequence have been received.

903. The AP sends a second resource scheduling message to the STA.

The access point may send the second resource scheduling message to the station a time period later, to schedule the station to feed back channel state information.

904. The STA returns channel state information to the AP.

After receiving the second resource scheduling message sent by the access point, the station may feed back a part or all of channel state information to the access point by using a communication resource indicated by the second resource scheduling message. In this embodiment of the present invention, an example in which the station 1 and the station 2 feed back only a part of channel state information to the access point is used for illustration purposes.

905. The AP sends a third resource scheduling message and a polling scheduling message to the STA.

When the station feeds back a part of channel state information to the access point in step 904, the access point may continue to schedule the station 1 and the station 2 to feed back channel state information that is not successfully fed back. Certainly, the access point may continue to schedule the station 1 and the station 2 one or more times herein, until channel state information is fully fed back.

906. The STA returns, to the AP, channel state information that is not successfully fed back.

The station 1 and the station 2 may continue to feed back, to the access point, the channel state information that is not successfully fed back.

In this embodiment of the present invention, the STA1 and the STA2 each may be any station. A procedure executed by the STA2 may be executed by the STA1, and similarly, a procedure executed by the STA1 may also be executed by the STA2. Merely for ease of description, the STA1 and the STA2 are used to differentiate stations in the present invention, and are not intended to limit the protection scope of the present invention.

Steps displayed in a flowchart in FIG. 9B are in a one-to-one correspondence with steps displayed in a flowchart in FIG. 9A. A frame structure in FIG. 9B may be used to carry the foregoing feedback indication message, high-efficiency long training sequence, resource scheduling message, and polling scheduling message. When the access point instructs both the station 1 and the station 2 not to immediately perform feedback, the station 1 and the station 2 feed back acknowledgement frames. Then, the access point may continue to send a trigger frame, to schedule a beamforming report of the station. The beamforming report is a carrier of channel state information. Subsequently, the access point may further continue to send a frame combining a beamforming report poll frame and a trigger frame, to continue to schedule the station to feed back channel state information that is not successfully fed back.

In this embodiment of the present invention, the channel state information that is not successfully fed back may be channel state information that has not been fed back by the station to the access point, or may be channel state information that has been fed back by the station to the access point but is not correctly received by the access point. When the access point sends a frame combining a BF Report Poll frame and a trigger frame, the station may feed back channel state information according to a feedback segment retransmission bitmap field. When the access point sends only a trigger frame, it indicates that the access point does not previously receive any information fed back by the station, and the station may transmit channel state information to the access point starting from the first segment of the channel state information.

FIG. 9 mainly describes a case in which when determining not to request a STA to immediately feed back channel state information, an AP sends a feedback indication message, a high-efficiency long training sequence, and a resource scheduling message to the STA, after the STA receives the feedback indication message, the high-efficiency long training sequence, and the resource scheduling message, the STA feeds back an acknowledgement message to the AP because the AP instructs not to immediately perform feedback, and subsequently, the AP triggers the STA to feed back channel state information, so that when some stations are incapable of immediately feeding back channel state information in an entire feedback process, the stations can still efficiently and flexibly transmit channel state information in an overall sense in a subsequent process.

Method Embodiment 10

Figure 10A:
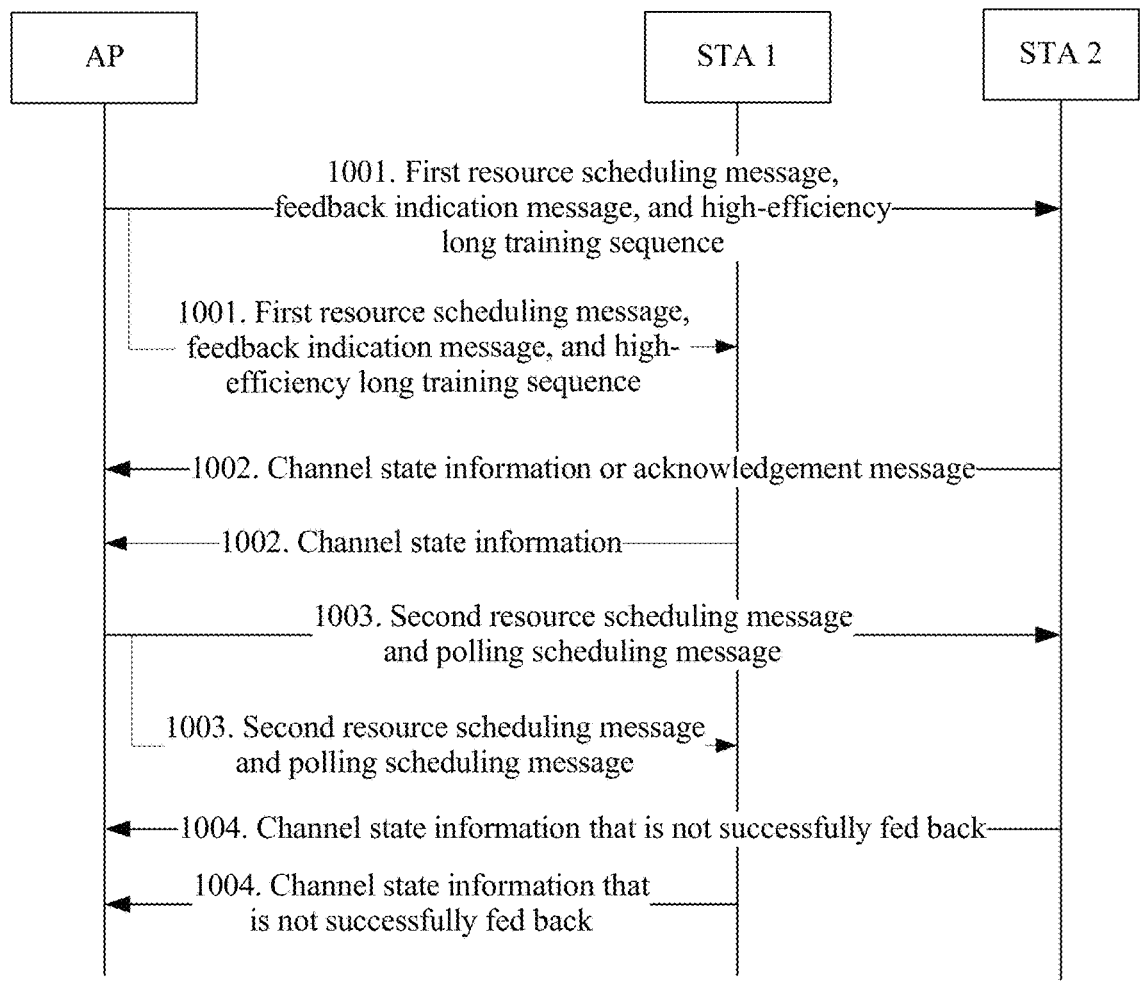
FIG. 10A, FIG. 10B, and FIG. 10C are interaction diagrams in which an access point schedules multiple stations to transmit channel state information according to yet another embodiment of the present invention.
Figure 10B:
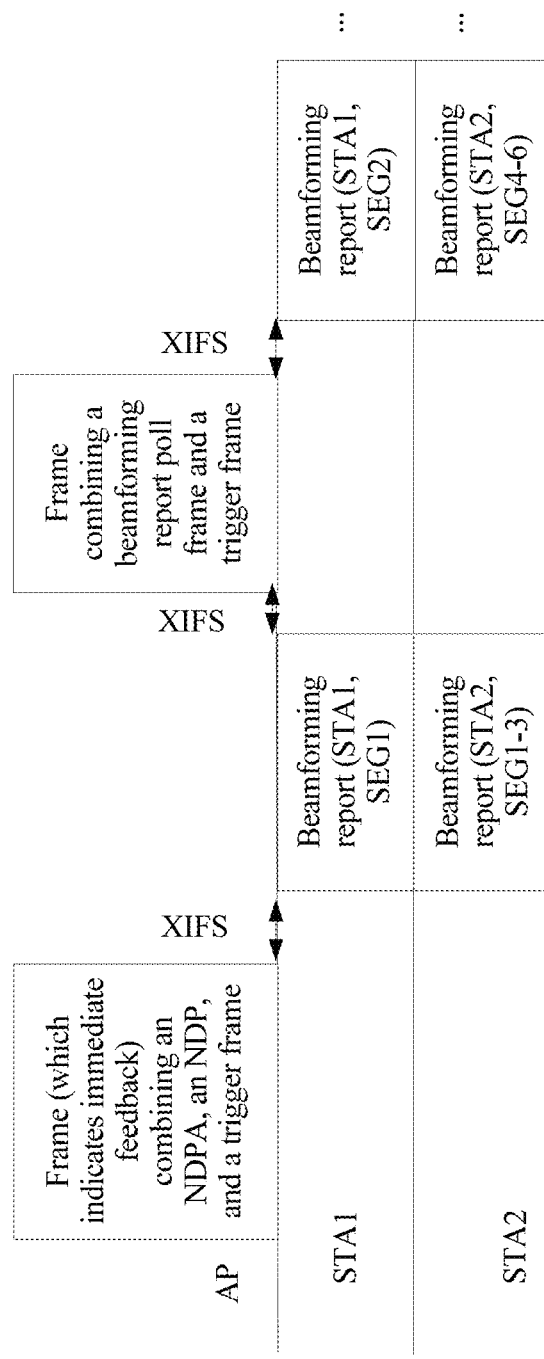
Figure 10C:
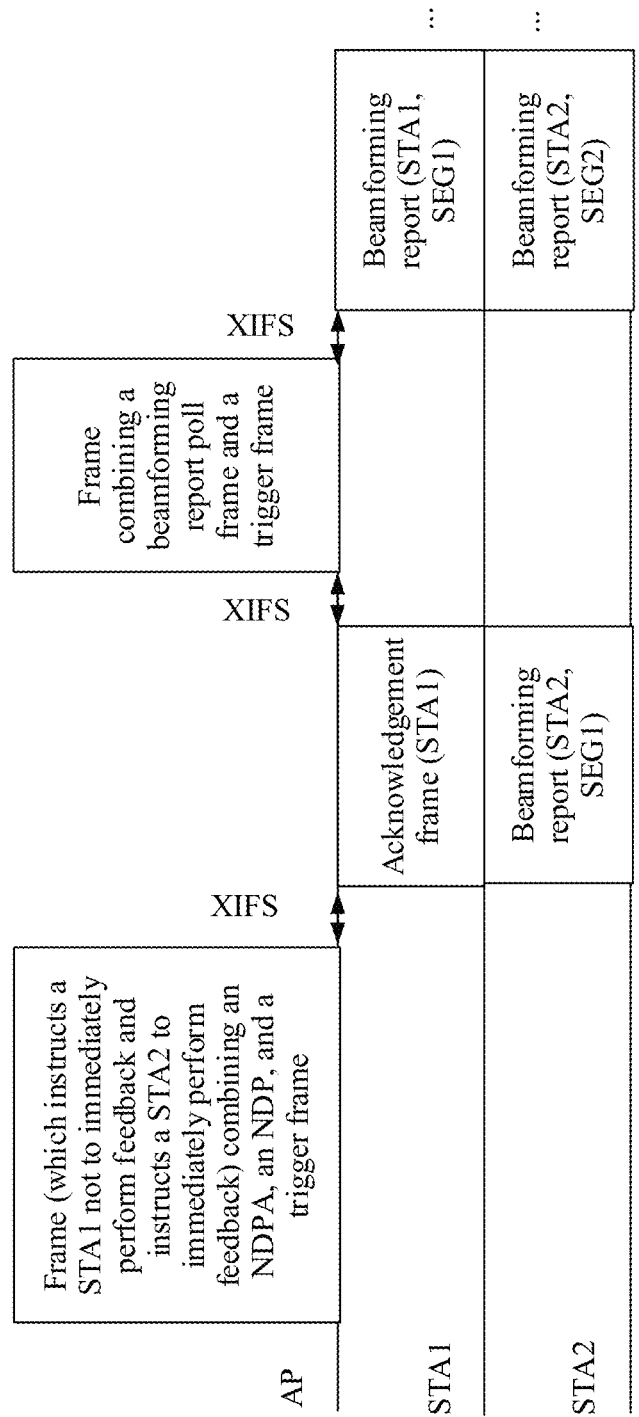

FIG. 10A, FIG. 10B, and FIG. 10C are interaction diagrams in which an access point schedules multiple stations to transmit channel state information according to yet another embodiment of the present invention. FIG. 10A, and FIG. 10B and FIG. 10C separately reflect this embodiment of the present invention from two different perspectives. FIG. 10A reflects information or message exchange between an access point and a station. FIG. 10B and FIG. 10C reflect frame exchange between an access point and a station. Essence of FIG. 10B and FIG. 10C is the same as that of FIG. 10A because information or a message is carried in a frame.

1001. An AP sends a first resource scheduling message, a feedback indication message, and a high-efficiency long training sequence to a STA.

The STA herein may be a STA1 and a STA2 in FIG. 10, and may further include another STA that is not drawn herein. The access point may send, in a broadcast manner, frames combining NDPAs, NDPs, and trigger frames to multiple stations, and add first resource scheduling messages, feedback indication messages, and high-efficiency long training sequences to fields in the combination frame, to schedule the multiple stations to perform feedback. The combination frame includes indication information used to instruct whether to immediately perform feedback, for example, the indication information may be carried in the NDPA or the trigger frame.

1002. The STA returns channel state information or an acknowledgement message to the AP.

The station may receive the first resource scheduling message, the feedback indication message, and the high-efficiency long training sequence that are sent by the access point, may estimate channel state information, and may feed back the channel state information or the acknowledgement message to the access point. Generally, when the access point instructs the station to immediately perform feedback, the station may feed back the channel state information to the access point. When the access point instructs the station not to immediately perform feedback, the station may feed back the acknowledgement message first, to indicate that the first resource scheduling message, the feedback indication message, and the high-efficiency long training sequence have been received.

The indication information of the access point may instruct all stations to immediately perform feedback or not to immediately perform feedback, or may separately instruct each station, that is, instruct some stations to immediately perform feedback and instruct some stations not to immediately perform feedback. The station may feed back channel state information or acknowledgement message to the access point according to an indication.

1003. The AP sends a second resource scheduling message and a polling scheduling message to the STA.

After receiving the channel state information or the acknowledgement message that is sent by the station, the access point may continue to send the second resource scheduling message and the polling scheduling message to the station, to schedule the station to continue to feed back channel state information, until channel state information is fully fed back successfully.

1004. The STA returns, to the AP, channel state information that is not successfully fed back.

After receiving the second resource scheduling message and the polling scheduling message that are sent by the access point, the station continues to feed back, to the access point, the channel state information that is not successfully fed back.

In this embodiment of the present invention, the STA1 and the STA2 each may be any station. A procedure executed by the STA2 may be executed by the STA1, and similarly, a procedure executed by the STA1 may also be executed by the STA2. Merely for ease of description, the STA1 and the STA2 are used to differentiate stations in the present invention, and are not intended to limit the protection scope of the present invention.

Steps displayed in a flowchart in FIG. 10B are in a one-to-one correspondence with steps displayed in a flowchart in FIG. 10A. FIG. 10B shows a case in which the access point instructs all stations to immediately perform feedback. When the access point instructs both the station 1 and the station 2 to immediately perform feedback, the station 1 and the station 2 immediately feed back beamforming reports. The beamforming report is a carrier of channel state information. The access point may further continue to send a frame combining a beamforming report poll frame and a trigger frame, to continue to schedule the station to feed back channel state information that is not successfully fed back.

Steps displayed in a flowchart in FIG. 10C are in a one-to-one correspondence with steps displayed in a flowchart in FIG. 10A. FIG. 10C shows a case in which the access point instructs some stations not to immediately perform feedback and instructs some stations to immediately perform feedback. When the access point instructs the station 1 not to immediately perform feedback, the station 1 may feed back an acknowledgement message. When the access point instructs the station 2 to immediately perform feedback, the station 2 may feed back a beamforming report. The beamforming report is a carrier of channel state information. The access point may further continue to send a frame combining a beamforming report poll frame and a trigger frame, to continue to schedule the station to feed back channel state information that is not successfully fed back.

FIG. 10 mainly describes a case in which an AP sends a feedback indication message, a high-efficiency long training sequence, and a resource scheduling message to a STA, and after receiving the feedback indication message, the high-efficiency long training sequence, and the resource scheduling message, the station may feed back channel state information or an acknowledgement message according to an instruction of the AP; and subsequently, the AP triggers the STA to continue to feed back channel state information that is not successfully fed back, so that when the STA has an insufficient resource for feeding back channel state information in an entire feedback process, the STA may feed back a part of channel state information first, and after receiving a resource scheduling message that is sent by the AP and is for continuing to feed back another part of channel state information, the STA may continue to feed back channel state information that is not successfully fed back, until the AP fully receives the channel state information of the STA.

In this embodiment of the present invention, the access point may separately instruct different stations to immediately perform feedback or not to immediately perform feedback, and procedures of the stations are separately executed according to indications of the access point, and are not described herein one by one.

Figures 11, 12:
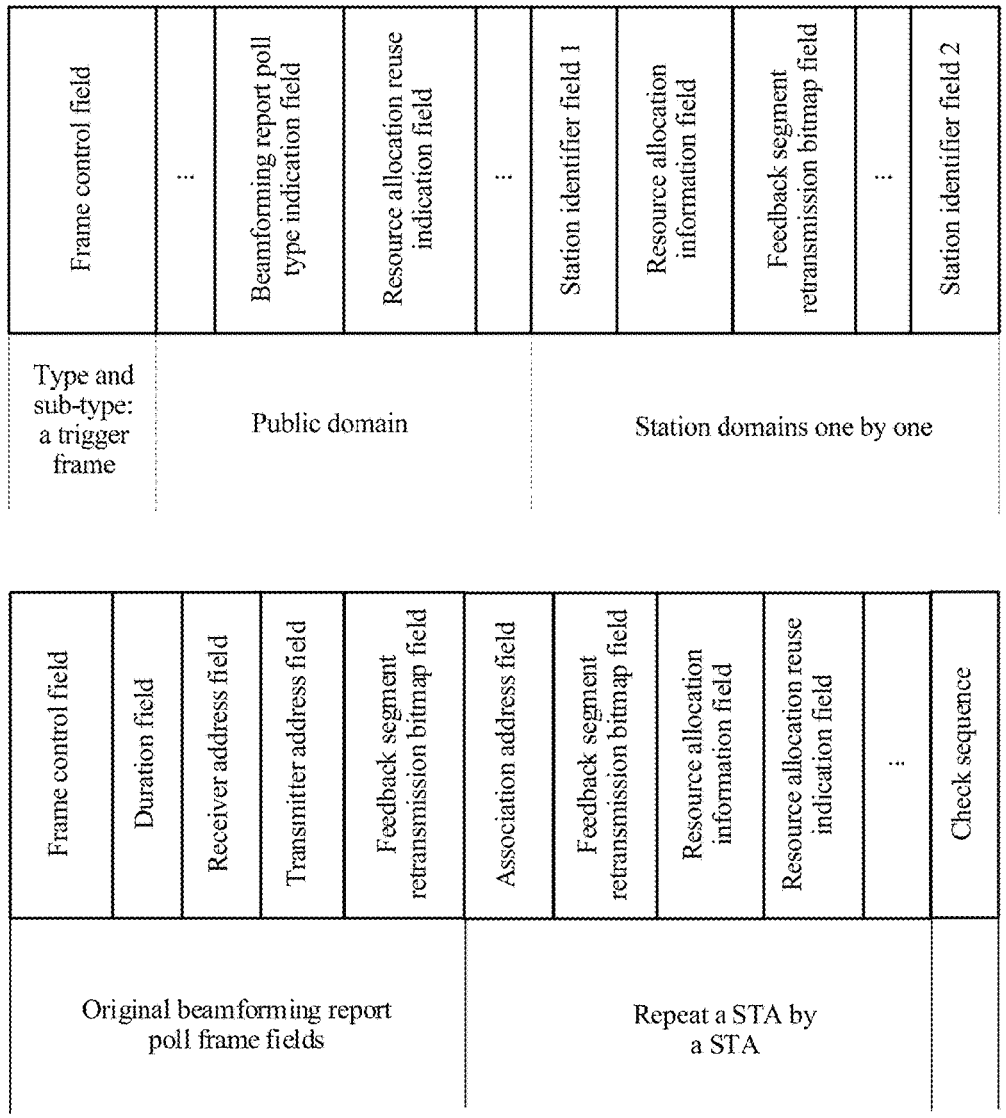
FIG. 11 is a structural diagram of a frame that combines a beamforming report poll frame and a trigger frame and that is designed based on the trigger frame according to an embodiment of the present invention.
FIG. 12 is a structural diagram of a frame that combines a beamforming report poll frame and a trigger frame and that is designed based on the beamforming report poll frame according to another embodiment of the present invention.

With reference to FIG. 11 and FIG. 12, the following describes a specific structure of a frame that combines a beamforming report poll frame and a trigger frame and is used in an embodiment of the present invention.

Embodiment 11

FIG. 11 is a structural diagram of a frame that combines a beamforming report poll frame and a trigger frame and that is designed based on the trigger frame according to an embodiment of the present invention.

The combination frame in FIG. 11 is designed based on the trigger frame, and may reuse an original trigger frame. The combination frame in FIG. 11 includes a frame control field, a beamforming report poll type indication field, a resource allocation reuse indication field, a station identifier field, a resource allocation information field, and a feedback segment retransmission bitmap field.

The frame control field may be used to indicate that the frame may be used for resource scheduling. The beamforming report poll type indication field may be used to indicate a type of the frame, and the type of the frame may be used to perform polling on a beamforming report. Specifically, the feedback segment retransmission bitmap field may be used to indicate which segments are to be transmitted. The resource allocation information field may include a resource scheduling message. A resource allocation reuse indication field may be used to indicate whether a communication resource indicated by the frame is the same as a communication resource used in previous transmission. When the communication resource indicated by the frame is the same as the communication resource used in the previous transmission, the resource allocation information field may not be required. Instead, the communication resource used in the previous transmission is directly used for transmission. When the communication resource indicated by the frame is different from the communication resource used in the previous transmission, a communication resource indicated by the resource scheduling message included in the resource allocation information field in the frame may be used for transmission. The station identifier field is used to indicate a station that needs to feed back channel state information to an access point.

Embodiment 12

FIG. 12 is a structural diagram of a frame that combines a beamforming report poll frame and a trigger frame and that is designed based on the beamforming report poll frame according to another embodiment of the present invention.

The combination frame in FIG. 12 is designed based on the beamforming report poll frame, and may reuse an original beamforming report poll frame. The combination frame in FIG. 12 includes a frame control field, a duration field, a receiver address field, a transmitter address field, a feedback segment retransmission bitmap field, an association address field, and a feedback segment retransmission bitmap field and a check sequence field of each station.

The frame control field may be used to indicate that the frame may be used for performing polling on a beamforming report. An association address field is used to indicate an identifier of a polled station. A feedback segment retransmission bitmap field in original beamforming report poll frame fields may be used to indicate that a type of the frame is a frame combining a beamforming report poll frame and a trigger frame. The resource allocation information field may include a resource scheduling message. A resource allocation reuse indication field may be used to indicate whether a communication resource indicated by the frame is the same as a communication resource used in previous transmission. When the communication resource indicated by the frame is the same as the communication resource used in the previous transmission, the resource allocation information field may not be required. Instead, the communication resource used in the previous transmission is directly used for transmission. When the communication resource indicated by the frame is different from the communication resource used in the previous transmission, a communication resource indicated by the resource scheduling message included in the resource allocation information field in the frame may be used for transmission.

With reference to FIG. 1B to FIG. 12, the foregoing describes in detail, separately from perspectives of a station and an access point, a method for transmitting channel state information according to embodiments of the present invention. With reference to FIG. 13 to FIG. 19, the following describes in detail an access point and a station for transmitting channel state information according to the embodiments of the present invention.

Apparatus Embodiment 1

Figure 13:
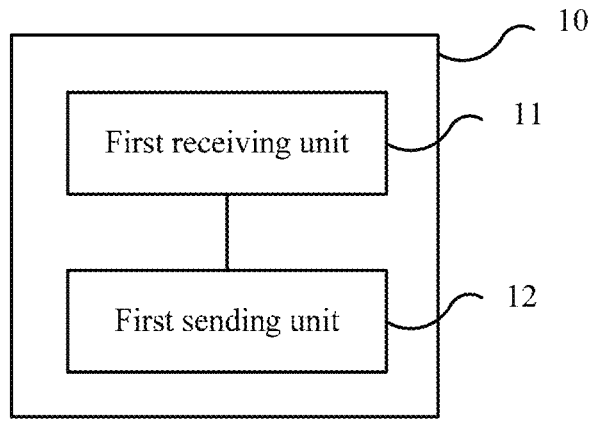
FIG. 13 is a schematic diagram of a station for transmitting channel state information according to an embodiment of the present invention.

FIG. 13 is a schematic diagram of a station for transmitting channel state information according to an embodiment of the present invention. The station in FIG. 13 includes a first receiving unit 11 and a first sending unit 12.

The first receiving unit 11 is configured to receive a feedback indication message, a high-efficiency long training sequence, and a first resource scheduling message that are sent by an access point AP. The feedback indication message is used to indicate at least two target stations STAs that need to feed back channel state information to the AP. The high-efficiency long training sequence is used to determine first channel state information of the target STA. The first resource scheduling message is used to indicate a first communication resource used by the target STA when the target STA performs feedback according to the feedback indication message, the high-efficiency long training sequence, and the first resource scheduling message.

The first sending unit 12 is configured to: when the feedback indication message received by the receiving unit is parsed and it is determined that the STA belongs to the target STAs, send an acknowledgement message to the AP by using the first communication resource. The acknowledgement message is used to indicate that the feedback indication message, the high-efficiency long training sequence, and the first resource scheduling message have been received.

In this embodiment of the present invention, an access point sends a resource scheduling message, a feedback indication message, and a high-efficiency long training sequence to a station, to schedule multiple stations to transmit channel state information; and the station feeds back an acknowledgement message to the access point. In this way, resource waste caused when some stations cannot immediately perform feedback can be avoided, and channel state information transmission efficiency can be improved.

Optionally, in an embodiment of the present invention, the sending unit is specifically configured to: when the target STA cannot immediately feed back the first channel state information, an X interframe space XIFS later after the feedback indication message, the high-efficiency long training sequence, and the first resource scheduling message are received, send the acknowledgement message to the AP by using the first communication resource.

Optionally, in an embodiment of the present invention, the station further includes a first determining unit. The first determining unit is configured to determine the first channel state information according to the high-efficiency long training sequence.

Optionally, in an embodiment of the present invention, the station further includes a second receiving unit and a second sending unit. The second receiving unit is configured to receive a second resource scheduling message sent by the AP. The second resource scheduling message is used to indicate a second communication resource used by a STA when the STA feeds back second channel state information. The second sending unit is configured to send the second channel state information to the AP by using the second communication resource. The second channel state information is a part or all of the first channel state information.

Optionally, in an embodiment of the present invention, the station further includes a third receiving unit and a third sending unit. The third receiving unit is configured to receive a first polling scheduling message and a third resource scheduling message that are sent by the AP. The first polling scheduling message is used by the AP for requesting third channel state information from the STA. The first polling scheduling message includes segment information of the third channel state information in the first channel state information. The third channel state information is a part or all of the first channel state information from which the second channel state information is removed. The third resource scheduling message is used to indicate a third communication resource used by a STA when the STA feeds back the third channel state information. The third sending unit is configured to send the third channel state information to the AP by using the third communication resource.

Optionally, in an embodiment of the present invention, the first polling scheduling message and the third resource scheduling message are borne in a same data packet.

Optionally, in an embodiment of the present invention, the first polling scheduling message and the third resource scheduling message are borne in a trigger frame of a same data packet. The trigger frame includes a first beamforming report poll type indication field and a first feedback segment retransmission bitmap field. The trigger frame further includes at least one of a first resource allocation information field or a first resource allocation reuse indication field. The third resource scheduling message is located in the first resource allocation information field. The first polling scheduling message is located in the first feedback segment retransmission bitmap field. The first resource allocation reuse indication field is used to indicate whether the third resource scheduling message is the same as the second resource scheduling message.

Optionally, in an embodiment of the present invention, the trigger frame further includes an identifier field of the STA.

Optionally, in an embodiment of the present invention, the first polling scheduling message and the third resource scheduling message are borne in a beamforming report poll BF Report Poll frame of a same data packet. The BF Report Poll frame may include a receiver address field, a second feedback segment retransmission bitmap field, and a third feedback segment retransmission bitmap field. The BF Report Poll frame may further include at least one of a second resource allocation information field or a second resource allocation reuse indication field. The third resource scheduling message is located in the second resource allocation information field. The first polling scheduling message is located in the third feedback segment retransmission bitmap field. Indication information of the third resource scheduling message is located in the second resource allocation reuse indication field.

Optionally, in an embodiment of the present invention, the BF Report Poll frame further includes an identifier field of the STA.

Optionally, in an embodiment of the present invention, that the BF Report Poll frame is a poll frame used to trigger multi-user channel state information transmission is indicated in any one of the following manners: the receiver address field, the second feedback segment retransmission bitmap field, or a length of the BF Report Poll frame.

Optionally, in an embodiment of the present invention, the station further includes a second determining unit, where the second determining unit is configured to determine that the STA cannot immediately feed back the first channel state information, according to at least one of the following conditions: the STA has a limited capability, a priority for buffering the first channel state information by the STA is less than a first threshold, or a size of a resource block in the first communication resource is less than a threshold.

The station for transmitting channel state information according to this embodiment of the present invention may be corresponding to the station in the method for transmitting channel state information in the embodiments of the present invention. In addition, the foregoing and other operations and/or functions of the units/modules of the station are separately used to implement a corresponding procedure of the method shown in FIG. 1B. For brevity, details are not described herein again.

Apparatus Embodiment 2

Figure 14:
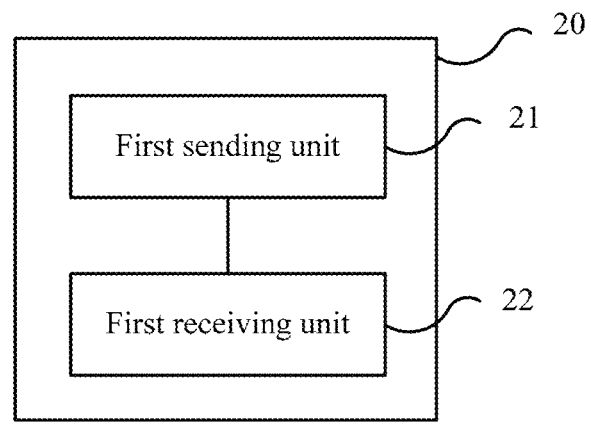
FIG. 14 is a schematic diagram of an access point for transmitting channel state information according to another embodiment of the present invention.

FIG. 14 is a schematic diagram of an access point for transmitting channel state information according to another embodiment of the present invention.

The access point in FIG. 14 includes a first sending unit 21 and a first receiving unit 22.

The first sending unit 21 is configured to send a feedback indication message, a high-efficiency long training sequence, and a first resource scheduling message to a station STA. The feedback indication message is used to indicate at least two target STAs that need to feed back channel state information. The high-efficiency long training sequence is used to determine first channel state information of the target STA. The first resource scheduling message is used to indicate a first communication resource used by the target STA when the target STA performs feedback according to the feedback indication message, the high-efficiency long training sequence, and the first resource scheduling message.

The first receiving unit 22 is configured to receive an acknowledgement message sent by the target STA by using the first communication resource indicated by the first resource scheduling message sent by the first sending unit. The acknowledgement message is used to indicate that the target STA has received the feedback indication message, the high-efficiency long training sequence, and the first resource scheduling message.

In this embodiment of the present invention, an access point sends a resource scheduling message, a feedback indication message, and a high-efficiency long training sequence to a station, to schedule multiple stations to transmit channel state information; and the station feeds back an acknowledgement message to the access point. In this way, resource waste caused when some stations cannot immediately perform feedback can be avoided, and channel state information transmission efficiency can be improved.

Optionally, in an embodiment of the present invention, the first receiving unit is specifically configured to receive the acknowledgement message that is sent, by using the first communication resource, by the target STA an X interframe space XIFS later after the target STA receives the feedback indication message, the high-efficiency long training sequence, and the first resource scheduling message, where the target STA cannot immediately feed back channel state information.

Optionally, in an embodiment of the present invention, the access point further includes a second sending unit and a second receiving unit. The second sending unit is configured to send a second resource scheduling message to the target STA. The second resource scheduling message is used to indicate a second communication resource used by the target STA when the target STA feeds back second channel state information. The second receiving unit is configured to receive the second channel state information sent by the target STA by using the second communication resource. The second channel state information is a part or all of the first channel state information.

Optionally, in an embodiment of the present invention, the access point further includes a third sending unit and a third receiving unit. The third sending unit is configured to send a first polling scheduling message and a third resource scheduling message to the target STA. The first polling scheduling message is used to request third channel state information from the target STA. The first polling scheduling message includes segment information of the third channel state information in the first channel state information. The third channel state information is a part or all of the first channel state information from which the second channel state information is removed. The third resource scheduling message is used to indicate a third communication resource used by the target STA when the target STA feeds back the third channel state information. The third receiving unit is configured to receive the third channel state information sent by the target STA by using the third communication resource.

Optionally, in an embodiment of the present invention, the first polling scheduling message and the third resource scheduling message are borne in a same data packet.

Optionally, in an embodiment of the present invention, the first polling scheduling message and the third resource scheduling message are borne in a trigger frame of a same data packet. The trigger frame includes a first beamforming report poll type indication field and a first feedback segment retransmission bitmap field. The trigger frame further includes at least one of a first resource allocation information field or a first resource allocation reuse indication field. The third resource scheduling message is located in the first resource allocation information field. The first polling scheduling message is located in the first feedback segment retransmission bitmap field. The first resource allocation reuse indication field is used to indicate whether the third resource scheduling message is the same as the second resource scheduling message.

Optionally, in an embodiment of the present invention, the trigger frame further includes an identifier field of the STA.

Optionally, in an embodiment of the present invention, the first polling scheduling message and the third resource scheduling message are borne in a beamforming report poll BF Report Poll frame of a same data packet. The BF Report Poll frame may include a receiver address field, a second feedback segment retransmission bitmap field, and a third feedback segment retransmission bitmap field. The BF Report Poll frame may further include at least one of a second resource allocation information field or a second resource allocation reuse indication field. The third resource scheduling message is located in the second resource allocation information field. The first polling scheduling message is located in the third feedback segment retransmission bitmap field. Indication information of the third resource scheduling message is located in the second resource allocation reuse indication field.

Optionally, in an embodiment of the present invention, the BF Report Poll frame further includes an identifier field of the STA.

Optionally, in an embodiment of the present invention, that the BF Report Poll frame is a poll frame used to trigger multi-user channel state information transmission is indicated in any one of the following manners: the receiver address field, the second feedback segment retransmission bitmap field, or a length of the BF Report Poll frame.

Optionally, in an embodiment of the present invention, the target STA that cannot immediately feed back the first channel state information meets at least one of the following conditions: the target STA has a limited capability, a priority for buffering the first channel state information by the target STA is less than a first threshold, or a size of a resource block in the first communication resource is less than a threshold.

The access point for transmitting channel state information according to this embodiment of the present invention may be corresponding to the method for transmitting channel state information in the embodiments of the present invention. In addition, the foregoing and other operations and/or functions of the units/modules of the access point are separately used to implement a corresponding procedure of the method shown in FIG. 2. For brevity, details are not described herein again.

Apparatus Embodiment 3

Figure 15:
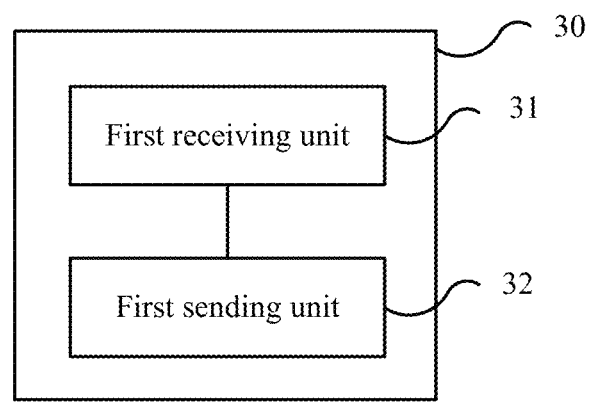
FIG. 15 is a schematic diagram of a station for transmitting channel state information according to still another embodiment of the present invention.

FIG. 15 is a schematic diagram of a station for transmitting channel state information according to still another embodiment of the present invention.

The station in FIG. 15 includes a first receiving unit 31 and a first sending unit 32.

The first receiving unit 31 is configured to receive a first resource scheduling message, a first feedback indication message, and a first high-efficiency long training sequence that are sent by an access point AP according to first indication information. The first feedback indication message is used to indicate at least two target stations STAs that need to feed back channel state information to the AP. The first resource scheduling message or the first feedback indication message includes the first indication information. The first indication information is used to instruct the target STA whether to immediately feed back channel state information. The first high-efficiency long training sequence is used to determine first channel state information of the target STA. The first resource scheduling message is used to indicate a first communication resource used by the target STA when the target STA feeds back second channel state information or an acknowledgement message. The second channel state information is a part or all of the first channel state information. The acknowledgement message is used to indicate that the first feedback indication message, the first high-efficiency long training sequence, and the first resource scheduling message have been received.

The first sending unit 32 is configured to: when the first feedback indication message received by the first receiving unit is parsed and it is determined that the STA belongs to the target STAs, perform channel estimation according to the first high-efficiency long training sequence received by the first receiving unit, to determine the first channel state information, and send the second channel state information or the acknowledgement message to the AP by using the first communication resource indicated by the first resource scheduling message received by the first receiving unit.

In this embodiment of the present invention, an access point sends a resource scheduling message, a feedback indication message, and a high-efficiency long training sequence to a station, to schedule multiple stations to transmit channel state information, and the access point may instruct the station whether to immediately perform feedback; and the station may feed back channel state information or an acknowledgement message to the access point according to an instruction of the access point. In this way, resource waste caused when some stations cannot immediately perform feedback can be avoided, and channel state information transmission efficiency can be improved.

Optionally, in an embodiment of the present invention, the first receiving unit is specifically configured to: when the first indication information instructs the STA not to immediately feed back channel state information, receive the first resource scheduling message an X interframe space XIFS later after receiving the first feedback indication message and the first high-efficiency long training sequence that are sent by the AP. The first feedback indication message includes the first indication information. The first sending unit is specifically configured to: an X interframe space XIFS later after the first resource scheduling message is received, send the second channel state information to the AP according to the first resource scheduling message, the first feedback indication message, and the first high-efficiency long training sequence by using the first communication resource.

Optionally, in an embodiment of the present invention, the station further includes a second receiving unit and a second sending unit. The second receiving unit is configured to receive a first polling scheduling message and a second resource scheduling message that are sent by the AP. The first polling scheduling message is used to request third channel state information from the STA. The first polling scheduling message includes segment information of the third channel state information in the first channel state information. The third channel state information is a part or all of the first channel state information from which the second channel state information is removed. The second resource scheduling message is used to indicate a second communication resource used by a STA when the STA feeds back the third channel state information. The second sending unit is configured to send the third channel state information to the AP by using the second communication resource.

Optionally, in an embodiment of the present invention, the first sending unit is specifically configured to: when the first indication information instructs the STA not to immediately feed back channel state information, an X interframe space XIFS later after receiving the first resource scheduling message, send the acknowledgement message to the AP by using the first communication resource.

Optionally, in an embodiment of the present invention, the station further includes a third receiving unit and a third sending unit. The third receiving unit is configured to receive a third resource scheduling message sent by the AP. The third resource scheduling message is used to indicate a third communication resource used by a STA when the STA feeds back fourth channel state information. The third sending unit is configured to send the fourth channel state information by using the third communication resource, where the fourth channel state information is a part or all of the first channel state information.

Optionally, in an embodiment of the present invention, the station further includes a fourth receiving unit and a fourth sending unit. The fourth receiving unit is configured to receive a second polling scheduling message and a fourth resource scheduling message that are sent by the AP. The second polling scheduling message is used to request fifth channel state information from the STA. The second polling scheduling message includes segment information of the fifth channel state information in the first channel state information. The fifth channel state information is a part or all of the first channel state information from which the fourth channel state information is removed. The fourth resource scheduling message is used to indicate a fourth communication resource used by the target STA when the target STA feeds back the fifth channel state information. The fourth sending unit is configured to send the fifth channel state information to the AP by using the fourth communication resource.

Optionally, in an embodiment of the present invention, the first sending unit is specifically configured to: when the first indication information instructs the STA to immediately feed back channel state information, an X interframe space XIFS later after sending the first resource scheduling message, send the second channel state information to the AP by using the first communication resource.

Optionally, in an embodiment of the present invention, the station further includes a fifth receiving unit and a fifth sending unit. The fifth receiving unit is configured to receive a third polling scheduling message and a fifth resource scheduling message that are sent by the AP. The third polling scheduling message is used to request sixth channel state information from the STA. The third polling scheduling message includes segment information of the sixth channel state information in the first channel state information. The sixth channel state information is a part or all of the first channel state information from which the second channel state information is removed. The fifth resource scheduling message is used to indicate a fifth communication resource used by the target STA when the target STA feeds back the sixth channel state information. The fifth sending unit is configured to send the sixth channel state information to the AP by using the fifth communication resource.

Optionally, in an embodiment of the present invention, the first indication information includes a field used to indicate a time at which the STA feeds back channel state information.

Optionally, in an embodiment of the present invention, the first indication information includes a field used to instruct all STAs or separately instruct each STA whether to immediately feed back channel state information.

Optionally, in an embodiment of the present invention, when the first sending unit is specifically configured to send the first resource scheduling message after sending the first feedback indication message and the first high-efficiency long training sequence, the first indication information is used to indicate non-immediate feedback.

Optionally, in an embodiment of the present invention, when a size of a resource block in the first communication resource is less than a first threshold or a quantity of spatial streams used by a resource block in the first communication resource is less than a second threshold, the first indication information is used to indicate non-immediate feedback; or when a size of a resource block in the first communication resource is greater than or equal to a first threshold or a quantity of spatial streams used by a resource block in the first communication resource is greater than or equal to a second threshold, the first indication information is used to indicate immediate feedback.

Optionally, in an embodiment of the present invention, the first feedback indication message, the first high-efficiency long training sequence, and the first resource scheduling message are located in different frames.

Optionally, in an embodiment of the present invention, the first polling scheduling message and the second resource scheduling message are located in a same data packet; or the second polling scheduling message and the fourth resource scheduling message are located in a same data packet; or the third polling scheduling message and the fifth resource scheduling message are located in a same data packet.

The station for transmitting channel state information according to this embodiment of the present invention may be corresponding to the method for transmitting channel state information in the embodiments of the present invention. In addition, the foregoing and other operations and/or functions of the units/modules of the station are separately used to implement a corresponding procedure of the method shown in FIG. 3. For brevity, details are not described herein again.

Apparatus Embodiment 4

Figure 16:
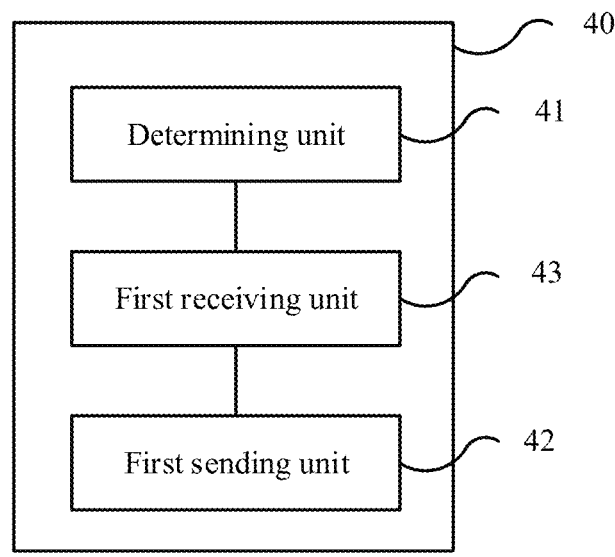
FIG. 16 is a schematic diagram of an access point for transmitting channel state information according to still another embodiment of the present invention.

FIG. 16 is a schematic diagram of an access point for transmitting channel state information according to still another embodiment of the present invention.

The access point in FIG. 16 includes a determining unit 41, a first sending unit 42, and a first receiving unit 43.

The determining unit 41 is configured to determine first indication information, where the first indication information is used to instruct at least two target stations STAs whether to immediately feed back channel state information, where the at least two target stations STAs need to feed back channel state information to the access point AP.

The first sending unit 42 is configured to send a first resource scheduling message, a first feedback indication message, and a first high-efficiency long training sequence to a target STA according to the first indication information determined by the determining unit. The first resource scheduling message or the first feedback indication message includes the first indication information. The first feedback indication message is used to indicate the at least two target stations STAs that need to feed back channel state information to the AP. The first high-efficiency long training sequence is used to determine first channel state information of the target STA. The first resource scheduling message is used to indicate a first communication resource used by the target STA when the target STA feeds back second channel state information or an acknowledgement message. The second channel state information is a part or all of the first channel state information. The acknowledgement message is used to indicate that the first feedback indication message, the first high-efficiency long training sequence, and the first resource scheduling message have been received.

The first receiving unit 43 is configured to receive the second channel state information or the acknowledgement message that is sent by the target STA by using the first communication resource and according to the first resource scheduling message, the first feedback indication message, and the first high-efficiency long training sequence that are sent by the first sending unit.

In this embodiment of the present invention, an access point sends a resource scheduling message, a feedback indication message, and a high-efficiency long training sequence to a station, to schedule multiple stations to transmit channel state information, and the access point may instruct the station whether to immediately perform feedback; and the station may feed back channel state information or an acknowledgement message to the access point according to an instruction of the access point. In this way, resource waste caused when some stations cannot immediately perform feedback can be avoided, and channel state information transmission efficiency can be improved.

Optionally, in an embodiment of the present invention, the first sending unit is specifically configured to: when the first indication information instructs the target STA not to immediately feed back channel state information, send the first resource scheduling message an X interframe space XIFS later after sending the first feedback indication message and the first high-efficiency long training sequence. The first feedback indication message includes the first indication information. The first receiving unit is specifically configured to: an X interframe space XIFS later after the first resource scheduling message is sent, receive the second channel state information that is sent by the STA according to the first resource scheduling message, the first feedback indication message, and the first high-efficiency long training sequence by using the first communication resource.

Optionally, in an embodiment of the present invention, the access point further includes a second sending unit and a second receiving unit. The second sending unit is configured to send a first polling scheduling message and a second resource scheduling message. The first polling scheduling message is used to request third channel state information from the target STA. The first polling scheduling message includes segment information of the third channel state information in the first channel state information. The third channel state information is a part or all of the first channel state information from which the second channel state information is removed. The second resource scheduling message is used to indicate a second communication resource used by the target STA when the target STA feeds back the third channel state information. The second receiving unit is configured to receive the third channel state information sent by the target STA by using the second communication resource.

Optionally, in an embodiment of the present invention, the first receiving unit is specifically configured to: when the first indication information instructs the target STA not to immediately feed back channel state information, an X interframe space XIFS later after the first resource scheduling message is sent, receive the acknowledgement message that is sent by the target STA according to the first resource scheduling message, the first feedback indication message, and the first high-efficiency long training sequence by using the first communication resource.

Optionally, in an embodiment of the present invention, the access point further includes a third sending unit and a third receiving unit. The third sending unit is configured to send a third resource scheduling message. The third resource scheduling message is used to indicate a third communication resource used by the target STA when the target STA feeds back fourth channel state information. The third receiving unit is configured to receive the fourth channel state information sent by the target STA by using the third communication resource, where the fourth channel state information is a part or all of the first channel state information.

Optionally, in an embodiment of the present invention, the access point further includes a fourth sending unit and a fourth receiving unit. The fourth sending unit is configured to send a second polling scheduling message and a fourth resource scheduling message. The second polling scheduling message is used to request fifth channel state information from the target STA. The second polling scheduling message includes segment information of the fifth channel state information in the first channel state information. The fifth channel state information is a part or all of the first channel state information from which the fourth channel state information is removed. The fourth resource scheduling message is used to indicate a fourth communication resource used by the target STA when the target STA feeds back the fifth channel state information. The fourth receiving unit is configured to receive the fifth channel state information sent by the target STA by using the fourth communication resource.

Optionally, in an embodiment of the present invention, the first receiving unit is specifically configured to: when the first indication information instructs the target STA to immediately feed back channel state information, an X interframe space XIFS later after the first resource scheduling message is sent, receive the second channel state information that is sent by the target STA according to the first resource scheduling message, the first feedback indication message, and the first high-efficiency long training sequence by using the first communication resource.

Optionally, in an embodiment of the present invention, the access point further includes a fifth sending unit and a fifth receiving unit. The fifth sending unit is configured to send a third polling scheduling message and a fifth resource scheduling message. The third polling scheduling message is used to request sixth channel state information from the target STA. The third polling scheduling message includes segment information of the sixth channel state information in the first channel state information. The sixth channel state information is a part or all of the first channel state information from which the second channel state information is removed. The fifth resource scheduling message is used to indicate a fifth communication resource used by the target STA when the target STA feeds back the sixth channel state information. The fifth receiving unit is configured to receive the sixth channel state information sent by the target STA by using the fifth communication resource.

Optionally, in an embodiment of the present invention, the first indication information includes a field used to indicate a time at which the target STA feeds back channel state information.

Optionally, in an embodiment of the present invention, the first indication information includes a field used to instruct all target STAs or separately instruct each target STA whether to immediately feed back channel state information.

Optionally, in an embodiment of the present invention, when the first resource scheduling message is sent after the first feedback indication message and the first high-efficiency long training sequence are sent, the first indication information is used to indicate non-immediate feedback.

Optionally, in an embodiment of the present invention, when a size of a resource block in the first communication resource is less than a first threshold or a quantity of spatial streams used by a resource block in the first communication resource is less than a second threshold, the first indication information is used to indicate non-immediate feedback; or when a size of a resource block in the first communication resource is greater than or equal to a first threshold or a quantity of spatial streams used by a resource block in the first communication resource is greater than or equal to a second threshold, the first indication information is used to indicate immediate feedback.

Optionally, in an embodiment of the present invention, the first feedback indication message, the first high-efficiency long training sequence, and the first resource scheduling message are located in different frames.

Optionally, in an embodiment of the present invention, the first polling scheduling message and the second resource scheduling message are located in a same data packet; or the second polling scheduling message and the fourth resource scheduling message are located in a same data packet; or the third polling scheduling message and the fifth resource scheduling message are located in a same data packet.

The access point for transmitting channel state information according to this embodiment of the present invention may be corresponding to the method for transmitting channel state information in the embodiments of the present invention. In addition, the foregoing and other operations and/or functions of the units/modules of the access point are separately used to implement a corresponding procedure of the method shown in FIG. 4. For brevity, details are not described herein again.

Apparatus Embodiment 5

Figure 17:
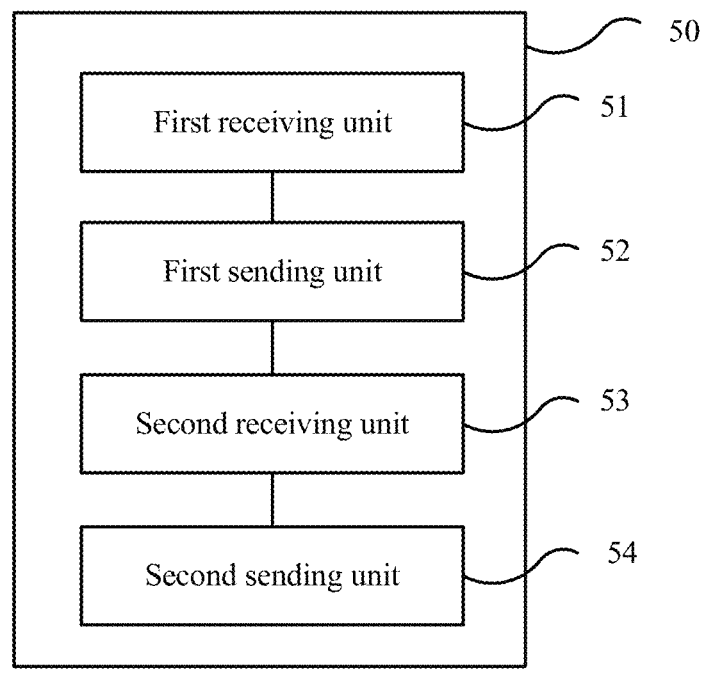
FIG. 17 is a schematic diagram of a station for transmitting channel state information according to still another embodiment of the present invention.

FIG. 17 is a schematic diagram of a station for transmitting channel state information according to still another embodiment of the present invention.

The station in FIG. 17 includes a first receiving unit 51, a first sending unit 52, a second receiving unit 53, and a second sending unit 54.

The first receiving unit 51 is configured to receive a feedback indication message, a high-efficiency long training sequence, and a first resource scheduling message that are sent by an access point AP. The feedback indication message is used to indicate at least two target STAs that need to feed back channel state information to the AP. The high-efficiency long training sequence is used to determine first channel state information of the target STA. The first resource scheduling message is used to indicate a first communication resource used by the target STA when the target STA feeds back second channel state information. The second channel state information is a part of the first channel state information.

The first sending unit 52 is configured to: when the feedback indication message received by the first receiving unit is parsed and it is determined, that the STA belongs to the target STAs, perform channel estimation according to the high-efficiency long training sequence received by the first receiving unit, to obtain the first channel state information, and send the second channel state information to the AP by using the first communication resource indicated by the first resource scheduling message received by the first receiving unit.

The second receiving unit 53 is configured to receive a first polling scheduling message and a second resource scheduling message that are sent by the AP. The first polling scheduling message is used by the AP for requesting third channel state information from the target STA. The first polling scheduling message includes segment information of the third channel state information in the first channel state information. The third channel state information is a part or all of the first channel state information from which the second channel state information is removed. The second resource scheduling message is used to indicate a second communication resource used by the target STA when the target STA feeds back the third channel state information.

The second sending unit 54 is configured to send the third channel state information to the AP by using the second communication resource indicated by the second resource scheduling message received by the second receiving unit.

In this embodiment of the present invention, an access point sends a resource scheduling message, a feedback indication message, and a high-efficiency long training sequence to a station, to schedule multiple stations to transmit channel state information; the station feeds back channel state information to the access point; and the access point may further continue to send a polling scheduling message and a resource scheduling message, to trigger the station to continue to feed back, to the access point, channel state information that is not successfully fed back. In this way, resource waste caused when feedback cannot be performed at one time due to an insufficient resource can be avoided, and channel state information transmission efficiency can be improved.

The station for transmitting channel state information according to this embodiment of the present invention may be corresponding to the method for transmitting channel state information in the embodiments of the present invention. In addition, the foregoing and other operations and/or functions of the units/modules of the station are separately used to implement a corresponding procedure of the method shown in FIG. 5. For brevity, details are not described herein again.

Apparatus Embodiment 6

Figure 18:
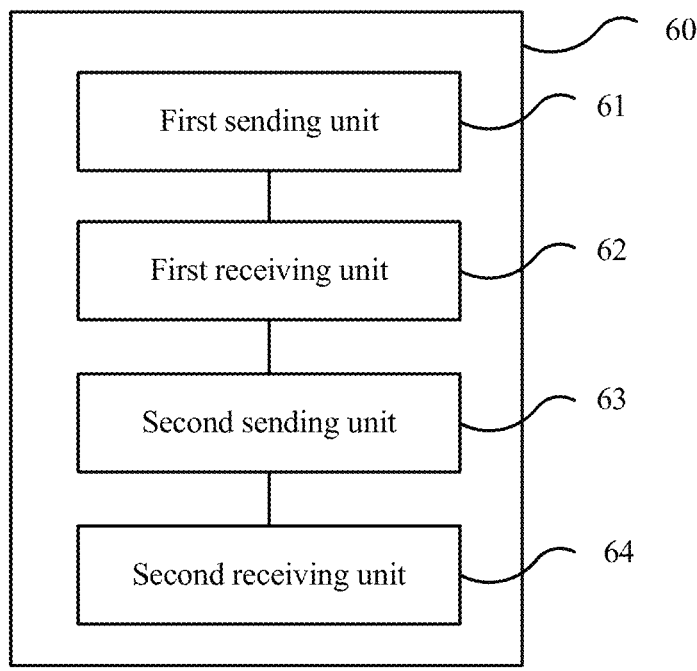
FIG. 18 is a schematic diagram of an access point for transmitting channel state information according to still another embodiment of the present invention.

FIG. 18 is a schematic diagram of an access point for transmitting channel state information according to still another embodiment of the present invention.

The access point in FIG. 18 includes a first sending unit 61, a first receiving unit 62, a second sending unit 63, and a second receiving unit 64.

The first sending unit 61 is configured to send a feedback indication message, a high-efficiency long training sequence, and a first resource scheduling message to a station STA. The feedback indication message is used to indicate at least two target STAs that need to feed back channel state information to the AP. The high-efficiency long training sequence is used to determine first channel state information of the target STA. The first resource scheduling message is used to indicate a first communication resource used by the target STA when the target STA feeds back second channel state information. The second channel state information is a part of the first channel state information.

The first receiving unit 62 is configured to receive the second channel state information sent by the target STA by using the first communication resource indicated by the first resource scheduling message sent by the first sending unit.

The second sending unit 63 is configured to send a first polling scheduling message and a second resource scheduling message to the target STA. The first polling scheduling message is used to request third channel state information from the target STA. The first polling scheduling message includes segment information of the third channel state information in the first channel state information. The third channel state information is a part or all of the first channel state information from which the second channel state information is removed. The second resource scheduling message is used to indicate a second communication resource used by the target STA when the target STA feeds back the third channel state information.

The second receiving unit 64 is configured to receive the third channel state information sent by the target STA by using the second communication resource indicated by the second resource scheduling message sent by the second sending unit.

In this embodiment of the present invention, an access point sends a resource scheduling message, a feedback indication message, and a high-efficiency long training sequence to a station, to schedule multiple stations to transmit channel state information; the station feeds back channel state information to the access point; and the access point may further continue to send a polling scheduling message and a resource scheduling message, to trigger the station to continue to feed back, to the access point, channel state information that is not successfully fed back. In this way, resource waste caused when feedback cannot be performed at one time due to an insufficient resource can be avoided, and channel state information transmission efficiency can be improved.

The access point for transmitting channel state information according to this embodiment of the present invention may be corresponding to the method for transmitting channel state information in the embodiments of the present invention. In addition, the foregoing and other operations and/or functions of the units/modules of the access point are separately used to implement a corresponding procedure of the method shown in FIG. 6. For brevity, details are not described herein again.

Apparatus Embodiment 7

Figure 19:
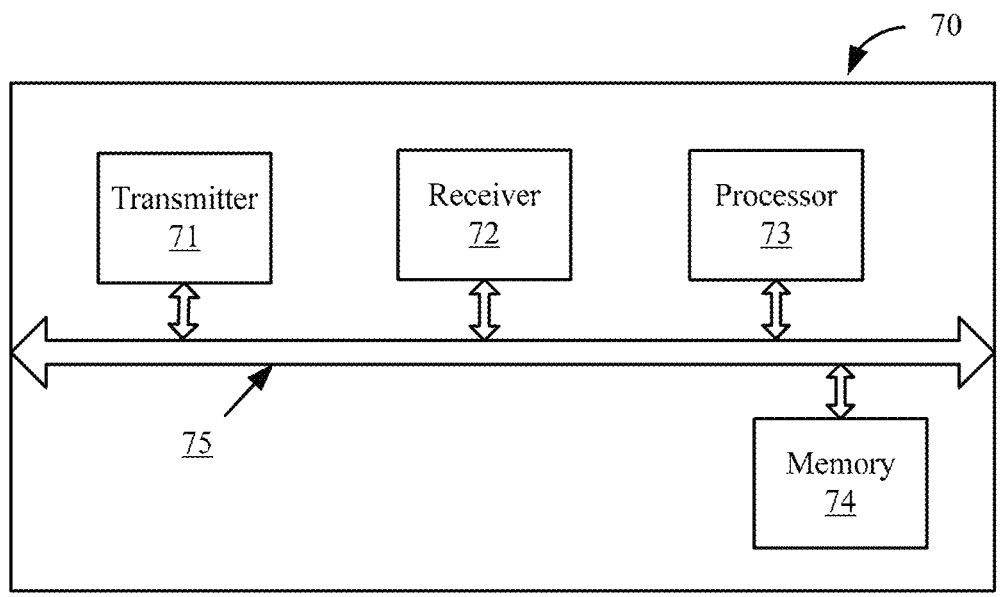
FIG. 19 is a schematic diagram of an apparatus for transmitting channel state information according to an embodiment of the present invention.

FIG. 19 is a schematic diagram of an apparatus for transmitting channel state information according to an embodiment of the present invention.

The apparatus 70 in FIG. 19 includes a transmitter 71, a receiver 72, a processor 73, and a memory 74. The processor 73 controls an operation of the apparatus 70, and may be configured to process a signal. The memory 74 may include a read-only memory and a random access memory, and provides an instruction and data for the processor 73. The transmitter 71 and the receiver 72 may be coupled to a bus system 75. All components of the apparatus 70 are coupled together by using the bus system 75, and the bus system 75 includes a power bus, a control bus, and a status signal bus in addition to a data bus. However, for clarity of description, various buses are marked as the bus system 75 in the figure.

The foregoing methods disclosed in the embodiments of the present invention may be applied to the processor 73, or may be implemented by the processor 73. In an implementation process, steps of the foregoing methods may be performed by using an integrated logic circuit of hardware in the processor 73 or an instruction in a form of software. The processor 73 may be a general purpose processor, a digital signal processor, an application-specific integrated circuit, a field programmable gate array or another programmable logic device, a discrete gate or a transistor logic device, or a discrete hardware component, and may implement or execute methods, steps, and logical block diagrams that are disclosed in the embodiments of the present invention. The general purpose processor may be a microprocessor, or any conventional processor, or the like. The steps of the methods disclosed with reference to the embodiments of the present invention may be directly performed by a hardware processor, or may be performed by using a combination of hardware in the processor and a software module. The software module may be located in a mature storage medium in the art, for example, a random access memory, a flash memory, a read-only memory, a programmable read-only memory, an electrically-erasable programmable memory, or a register. The storage medium is located in the memory 74. The processor 73 reads information in the memory 74, and completes the steps of the foregoing methods in combination with hardware of the processor.

Specifically, when the apparatus 70 is a station, the receiver 72 may be configured to receive a feedback indication message, a high-efficiency long training sequence, and a first resource scheduling message that are sent by an access point AP. The feedback indication message is used to indicate at least two target stations STAs that need to feed back channel state information to the AP. The high-efficiency long training sequence is used to determine first channel state information of the target STA. The first resource scheduling message is used to indicate a first communication resource used by the target STA when the target STA performs feedback according to the feedback indication message, the high-efficiency long training sequence, and the first resource scheduling message.

The transmitter 71 may be configured to: when it is determined, according to the received feedback indication message, that the STA belongs to the target STAs, send an acknowledgement message to the AP by using the first communication resource. The acknowledgement message is used to indicate that the feedback indication message, the high-efficiency long training sequence, and the first resource scheduling message have been received.

In this embodiment of the present invention, an access point sends a resource scheduling message, a feedback indication message, and a high-efficiency long training sequence to a station, to schedule multiple stations to transmit channel state information; and the station feeds back an acknowledgement message to the access point. In this way, resource waste caused when some stations cannot immediately perform feedback can be avoided, and channel state information transmission efficiency can be improved.

Optionally, in an embodiment of the present invention, the transmitter 71 may be configured to: when the target STA cannot immediately feed back the first channel state information, an X interframe space XIFS later after the feedback indication message, the high-efficiency long training sequence, and the first resource scheduling message are received, send the acknowledgement message to the AP by using the first communication resource.

Optionally, in an embodiment of the present invention, the processor 73 may be configured to determine the first channel state information according to the high-efficiency long training sequence.

Optionally, in an embodiment of the present invention, the receiver 72 is configured to receive a second resource scheduling message sent by the AP. The second resource scheduling message is used to indicate a second communication resource used by a STA when the STA feeds back second channel state information. The transmitter 71 may be configured to send the second channel state information to the AP by using the second communication resource. The second channel state information is a part or all of the first channel state information.

Optionally, in an embodiment of the present invention, the receiver 72 may be configured to receive a first polling scheduling message and a third resource scheduling message that are sent by the AP. The first polling scheduling message is used by the AP for requesting third channel state information from the STA. The first polling scheduling message includes segment information of the third channel state information in the first channel state information. The third channel state information is a part or all of the first channel state information from which the second channel state information is removed. The third resource scheduling message is used to indicate a third communication resource used by a STA when the STA feeds back the third channel state information. The transmitter 71 may be configured to send the third channel state information to the AP by using the third communication resource.

Optionally, in an embodiment of the present invention, the first polling scheduling message and the third resource scheduling message are borne in a same data packet.

Optionally, in an embodiment of the present invention, the first polling scheduling message and the third resource scheduling message are borne in a trigger frame of a same data packet. The trigger frame includes a first beamforming report poll type indication field and a first feedback segment retransmission bitmap field. The trigger frame further includes at least one of a first resource allocation information field or a first resource allocation reuse indication field. The third resource scheduling message is located in the first resource allocation information field. The first polling scheduling message is located in the first feedback segment retransmission bitmap field. The first resource allocation reuse indication field is used to indicate whether the third resource scheduling message is the same as the second resource scheduling message.

Optionally, in an embodiment of the present invention, the trigger frame further includes an identifier field of the STA.

Optionally, in an embodiment of the present invention, the first polling scheduling message and the third resource scheduling message are borne in a beamforming report poll BF Report Poll frame of a same data packet. The BF Report Poll frame may include a receiver address field, a second feedback segment retransmission bitmap field, and a third feedback segment retransmission bitmap field. The BF Report Poll frame may further include at least one of a second resource allocation information field or a second resource allocation reuse indication field. The third resource scheduling message is located in the second resource allocation information field. The first polling scheduling message is located in the third feedback segment retransmission bitmap field. Indication information of the third resource scheduling message is located in the second resource allocation reuse indication field.

Optionally, in an embodiment of the present invention, the BF Report Poll frame further includes an identifier field of the STA.

Optionally, in an embodiment of the present invention, that the BF Report Poll frame is a poll frame used to trigger multi-user channel state information transmission is indicated in any one of the following manners: the receiver address field, the second feedback segment retransmission bitmap field, or a length of the BF Report Poll frame.

Optionally, in an embodiment of the present invention, the station further includes a processor, where the processor is configured to determine that the STA cannot immediately feed back the first channel state information, according to at least one of the following conditions: the STA has a limited capability, a priority for buffering the first channel state information by the STA is less than a first threshold, or a size of a resource block in the first communication resource is less than a threshold.

The station for transmitting channel state information according to this embodiment of the present invention may be corresponding to the method for transmitting channel state information in the embodiments of the present invention. In addition, the foregoing and other operations and/or functions of the units/modules of the station are separately used to implement a corresponding procedure of the method shown in FIG. 1B. For brevity, details are not described herein again.

Apparatus Embodiment 8

Specifically, when the apparatus 70 is an access point, the transmitter 71 may be configured to send a feedback indication message, a high-efficiency long training sequence, and a first resource scheduling message to a station STA. The feedback indication message is used to indicate at least two target STAs that need to feed back channel state information. The high-efficiency long training sequence is used to determine first channel state information of the target STA. The first resource scheduling message is used to indicate a first communication resource used by the target STA when the target STA performs feedback according to the feedback indication message, the high-efficiency long training sequence, and the first resource scheduling message.

The receiver 72 may be configured to receive an acknowledgement message sent by the target STA by using the first communication resource indicated by the sent first resource scheduling message. The acknowledgement message is used to indicate that the target STA has received the feedback indication message, the high-efficiency long training sequence, and the first resource scheduling message.

In this embodiment of the present invention, an access point sends a resource scheduling message, a feedback indication message, and a high-efficiency long training sequence to a station, to schedule multiple stations to transmit channel state information; and the station feeds back an acknowledgement message to the access point. In this way, resource waste caused when some stations cannot immediately perform feedback can be avoided, and channel state information transmission efficiency can be improved.

Optionally, in an embodiment of the present invention, the receiver 72 may be configured to receive the acknowledgement message that is sent, by using the first communication resource, by the target STA an X interframe space XIFS later after the target STA receives the feedback indication message, the high-efficiency long training sequence, and the first resource scheduling message, where the target STA cannot immediately feed back channel state information.

Optionally, in an embodiment of the present invention, the transmitter 71 may be configured to send a second resource scheduling message to the target STA. The second resource scheduling message is used to indicate a second communication resource used by the target STA when the target STA feeds back second channel state information. The receiver 72 may be configured to receive the second channel state information sent by the target STA by using the second communication resource. The second channel state information is a part or all of the first channel state information.

Optionally, in an embodiment of the present invention, the transmitter 71 may be configured to send a first polling scheduling message and a third resource scheduling message to the target STA. The first polling scheduling message is used to request third channel state information from the target STA. The first polling scheduling message includes segment information of the third channel state information in the first channel state information. The third channel state information is a part or all of the first channel state information from which the second channel state information is removed. The third resource scheduling message is used to indicate a third communication resource used by the target STA when the target STA feeds back the third channel state information. The receiver 72 may be configured to receive the third channel state information sent by the target STA by using the third communication resource.

Optionally, in an embodiment of the present invention, the first polling scheduling message and the third resource scheduling message are borne in a same data packet. Optionally, in an embodiment of the present invention, the first polling scheduling message and the third resource scheduling message are borne in a trigger frame of a same data packet. The trigger frame includes a first beamforming report poll type indication field and a first feedback segment retransmission bitmap field. The trigger frame further includes at least one of a first resource allocation information field or a first resource allocation reuse indication field. The third resource scheduling message is located in the first resource allocation information field. The first polling scheduling message is located in the first feedback segment retransmission bitmap field. The first resource allocation reuse indication field is used to indicate whether the third resource scheduling message is the same as the second resource scheduling message.

Optionally, in an embodiment of the present invention, the trigger frame further includes an identifier field of the STA.

Optionally, in an embodiment of the present invention, the first polling scheduling message and the third resource scheduling message are borne in a beamforming report poll BF Report Poll frame of a same data packet. The BF Report Poll frame may include a receiver address field, a second feedback segment retransmission bitmap field, and a third feedback segment retransmission bitmap field. The BF Report Poll frame may further include at least one of a second resource allocation information field or a second resource allocation reuse indication field. The third resource scheduling message is located in the second resource allocation information field. The first polling scheduling message is located in the third feedback segment retransmission bitmap field. Indication information of the third resource scheduling message is located in the second resource allocation reuse indication field.

Optionally, in an embodiment of the present invention, the BF Report Poll frame further includes an identifier field of the STA.

Optionally, in an embodiment of the present invention, that the BF Report Poll frame is a poll frame used to trigger multi-user channel state information transmission is indicated in any one of the following manners: the receiver address field, the second feedback segment retransmission bitmap field, or a length of the BF Report Poll frame.

Optionally, in an embodiment of the present invention, the target STA that cannot immediately feed back the first channel state information meets at least one of the following conditions: the target STA has a limited capability, a priority for buffering the first channel state information by the target STA is less than a first threshold, or a size of a resource block in the first communication resource is less than a threshold.

The access point for transmitting channel state information according to this embodiment of the present invention may be corresponding to the method for transmitting channel state information in the embodiments of the present invention. In addition, the foregoing and other operations and/or functions of the units/modules of the access point are separately used to implement a corresponding procedure of the method shown in FIG. 2. For brevity, details are not described herein again.

Apparatus Embodiment 9

Specifically, when the apparatus 70 is a station, the receiver 72 may be configured to receive a first resource scheduling message, a first feedback indication message, and a first high-efficiency long training sequence that are sent by an access point AP according to first indication information. The first feedback indication message is used to indicate at least two target stations STAs that need to feed back channel state information to the AP. The first resource scheduling message or the first feedback indication message includes the first indication information. The first indication information is used to instruct the target STA whether to immediately feed back channel state information. The first high-efficiency long training sequence is used to determine first channel state information of the target STA. The first resource scheduling message is used to indicate a first communication resource used by the target STA when the target STA feeds back second channel state information or an acknowledgement message. The second channel state information is a part or all of the first channel state information. The acknowledgement message is used to indicate that the first feedback indication message, the first high-efficiency long training sequence, and the first resource scheduling message have been received.

The transmitter 71 may be configured to: when it is determined, according to the received first feedback indication message, that the STA belongs to the target STAs, perform channel estimation according to the received first high-efficiency long training sequence, to determine the first channel state information, and send the second channel state information or the acknowledgement message to the AP by using the first communication resource indicated by the received first resource scheduling message.

In this embodiment of the present invention, an access point sends a resource scheduling message, a feedback indication message, and a high-efficiency long training sequence to a station, to schedule multiple stations to transmit channel state information, and the access point may instruct the station whether to immediately perform feedback; and the station may feed back channel state information or an acknowledgement message to the access point according to an instruction of the access point. In this way, resource waste caused when some stations cannot immediately perform feedback can be avoided, and channel state information transmission efficiency can be improved.

Optionally, in an embodiment of the present invention, the receiver 72 may be configured to: when the first indication information instructs the STA not to immediately feed back channel state information, receive the first resource scheduling message an X interframe space XIFS later after receiving the first feedback indication message and the first high-efficiency long training sequence that are sent by the AP. The first feedback indication message includes the first indication information. The transmitter 71 may be configured to: an X interframe space XIFS later after the first resource scheduling message is received, send the second channel state information to the AP according to the first resource scheduling message, the first feedback indication message, and the first high-efficiency long training sequence by using the first communication resource.

Optionally, in an embodiment of the present invention, the receiver 72 may be configured to receive a first polling scheduling message and a second resource scheduling message that are sent by the AP. The first polling scheduling message is used to request third channel state information from the STA. The first polling scheduling message includes segment information of the third channel state information in the first channel state information. The third channel state information is a part or all of the first channel state information from which the second channel state information is removed. The second resource scheduling message is used to indicate a second communication resource used by a STA when the STA feeds back the third channel state information. The transmitter 71 may be configured to send the third channel state information to the AP by using the second communication resource.

Optionally, in an embodiment of the present invention, the transmitter 71 may be configured to: when the first indication information instructs the STA not to immediately feed back channel state information, an X interframe space XIFS later after receiving the first resource scheduling message, send the acknowledgement message to the AP by using the first communication resource.

Optionally, in an embodiment of the present invention, the receiver 72 may be configured to receive a third resource scheduling message sent by the AP. The third resource scheduling message is used to indicate a third communication resource used by a STA when the STA feeds back fourth channel state information. The transmitter 71 may be configured to send the fourth channel state information by using the third communication resource, where the fourth channel state information is a part or all of the first channel state information.

Optionally, in an embodiment of the present invention, the receiver 72 may be configured to receive a second polling scheduling message and a fourth resource scheduling message that are sent by the AP. The second polling scheduling message is used to request fifth channel state information from the STA. The second polling scheduling message includes segment information of the fifth channel state information in the first channel state information. The fifth channel state information is a part or all of the first channel state information from which the fourth channel state information is removed. The fourth resource scheduling message is used to indicate a fourth communication resource used by the target STA when the target STA feeds back the fifth channel state information. The transmitter 71 may be configured to send the fifth channel state information to the AP by using the fourth communication resource.

Optionally, in an embodiment of the present invention, the transmitter 71 may be configured to: when the first indication information instructs the STA to immediately feed back channel state information, an X interframe space XIFS later after sending the first resource scheduling message, send the second channel state information to the AP by using the first communication resource.

Optionally, in an embodiment of the present invention, the receiver 72 may be configured to receive a third polling scheduling message and a fifth resource scheduling message that are sent by the AP. The third polling scheduling message is used to request sixth channel state information from the STA. The third polling scheduling message includes segment information of the sixth channel state information in the first channel state information. The sixth channel state information is a part or all of the first channel state information from which the second channel state information is removed. The fifth resource scheduling message is used to indicate a fifth communication resource used by the target STA when the target STA feeds back the sixth channel state information. The transmitter 71 may be configured to send the sixth channel state information to the AP by using the fifth communication resource.

Optionally, in an embodiment of the present invention, the first indication information includes a field used to indicate a time at which the STA feeds back channel state information.

Optionally, in an embodiment of the present invention, the first indication information includes a field used to instruct all STAs or separately instruct each STA whether to immediately feed back channel state information.

Optionally, in an embodiment of the present invention, when the transmitter 71 may be configured to send the first resource scheduling message after sending the first feedback indication message and the first high-efficiency long training sequence, the first indication information is used to indicate non-immediate feedback.

Optionally, in an embodiment of the present invention, when a size of a resource block in the first communication resource is less than a first threshold or a quantity of spatial streams used by a resource block in the first communication resource is less than a second threshold, the first indication information is used to indicate non-immediate feedback; or when a size of a resource block in the first communication resource is greater than or equal to a first threshold or a quantity of spatial streams used by a resource block in the first communication resource is greater than or equal to a second threshold, the first indication information is used to indicate immediate feedback.

Optionally, in an embodiment of the present invention, the first feedback indication message, the first high-efficiency long training sequence, and the first resource scheduling message are located in different frames.

Optionally, in an embodiment of the present invention, the first polling scheduling message and the second resource scheduling message are located in a same data packet; or the second polling scheduling message and the fourth resource scheduling message are located in a same data packet; or the third polling scheduling message and the fifth resource scheduling message are located in a same data packet.

The station for transmitting channel state information according to this embodiment of the present invention may be corresponding to the method for transmitting channel state information in the embodiments of the present invention. In addition, the foregoing and other operations and/or functions of the units/modules of the station are separately used to implement a corresponding procedure of the method shown in FIG. 3. For brevity, details are not described herein again.

Apparatus Embodiment 10

Specifically, when the apparatus 70 is an access point, the processor 73 may be configured to determine first indication information, where the first indication information is used to instruct at least two target stations STAs whether to immediately feed back channel state information, where the at least two target stations STAs need to feed back channel state information to the access point AP.

The transmitter 71 may be configured to send a first resource scheduling message, a first feedback indication message, and a first high-efficiency long training sequence to a target STA according to the determined first indication information. The first resource scheduling message or the first feedback indication message includes the first indication information. The first feedback indication message is used to indicate the at least two target stations STAs that need to feed back channel state information to the AP. The first high-efficiency long training sequence is used to determine first channel state information of the target STA. The first resource scheduling message is used to indicate a first communication resource used by the target STA when the target STA feeds back second channel state information or an acknowledgement message. The second channel state information is a part or all of the first channel state information. The acknowledgement message is used to indicate that the first feedback indication message, the first high-efficiency long training sequence, and the first resource scheduling message have been received.

The receiver 72 may be configured to receive the second channel state information or the acknowledgement message that is sent by the target STA according to the sent first resource scheduling message, first feedback indication message, and first high-efficiency long training sequence by using the first communication resource.

In this embodiment of the present invention, an access point sends a resource scheduling message, a feedback indication message, and a high-efficiency long training sequence to a station, to schedule multiple stations to transmit channel state information, and the access point may instruct the station whether to immediately perform feedback; and the station may feed back channel state information or an acknowledgement message to the access point according to an instruction of the access point. In this way, resource waste caused when some stations cannot immediately perform feedback can be avoided, and channel state information transmission efficiency can be improved.

Optionally, in an embodiment of the present invention, the transmitter 71 may be configured to: when the first indication information instructs the target STA not to immediately feed back channel state information, send the first resource scheduling message an X interframe space XIFS later after sending the first feedback indication message and the first high-efficiency long training sequence. The first feedback indication message includes the first indication information. The receiver 72 may be configured to: an X interframe space XIFS later after the first resource scheduling message is sent, receive the second channel state information that is sent by the STA according to the first resource scheduling message, the first feedback indication message, and the first high-efficiency long training sequence by using the first communication resource.

Optionally, in an embodiment of the present invention, the transmitter 71 may be configured to send a first polling scheduling message and a second resource scheduling message. The first polling scheduling message is used to request third channel state information from the target STA. The first polling scheduling message includes segment information of the third channel state information in the first channel state information. The third channel state information is a part or all of the first channel state information from which the second channel state information is removed. The second resource scheduling message is used to indicate a second communication resource used by the target STA when the target STA feeds back the third channel state information. The receiver 72 may be configured to receive the third channel state information sent by the target STA by using the second communication resource.

Optionally, in an embodiment of the present invention, the receiver 72 may be configured to: when the first indication information instructs the target STA not to immediately feed back channel state information, an X interframe space XIFS later after the first resource scheduling message is sent, receive the acknowledgement message that is sent by the target STA according to the first resource scheduling message, the first feedback indication message, and the first high-efficiency long training sequence by using the first communication resource.

Optionally, in an embodiment of the present invention, the transmitter 71 may be configured to send a third resource scheduling message. The third resource scheduling message is used to indicate a third communication resource used by the target STA when the target STA feeds back fourth channel state information. The receiver 72 may be configured to receive the fourth channel state information sent by the target STA by using the third communication resource, where the fourth channel state information is a part or all of the first channel state information.

Optionally, in an embodiment of the present invention, the transmitter 71 may be configured to send a second polling scheduling message and a fourth resource scheduling message. The second polling scheduling message is used to request fifth channel state information from the target STA. The second polling scheduling message includes segment information of the fifth channel state information in the first channel state information. The fifth channel state information is a part or all of the first channel state information from which the fourth channel state information is removed. The fourth resource scheduling message is used to indicate a fourth communication resource used by the target STA when the target STA feeds back the fifth channel state information. The receiver 72 may be configured to receive the fifth channel state information sent by the target STA by using the fourth communication resource.

Optionally, in an embodiment of the present invention, the receiver 72 may be configured to: when the first indication information instructs the target STA to immediately feed back channel state information, an X interframe space XIFS later after the first resource scheduling message is sent, receive the second channel state information that is sent by the target STA according to the first resource scheduling message, the first feedback indication message, and the first high-efficiency long training sequence by using the first communication resource.

Optionally, in an embodiment of the present invention, the transmitter 71 may be configured to send a third polling scheduling message and a fifth resource scheduling message. The third polling scheduling message is used to request sixth channel state information from the target STA. The third polling scheduling message includes segment information of the sixth channel state information in the first channel state information. The sixth channel state information is a part or all of the first channel state information from which the second channel state information is removed. The fifth resource scheduling message is used to indicate a fifth communication resource used by the target STA when the target STA feeds back the sixth channel state information. The receiver 72 may be configured to receive the sixth channel state information sent by the target STA by using the fifth communication resource.

Optionally, in an embodiment of the present invention, the first indication information includes a field used to indicate a time at which the target STA feeds back channel state information.

Optionally, in an embodiment of the present invention, the first indication information includes a field used to instruct all target STAs or separately instruct each target STA whether to immediately feed back channel state information.

Optionally, in an embodiment of the present invention, when the first resource scheduling message is sent after the first feedback indication message and the first high-efficiency long training sequence are sent, the first indication information is used to indicate non-immediate feedback.

Optionally, in an embodiment of the present invention, when a size of a resource block in the first communication resource is less than a first threshold or a quantity of spatial streams used by a resource block in the first communication resource is less than a second threshold, the first indication information is used to indicate non-immediate feedback; or when a size of a resource block in the first communication resource is greater than or equal to a first threshold or a quantity of spatial streams used by a resource block in the first communication resource is greater than or equal to a second threshold, the first indication information is used to indicate immediate feedback.

Optionally, in an embodiment of the present invention, the first feedback indication message, the first high-efficiency long training sequence, and the first resource scheduling message are located in different frames.

Optionally, in an embodiment of the present invention, the first polling scheduling message and the second resource scheduling message are located in a same data packet; or the second polling scheduling message and the fourth resource scheduling message are located in a same data packet; or the third polling scheduling message and the fifth resource scheduling message are located in a same data packet.

The access point for transmitting channel state information according to this embodiment of the present invention may be corresponding to the method for transmitting channel state information in the embodiments of the present invention. In addition, the foregoing and other operations and/or functions of the units/modules of the access point are separately used to implement a corresponding procedure of the method shown in FIG. 4. For brevity, details are not described herein again.

Apparatus Embodiment 11

Specifically, when the apparatus 70 is a station, the receiver 72 may be configured to receive a feedback indication message, a high-efficiency long training sequence, and a first resource scheduling message that are sent by an access point AP. The feedback indication message is used to indicate at least two target STAs that need to feed back channel state information to the AP. The high-efficiency long training sequence is used to determine first channel state information of the target STA. The first resource scheduling message is used to indicate a first communication resource used by the target STA when the target STA feeds back second channel state information. The second channel state information is a part of the first channel state information.

The transmitter 71 may be configured to: when it is determined, according to the received feedback indication message, that the STA belongs to the target STAs, perform channel estimation according to the received high-efficiency long training sequence, to obtain the first channel state information, and send the second channel state information to the AP by using the first communication resource indicated by the received first resource scheduling message.

The receiver 72 is configured to receive a first polling scheduling message and a second resource scheduling message that are sent by the AP. The first polling scheduling message is used by the AP for requesting third channel state information from the target STA. The first polling scheduling message includes segment information of the third channel state information in the first channel state information. The third channel state information is a part or all of the first channel state information from which the second channel state information is removed. The second resource scheduling message is used to indicate a second communication resource used by the target STA when the target STA feeds back the third channel state information.

The transmitter 71 may be configured to send the third channel state information to the AP by using the second communication resource indicated by the received second resource scheduling message.

In this embodiment of the present invention, an access point sends a resource scheduling message, a feedback indication message, and a high-efficiency long training sequence to a station, to schedule multiple stations to transmit channel state information; the station feeds back channel state information to the access point; and the access point may further continue to send a polling scheduling message and a resource scheduling message, to trigger the station to continue to feed back, to the access point, channel state information that is not successfully fed back. In this way, resource waste caused when feedback cannot be performed at one time due to an insufficient resource can be avoided, and channel state information transmission efficiency can be improved.

The station for transmitting channel state information according to this embodiment of the present invention may be corresponding to the method for transmitting channel state information in the embodiments of the present invention. In addition, the foregoing and other operations and/or functions of the units/modules of the station are separately used to implement a corresponding procedure of the method shown in FIG. 5. For brevity, details are not described herein again.

Apparatus Embodiment 12

Specifically, when the apparatus 70 is an access point, the transmitter 71 may be configured to send a feedback indication message, a high-efficiency long training sequence, and a first resource scheduling message to a station STA. The feedback indication message is used to indicate at least two target STAs that need to feed back channel state information to the AP. The high-efficiency long training sequence is used to determine first channel state information of the target STA. The first resource scheduling message is used to indicate a first communication resource used by the target STA when the target STA feeds back second channel state information. The second channel state information is a part of the first channel state information.

The receiver 72 may be configured to receive the second channel state information sent by the target STA by using the first communication resource indicated by the sent first resource scheduling message.

The transmitter 71 may be configured to send a first polling scheduling message and a second resource scheduling message to the target STA. The first polling scheduling message is used to request third channel state information from the target STA. The first polling scheduling message includes segment information of the third channel state information in the first channel state information. The third channel state information is a part or all of the first channel state information from which the second channel state information is removed. The second resource scheduling message is used to indicate a second communication resource used by the target STA when the target STA feeds back the third channel state information.

The receiver 72 may be configured to receive the third channel state information sent by the target STA by using the second communication resource indicated by the second resource scheduling message.

In this embodiment of the present invention, an access point sends a resource scheduling message, a feedback indication message, and a high-efficiency long training sequence to a station, to schedule multiple stations to transmit channel state information; the station feeds back channel state information to the access point; and the access point may further continue to send a polling scheduling message and a resource scheduling message, to trigger the station to continue to feed back, to the access point, channel state information that is not successfully fed back. In this way, resource waste caused when feedback cannot be performed at one time due to an insufficient resource can be avoided, and channel state information transmission efficiency can be improved.

The access point for transmitting channel state information according to this embodiment of the present invention may be corresponding to the method for transmitting channel state information in the embodiments of the present invention. In addition, the foregoing and other operations and/or functions of the units/modules of the access point are separately used to implement a corresponding procedure of the method shown in FIG. 6. For brevity, details are not described herein again.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Moreover, the foregoing technical terms and English translations do not impose a limitation on features corresponding to the technical terms and the English translations, and shall be subject to functions of the features.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

Methods or steps described in the embodiments disclosed in this specification may be implemented by hardware, a software program executed by a processor, or a combination thereof. The software program may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The present invention is described in detail with reference to the accompany drawings and in combination with the embodiments, but the present invention is not limited thereto. Various equivalent modifications or replacements can be made to the embodiments of the present invention by a person of ordinary skill in the art without departing from the essence of the present invention, and the modifications or replacements shall fall within the scope of the present invention.

What is claimed is:

1. A method for transmitting channel state information, comprising:
   sending, by an apparatus, a null data packet announcement (NDPA) frame, wherein the NDPA frame carries a feedback indication message which indicates two or more target stations (STAs) that need to feed back channel state information;
   sending, by the apparatus, a null data packet (NDP), wherein the NDP carries a high-efficiency long training sequence which is used for determining the channel state information by the target STAs;
   sending, by the apparatus, a trigger frame after sending the NDP, wherein the trigger frame carries a first resource scheduling message which indicates communication resources to be used by the target STAs when the target STAs feed back the channel state information; and
   receiving, by the apparatus, after sending the trigger frame, the channel state information sent by the target STAs by using the communication resources.

2. The method according to claim 1, wherein after receiving the channel state information sent by the target STAs, the method further comprises:
   sending one or more additional trigger frames, wherein the one or more additional trigger frames carry resource scheduling messages which indicate communication resources to be used by target STAs when the target STAs feed back the channel state information.

3. The method according to claim 1, wherein there is an inter frame space between the NDP and the trigger frame.

4. The method according to claim 1, wherein the trigger frame comprises a type field which indicates that a type of the trigger frame is a beamforming report poll.

5. The method according to claim 1, wherein the trigger frame comprises a feedback segment retransmission bitmap field which indicates requested feedback segments.

6. A method for transmitting channel state information, comprising:
   receiving, by a station (STA), a null data packet announcement (NDPA) frame, wherein the NDPA frame carries a feedback indication message which indicates two or more target STAs that need to feed back channel state information;
   receiving, by the STA, a null data packet (NDP), wherein the NDP carries a high-efficiency long training sequence which is used for determining the channel state information by the target STAs;
   parsing, by the STA, the feedback indication message and determining that the STA belongs to the target STAs;
   determining, by the STA, the channel state information based on the high-efficiency long training sequence;
   receiving, by the STA, a trigger frame after receiving the NDP, wherein the trigger frame carries a resource scheduling message which indicates communication resources to be used by the target STAs when the target STAs feed back the channel state information; and
   sending, by the STA, after receiving the trigger frame, the channel state information on the communication resources.

7. The method according to claim 6, after sending the channel state information, the method further comprises:
   receiving one or more additional trigger frames, wherein the one or more additional trigger frames carry resource scheduling messages which indicate communication resources to be used by target STAs when the target STAs feed back the channel state information.

8. The method according to claim 6, wherein there is an inter frame space between the NDP and the trigger frame.

9. The method according to claim 6, wherein the trigger frame comprises a type field which indicates that a type of the trigger frame is a beamforming report poll.

10. The method according to claim 6, wherein the trigger frame comprises a feedback segment retransmission bitmap field which indicates requested feedback segments.

11. An apparatus for transmitting channel state information, comprising:
    a transmitter, configured to:
    send a null data packet announcement (NDPA) frame, wherein the NDPA frame carries a feedback indication message which indicates two or more target stations (STAs) that need to feed back channel state information;
    send a null data packet (NDP), wherein the NDP carries a high-efficiency long training sequence which is usable by the target STAs for determining the channel state information; and
    send a trigger frame after sending the NDP, wherein the trigger frame carries a resource scheduling message which indicates communication resources to be used by the target STAs when the target STAs feed back the channel state information; and
    a receiver, configured to receive, after the trigger frame is sent, the channel state information sent by the target STAs by using the communication resources.

12. The apparatus according to claim 11, wherein the transmitter is further configured to send one or more additional trigger frames, wherein the one or more additional trigger frames carry resource scheduling messages which indicate communication resources to be used by target STAs when the target STAs feed back the channel state information.

13. The apparatus according to claim 11, wherein there is an inter frame space between the NDP and the trigger frame.

14. The apparatus according to claim 11, wherein the trigger frame comprises a type field which indicates that a type of the trigger frame is a beamforming report poll.

15. The apparatus according to claim 11, wherein the trigger frame comprises a feedback segment retransmission bitmap field which indicates requested feedback segments.

16. An apparatus for transmitting channel state information, comprising:
a receiver, configured to:
receive a null data packet announcement (NDPA) frame, wherein the NDPA frame carries a feedback indication message which indicates two or more target stations (STAs) that need to feed back channel state information; and
receive a null data packet (NDP), wherein the NDP carries a high-efficiency long training sequence which is usable by the target STAs for determining the channel state information; and
a processor, configured to:
parse the feedback indication message and determine that the apparatus belongs to the target STAs; and
determine the channel state information based on the high-efficiency long training sequence;
wherein the receiver is further configured to receive a trigger frame after receiving the NDP, wherein the trigger frame carries a resource scheduling message which indicates communication resources to be used by the target STAs when the target STAs feed back the channel state information;
wherein the apparatus further comprises a transmitter, configured to send, after the trigger frame is received, the channel state information on the communication resources.

17. The apparatus according to claim 16, wherein the receiver is further configured to receive one or more additional trigger frames, wherein the one or more additional trigger frames carry resource scheduling messages which indicate communication resources to be used by target STAs when the target STAs feed back the channel state information.

18. The apparatus according to claim 16, wherein there is an inter frame space between the NDP and the trigger frame.

19. The apparatus according to claim 16, wherein the trigger frame comprises a type field which indicates that a type of the trigger frame is a beamforming report poll.

20. The apparatus according to claim 16, wherein the trigger frame comprises a feedback segment retransmission bitmap field which indicates requested feedback segments.

* * * * *